(12) United States Patent
Nagayama et al.

(10) Patent No.: US 6,690,921 B1
(45) Date of Patent: Feb. 10, 2004

(54) RECEIVING APPARATUS, BASE STATION APPARATUS USING SAME AND RADIO COMMUNICATION SYSTEM

(75) Inventors: Toshihiro Nagayama, Ishikawa (JP); Kazuhiko Ikeda, Ishikawa (JP); Kazuhiko Takeyama, Toyama (JP); Koji Ishii, Kanagawa (JP); Takayoshi Morino, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 605 days.

(21) Appl. No.: 09/637,830

(22) Filed: Aug. 11, 2000

(30) Foreign Application Priority Data

Sep. 1, 1999 (JP) ............................. 11-248041

(51) Int. Cl.$^7$ ............................................. H04B 17/00
(52) U.S. Cl. ................................. 455/67.14; 455/97.11; 455/67.13; 455/136; 455/226.1; 455/425
(58) Field of Search ............................ 455/67.11, 67.16, 455/132, 136, 226.1–226.4, 423, 424, 425, 3.01, 3.02, 67.14, 67.13

(56) References Cited

U.S. PATENT DOCUMENTS

| 5,287,073 A | * | 2/1994 | Den Braber | 331/11 |
| 5,867,777 A | * | 2/1999 | Yamaji et al. | 455/234.1 |
| 5,963,087 A | * | 10/1999 | Anderson | 330/52 |
| 6,194,964 B1 | * | 2/2001 | Jun | 330/149 |

FOREIGN PATENT DOCUMENTS

| JP | 401013802 | * | 1/1989 | ............ H03G/3/02 |
| JP | 5-122170 | | 5/1993 | |
| JP | 07007347 | * | 1/1995 | ............ H03G/3/02 |
| JP | 7-177082 | | 7/1995 | |
| JP | 9-135125 | | 5/1997 | |

* cited by examiner

*Primary Examiner*—Vivian Chin
*Assistant Examiner*—Tuan Tran
(74) *Attorney, Agent, or Firm*—Pearne & Gordon LLP

(57) ABSTRACT

A gain of a receiving amplifier can be measured by inputting pilot signals each having a different frequency into an input side and an output side of the receiving amplifier respectively, then detecting these pilot signals respectively by a main apparatus having an abnormality detecting function, and then comparing their relative values.

11 Claims, 30 Drawing Sheets

RECEIVING APPARATUS, BASE STATION APPARATUS USING SAME AND RADIO COMMUNICATION SYSTEM

BACKGROUND OF THE INVENTION

The present invention relates to a receiving apparatus having an outdoor receiving unit, a base station apparatus using the same, and a radio communication system.

The outdoor receiving unit is mainly used as a receiving unit in the base station apparatus, in the mobile communication, and installed on the receiving antenna pylon. In this case, in order to transmit a signal which is caught by a receiving antenna installed on the receiving antenna pylon to a main apparatus on the ground, a long coaxial cable or the like must be employed. Since the receiving signal is attenuated by the coaxial cable, NF (noise figure) is deteriorated. Therefore, there is such a subject that, even if a receiving apparatus with good performance is provided as the receiving apparatus installed on the ground, good receiving sensitivity cannot be achieved.

In such case, such an approach is often employed that a low-noise receiving amplifier is provided in the neighborhood of the receiving antenna as the outdoor receiving unit to suppress the degradation of NF by the coaxial cable and thus attain the good receiving performance.

However, a location on which the outdoor receiving unit is installed is a top of the pylon. Thus, since the failure due to the thunderbolt is often caused or the receiving sensitivity is degraded at the time of the failure, the operation of the outdoor receiving unit must always be monitored and also the failure, if occurs, must be quickly detected. Nevertheless, there is such a subject that, since the installing location is the top of the receiving antenna pylon, maintenance and inspection operations at that location are difficult.

Therefore, in order to overcome these subjects, approaches described in the following have been known. As the abnormality monitoring apparatus for detecting the abnormality such as gain reduction of the outdoor receiving unit, breakdown of the parts, etc. in the prior art, the pilot signal level monitoring apparatus disclosed in Patent Application Publication (KOKAI) Hei 5-122170 has been known. This apparatus injects the pilot signal from the input side of the receiving amplifier, and then detects the pilot signal component on the output side of the receiving amplifier to get the gain of the receiving amplifier.

Also, like the distributing/synthesizing system disclosed in Patent Application Publication (KOKAI) Hei 9-135125, such a method has been known that the pilot signal is injected from the distributor on the input side of the receiving amplifier and then the gain of the receiving amplifier is monitored by comparing the pilot signal got from the output of the synthesizer on the output side of the receiving amplifier with the reference value to detect the abnormal operation.

In addition, like the power supply current transmitting system disclosed in Patent Application Publication (KOKAI) Hei 7-177082, such a method has been known that the consumption current of the receiving amplifier is monitored and then the failure of the receiving amplifier is informed the main apparatus by changing the power supply current supplied to the outdoor receiving unit when the abnormality of the current value is detected.

However, there are subjects described in the following in the systems in the prior art. According to the pilot injection system, the abnormality is detected when the detected voltage of the pilot signal component is lowered. In this case, the outdoor receiving unit is decided as the failure even if the pilot signal generating means is broken down and thus the signal level is lowered. Therefore, there is such a subject that, when the abnormality is to be detected by the main apparatus on the ground, it cannot be discriminated which failure of the receiving amplifier, the pilot signal generating means, or the transmitting means causes the above abnormality.

Also, in the pilot signal generating means, unless a means for holding the output level of the pilot signal is provided, the output level is apt to change according to the change in the ambient temperature, the change in the power supply voltage, etc. Because of the influence of such change, the level of the pilot signal to be received in the main apparatus is changed even when the gain of the outdoor receiving unit is normal. In addition, there is such a subject that, since the gain of the receiving amplifier is measured by measuring the absolute value of the level of the pilot signal in the main apparatus, the gain of the main apparatus cannot be precisely measured unless the insertion loss of the transmitting means, which transmits the signal from the outdoor receiving unit to the main apparatus, is precisely measured in installing the outdoor receiving unit to correct the level.

Further, in the distributing/synthesizing system in the prior art, there is such a subject that, since the abnormality is detected in the outdoor receiving unit, a means for transmitting the abnormality detection signal must be provided so as to transmit the abnormality detection to the main apparatus.

Furthermore, at the time of the failure of the outdoor receiving unit, not only monitoring the consumption current but also monitoring the gain of the receiving amplifier is effective to quantitatively grasp a degree of degradation of the receiving sensitivity due to the failure. In the power supply current transmitting system in the prior art, there are such subjects that, when the abnormality of the current is detected in monitoring the consumption current of the receiving amplifier, a degree of deterioration of the gain of the receiving amplifier cannot be grasped and also, when the gain of the receiving amplifier is reduced due to disconnection of the signal line for coupling the multi-stage amplifiers, such reduction in the gain of the receiving amplifier cannot be detected.

Moreover, under the condition the outdoor receiving unit is broken down, it is desired that the radio system can be employed until the repair is completed. When the receiving amplifier of the outdoor receiving unit is composed of the multi-stage amplifiers, generally the degradation of the receiving sensitivity is increased in the case where the preceding-stage receiving amplifier is broken down rather than the case where the succeeding-stage receiving amplifier is broken down. For this reason, there is such a subject that, when the outdoor receiving unit is out of order, a degree of degradation in the quality of communication can be grasped by detecting at which stage the amplifier is broken by using the main apparatus, nevertheless such grasp of degradation cannot be achieved in the power supply current transmitting system.

Also, there is such a subject that, since a plurality of signal sources must be built in the outdoor receiving unit to get a plurality of pilot signals by the outdoor receiving unit, a method of obtaining the pilot signal is difficult.

Also, in the pilot injection system in the prior art, the level of the signal being input into the receiving means must be adjusted according to difference in the length of the cable as the transmitting means in installing the system. As the adjusting method, an amount of attenuation is set by 1 dB step, for example, by the stepwise attenuating means connected to the cable, in compliance with an amount of attenuation detected from the cable length. Therefore, as the error in correcting the insertion loss of the cable, the error of ±0.5 dB is produced at maximum. As a result, there is such a subject that, in detecting the gain reduction, the detection precision is degraded owing to the influence of such error.

Also, if the failure detecting portion in the main apparatus is out of order, it is sometimes decided that the receiving amplifier has been broken down in the receiving unit which detects the abnormality of the outdoor receiving unit by detecting the pilot signal. Therefore, there is such a subject that, even if the amplifier of the outdoor receiving unit is normally operated and thus no degradation of the quality of communication is caused, such situation can be detected as the abnormality of the outdoor receiving unit.

Also, in the configuration that the level of the pilot signal is detected in the main apparatus to detect the abnormality of the outdoor receiving unit, there is such a subject that, since the block for measuring the level of the pilot signal must be newly equipped, a size of the configuration is increased.

In addition, unnecessary signals in reception are input by injecting the pilot signal. Therefore, assume that the frequency of the pilot signal is set as $fp(=f0+\Delta f)$ where $f0$ is the frequency of the receiving signal, for example, if the interference wave $fud(=f0+2\times\Delta f)$ is input externally, the receiving signal $f0$ can be given by $$2\times fp-fud=2\times f0+2\times\Delta f-f0-2\times\Delta f=f0.$$

As a result, there is such a subject that sometimes the intermodulation distortion is caused.

Further, in the pilot injection system in the prior art, if the abnormality of the outdoor receiving unit is detected in the main apparatus, the reference voltage with which the detected voltage of the pilot signal component being detected in the main apparatus is compared must be adjusted due to variation in the attenuation amount of the transmitting means. At that time, such adjusting operation must be conducted manually to satisfy the specified value conditions by using the measuring tool such as the tester, etc. As a result, there is such a subject that operability is not good, e.g., the read error of the measuring tool is caused in adjusting, the external measuring tools are needed, etc.

Furthermore, the level of the pilot signal which is superposed on the cable which transmits the receiving signal being amplified in the outdoor receiving unit to the main apparatus must be corrected in installing the outdoor receiving unit. However, there is such a subject that, if such adjustment is conducted manually, adjust error due to the read error of the measuring tool or manual adjust error such as inputting of the false adjust value may happen.

Moreover, owing to the variation of the internal voltage of the pilot signal level monitoring portion, the reference voltage with which the detected signal of the pilot signal is compared and the voltage used to detect the abnormality are varied every receiving apparatus. Therefore, there is such a subject that the accuracy of the abnormality detection is lowered in detecting the abnormality.

Still more, in the abnormality detecting means in the prior art, the system must be operated as it is under the situation the abnormality has been detected until the defected system can be repaired. Hence, there is such a subject that, if the abnormality is detected at the time of the failure occurring, the communication area is narrowed.

SUMMARY OF THE INVENTION

The present invention has been made to overcome the subjects in the prior art, and intends to improve reliability and precision of detecting abnormality of a receiving amplifier.

The present invention provides the receiving apparatus which comprises the outdoor receiving unit, the main apparatus, and the transmitting means for transmitting the receiving signal from the outdoor receiving unit to the main apparatus. Since the first and second pilot signals having a different frequency respectively are injected into the input and the output of the receiving amplifier in the outdoor receiving unit and then relative values of the levels of the first and second pilot signals are measured in the main apparatus, the gain of the receiving amplifier can be measured precisely.

Also, since the first and second pilot signals having a different frequency respectively are injected into the inputs of two receiving amplifiers connected in parallel with the outdoor receiving unit and then relative values of the levels of the first and second pilot signals are measured in the main apparatus, the gain of the receiving amplifier can be measured precisely.

In addition, since n+1 pilot signals having a different frequency respectively are injected into n-stage receiving amplifiers in the outdoor receiving unit and then levels of the n+1 pilot signals are measured in the main apparatus, the gain of the receiving amplifier can be measured precisely and also the location where the fault of the n-stage receiving amplifiers is caused can be detected.

Further, n pilot signals of the outdoor receiving unit are generated by multiplexing means having different n-stage multiples, a plurality of pilot signals having a different frequency respectively can be obtained with a simple configuration.

Furthermore, since the current of the receiving amplifier in the outdoor receiving unit is measured and then the frequency of the pilot signal is set based on such information, the current value of the receiving amplifier can be monitored precisely.

Moreover, since the currents of plural receiving amplifiers in the outdoor receiving unit are measured and then the frequency of the pilot signal is set based on such information, the current values of plural receiving amplifiers can be monitored precisely.

Still more, since the levels of the receiving signal at the input and the output of the receiving amplifier in the outdoor receiving unit are compared/measured and then the frequency of the pilot signal is set based on such information, the gain of the receiving amplifier can be measured precisely and also the location where the fault is caused can be detected.

Also, the level of the receiving signal at the input of the receiving amplifier in the outdoor receiving unit is amplified by the amplifier which has the same gain and noise figure as the receiving amplifier and then compared with the level of the receiving signal at the output of the receiving amplifier to measure, and then the frequency of the pilot signal is set based on such information. Therefore, the gain of the receiving amplifier can be measured precisely even if the input level of the receiving signal is low and also the location where the fault is caused can be detected.

Also, the first and second pilot signals having different phase respectively are injected into inputs of two receiving amplifiers connected in parallel with the outdoor receiving unit such that amplitudes of two pilot signals can be canceled by the synthesizing means. Therefore, unnecessary spurious components by the pilot signals are not input into the main apparatus in the normal operation of the receiving amplifier, and thus the good receiving characteristic can be achieved.

Also, the first and second pilot signals having different phase respectively are injected into the input and the output of the receiving amplifier in the outdoor receiving unit such that amplitudes of two pilot signals can be canceled by the adding means. Therefore, unnecessary spurious components by the pilot signals cannot be input into the main apparatus in the normal operation of the receiving amplifier, and thus the good receiving characteristic can be achieved.

Also, since the first and second pilot signals having different phase respectively are added or synthesized to have predetermined different amplitudes, unnecessary spurious components by the pilot signals can be reduced in the main apparatus in the normal operation of the receiving amplifier and also the location where the fault is caused can be detected.

Further, since the level holding circuit for holding the level of the pilot signal at a predetermined level is provided to the outdoor receiving unit, the gain of the receiving amplifier can be measured precisely.

Also, the level of the pilot signal amplified by the receiving amplifier is detected and measured in the outdoor receiving unit, and then the frequency of the pilot signal is set based on such information. Therefore, the gain of the receiving amplifier can be measured precisely and also the location where the fault is caused can be detected.

Also, the level of the pilot signal amplified is detected and measured in the outdoor receiving unit and also the consumption current of the receiving amplifier is measured, and then the frequency of the pilot signal is set based on such information. Therefore, the gain of the receiving amplifier can be measured precisely, and the location where the fault is caused can be detected, and also the current value of the receiving amplifier can be monitored precisely.

Further, the pilot signal input into the receiving amplifier in the outdoor receiving unit and the pilot signal output therefrom are branched and added such that their phase differences become 180 degree, then the added output level is detected and measured in the outdoor receiving unit, and then the frequency of the pilot signal is set based on such information. Therefore, the gain of the receiving amplifier can be measured precisely, and also the location where the fault is caused can be detected.

Furthermore, since an amount of attenuation of the variable attenuating means in the main apparatus is controlled based on the result of the level detection of the pilot signal, an amount of loss of the transmitting means can be automatically compensated.

Moreover, since the level detecting means for the pilot signal in the main apparatus can be used commonly with the level detecting means for the receiving signal by switching the local oscillation frequency, an amount of loss of the transmitting means can be automatically compensated with a simple configuration.

Still more, since the level detecting means for the pilot signal is provided in the main apparatus and the level of the pilot signal can be detected by switching the local oscillation frequency, the fault of the abnormality detecting means can be detected.

Also, in the TDD system receiving apparatus, the level detecting means for the pilot signal in the main apparatus can be employed commonly with the level detecting means for the receiving signal by switching the local oscillation frequency, and also the level of the pilot signal can be detected within the time interval during when the receiving operation is not carried out. Therefore, the abnormality of the pilot signal can be detected with a simple configuration.

Further, there are provided the reference voltage adjusting means for adjusting the level of the reference voltage which is compared with the level detected result of the pilot signal in the main apparatus, and the reference value sensing portion for sensing that the compared result is within the standard range. Therefore, an amount of loss of the transmitting means can be compensated without its precise measurement and thus the abnormality of the pilot signal can be detected precisely.

Furthermore, the reference voltage adjusting means for adjusting the level of the reference voltage which is compared with the level detected result of the pilot signal in the main apparatus and also the error amplifying portion for amplifying the error of the compared result are provided, and also the reference voltage value can be adjusted by the adjusting device which has the controlling means for outputting the control signal of the reference voltage. Therefore, compensation of the amount of loss of the transmitting means can be adjusted simply.

Moreover, since the reference voltage of the adjusting device is set based on the power supply voltage of the main apparatus, the compensation of an amount of loss of the transmitting means can be adjusted simply with no influence of the error of the power supply voltage Further, since an amount of attenuation of the variable attenuating means can be controlled to the lowest minimum when the abnormality of the pilot signal is detected in the main apparatus, reduction in the receiving characteristic can be suppressed at the time of the fault.

In addition, since the base station apparatus having the receiving apparatus is provided, the fault detection and the adjustment of the transmitting means can be performed precisely with a simple configuration.

Still more, since the radio communication system having the receiving apparatus and the base station apparatus is provided, reduction in the communication area can be suppressed at the time of the failure.

DETAILED DESCRIPTION OF THE PREFERRED EMBODIMENTS

Embodiments of the present invention will be explained with reference to FIGS. 1 to 32 hereinafter.

Embodiment 1

Figure 1:
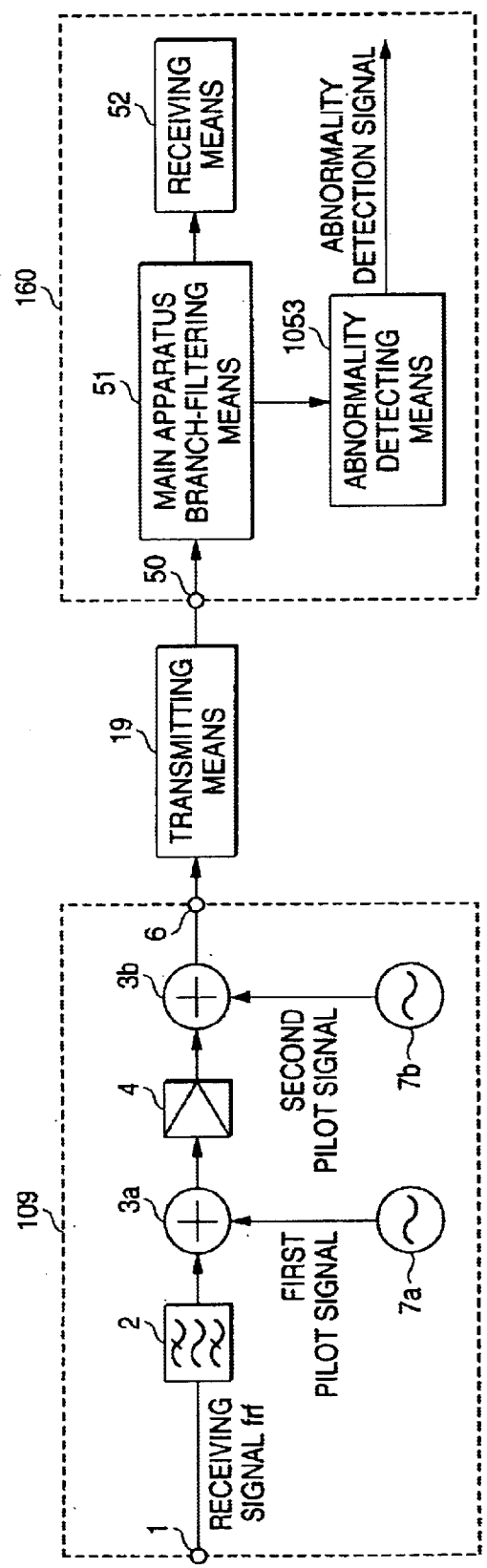
FIG. 1 is a block diagram showing a configuration of a receiving apparatus according to an embodiment 1 of the present invention.

A basic configuration of a receiving apparatus according to an embodiment 1 is shown in FIG. 1. The receiving apparatus according to the embodiment 1 comprises an outdoor receiving unit 109, a main apparatus 160 having an abnormality detecting means 1053 for detecting an abnormality of the outdoor receiving unit 109 by using pilot signals, and a transmitting means 19 for transmitting a signal output from the outdoor receiving unit 109 to the main apparatus 160.

The outdoor receiving unit 109 comprises an outdoor receiving unit input terminal 1, a receiving filter 2, a receiving amplifier 4, an outdoor receiving unit output terminal 6, a first pilot signal generating means 7a, a first adding means 3a, a second pilot signal generating means 7b, and a second adding means 3b.

The main apparatus 160 comprises a main apparatus input terminal 50, a main apparatus branch-filtering means 51, a receiving means 52, and an abnormality detecting means 1053.

Where the receiving apparatus corresponds to a receiving apparatus which receives a communication or broadcasting signal, for example, to get a desired signal. The outdoor receiving unit is provided on an antenna pylon, for example, and corresponds to a receiving unit which is provided in the open air to amplify the signal received by an antenna with low noise and less degradation. The main apparatus corresponds to a receiving main apparatus for executing frequency conversion and demodulation of the receiving signal, for example. The pilot signal generating means corresponds to a local signal oscillator, for example. The adding means corresponds to an adding means for adding a high frequency signal for a directional coupler, a distributor, etc., for example. The receiving amplifier corresponds to a low noise amplifier for amplifying the receiving signal with low noise, for example.

Figure 2:
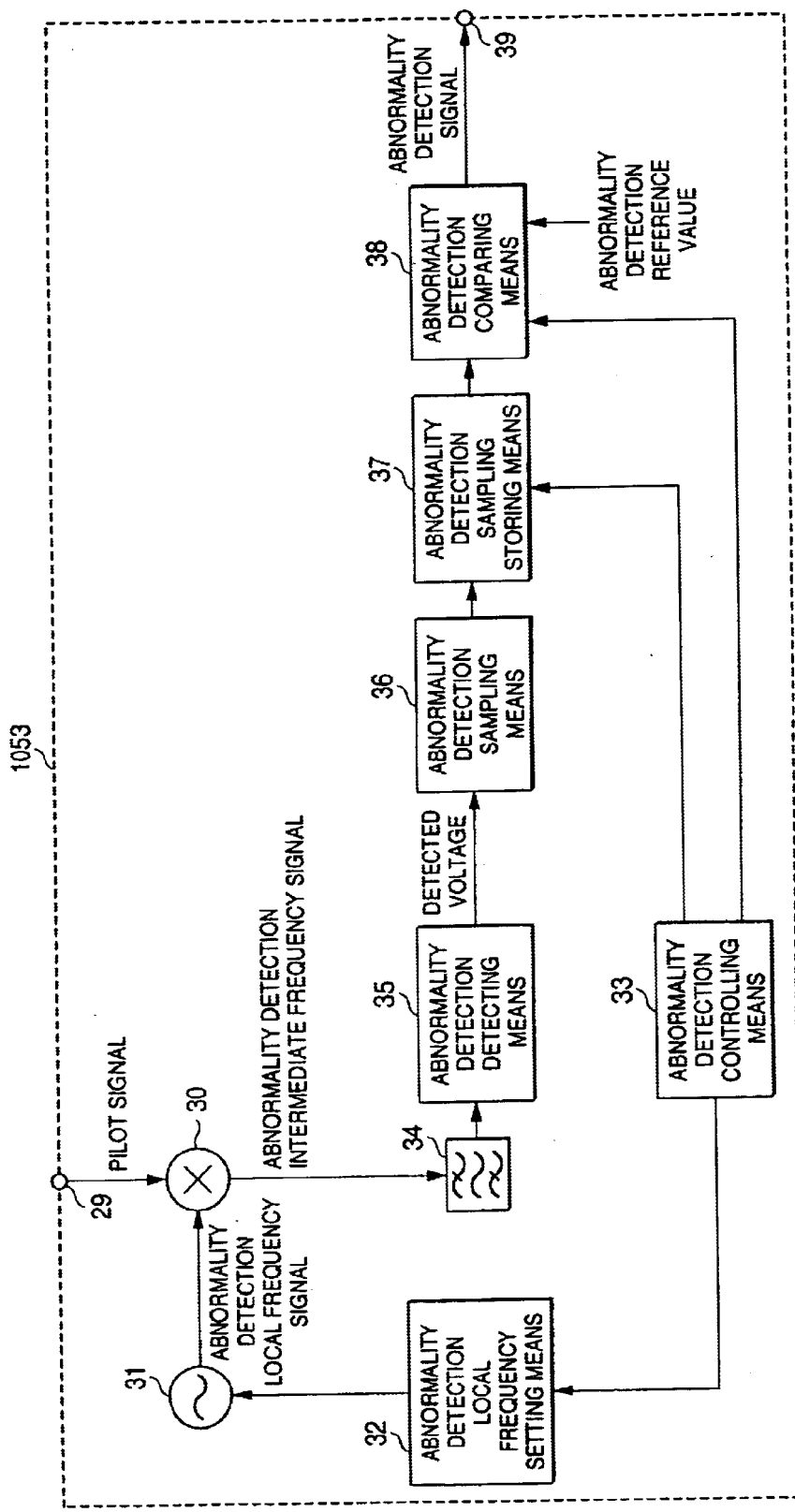
FIG. 2 is a block diagram showing a configuration of an example of an abnormality detecting means in FIG. 1.

Next, a block diagram of a configuration of the abnormality detecting means 1053 is shown in FIG. 2. The abnormality detecting means 1053 is constructed to control an abnormality detection local frequency setting means 32 by an abnormality detection controlling means 33 such that a pilot signal being input from an abnormality detecting means input terminal 29 can be converted into an abnormality detection intermediate frequency signal by an abnormality detection frequency converting means 30, and then set a frequency of an abnormality detection local frequency signal being output from an abnormality detection local frequency generating means 31.

Unnecessary signals are removed from the pilot signal, which is converted into the abnormality detection intermediate frequency signal, by an abnormality detection intermediate frequency filter 34, and then such pilot signal is detected by an abnormality detection detecting means 35 to output a detected voltage. This detected voltage is sampled by an abnormality detection sampling means 36. Then, this sampled information are stored into an abnormality detection sampling storing means 37 which is controlled by the abnormality detection controlling means 33.

An abnormality detection comparing means 38 is controlled by the abnormality detection controlling means 33 to compare the result stored in the abnormality detection sampling storing means 37 with an abnormality detection reference value. Therefore, the abnormality detection comparing means 38 can measure levels of the pilot signals having any one frequency or more, and then compare with each other to thus detect the abnormality.

Also, in the event that the pilot signals having a plurality of frequencies are input, the abnormality can be detected based on relative values since such relative values can be measured by comparing mutual detected voltages of the pilot signals respectively.

According to the above operation, the abnormality detecting means which can detect the abnormality from the input pilot signal can be constructed.

Figure 3:
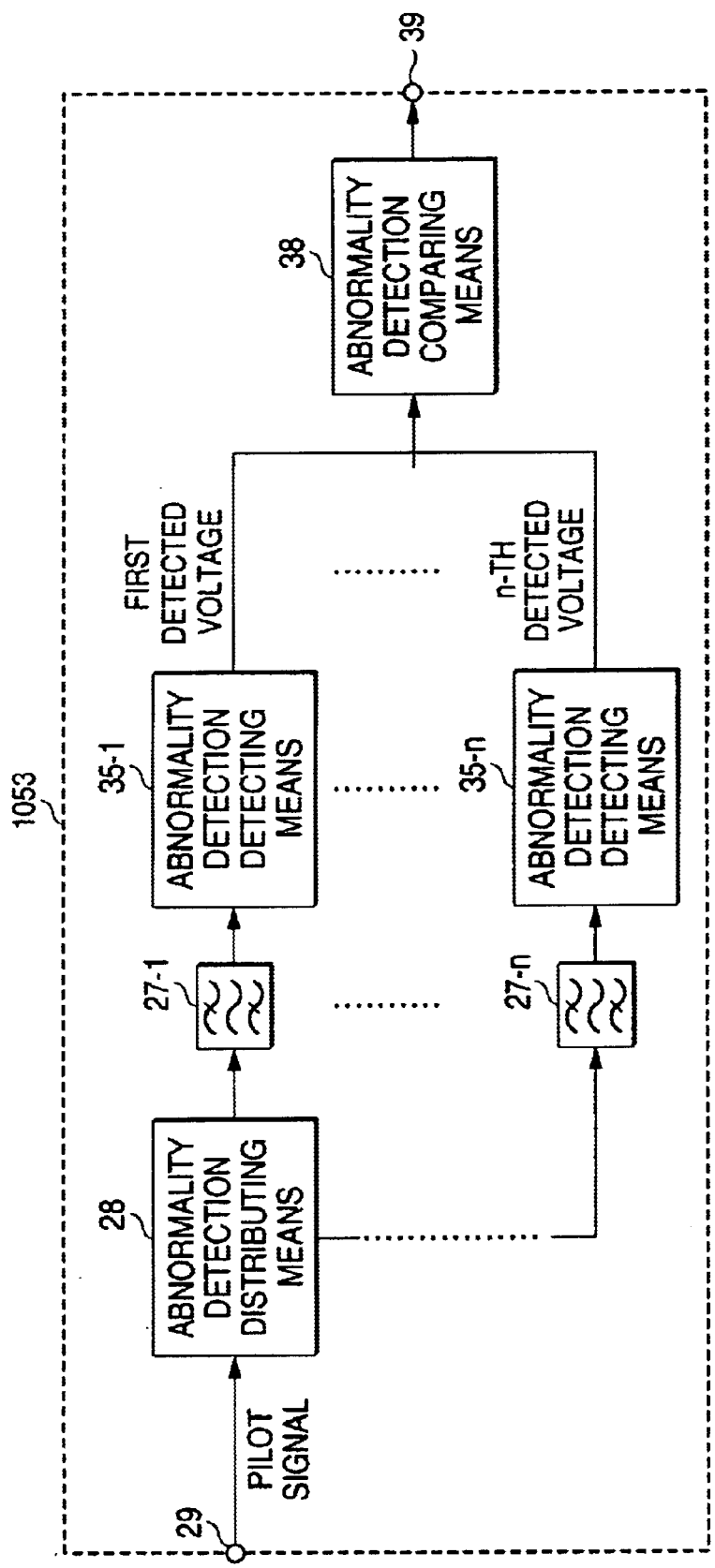
FIG. 3 is a block diagram showing a configuration of another example of the abnormality detecting means in FIG. 1.

Also, another example of a block diagram of a configuration of the abnormality detecting means 1053 is shown in FIG. 3. First to n-th pilot signals being input from the abnormality detecting means input terminal 29 are n-distributed by the abnormality detection distributing means 28. The n-distributed pilot signals are input into the first to n-th abnormality detection pilot filters 27 (27-1 to 27-n) respectively. Output signals of the filters 27 are input into the first to n-th abnormality detection detecting means 35 (35-1 to 35-n) respectively, and then the abnormality detection detecting means 35 output the first to n-th detected voltages of respective pilot signals.

The abnormality detection can be carried out by the abnormality detection comparing means 38 and an abnormality detection signal output terminal 39. The abnormality detection comparing means 38 compares the detected voltages with a reference voltage being output from an abnormality detection reference voltage source and then outputs an abnormality detection signal when it detects the abnormality.

From the above description, it is understood that, when a plurality of pilot signals are input, respective signal levels of the pilot signals can be measured and compared with each other and thus the abnormality detection can be achieved based on the pilot signals being input from the abnormality detecting means input terminal 29. This configuration can always perform the measurement of the pilot signals rather than a configuration of the above abnormality detecting means, nevertheless it must be distributed into systems of the same number as the frequency types of the pilot signals.

An operation of the configuration of the present invention will be explained with reference to FIG. 1 hereinafter. In the outdoor receiving unit 109, the receiving signal frf input from the input terminal 1 is band-passed by the receiving filter 2 and then input into the first adding means 3a. The first pilot signal of the frequency f1, which is output from the first pilot signal generating means 7a, is also input into the first adding means 3a. The signal being output from the first adding means 3a is amplified by the receiving amplifier 4 and then input into the second adding means 3b. The second pilot signal of the frequency f2, which is output from the second pilot signal generating means 7b, is also input into the second adding means 3b, and then output to the outdoor receiving unit output terminal 6.

In this event, the signal which is output from the outdoor receiving unit output terminal 6 is a synthesis signal which contains a receiving signal frf component, a frequency f1 component, and a frequency f2 component. This synthesis signal is transmitted to the main apparatus input terminal 50 via the transmitting means 19.

In the main apparatus 160, the receiving signal frf component of the signal being input from the main apparatus input terminal 50 is output to the receiving means 52 by the main apparatus branch-filtering means 51, and also the frequency f1 component and the frequency f2 component are output to the abnormality detecting means 1053. In case the abnormality in relative values of the levels of the first pilot signal and the second pilot signal is detected, the abnormality detection signal can be output by the abnormality detecting means 1053.

FIGS. 4 to 7 are characteristic views showing relative values of level of first and second pilot signals which are input into the abnormality detecting means 1053. In the following explanation, the first pilot signal being output from the outdoor receiving unit output terminal 6 is identical in level to the second pilot signal during the normal operation, and a frequency characteristic of the gain from the outdoor receiving unit output terminal 6 to the abnormality detecting means 1053 is set to have the same condition.

Figure 4:
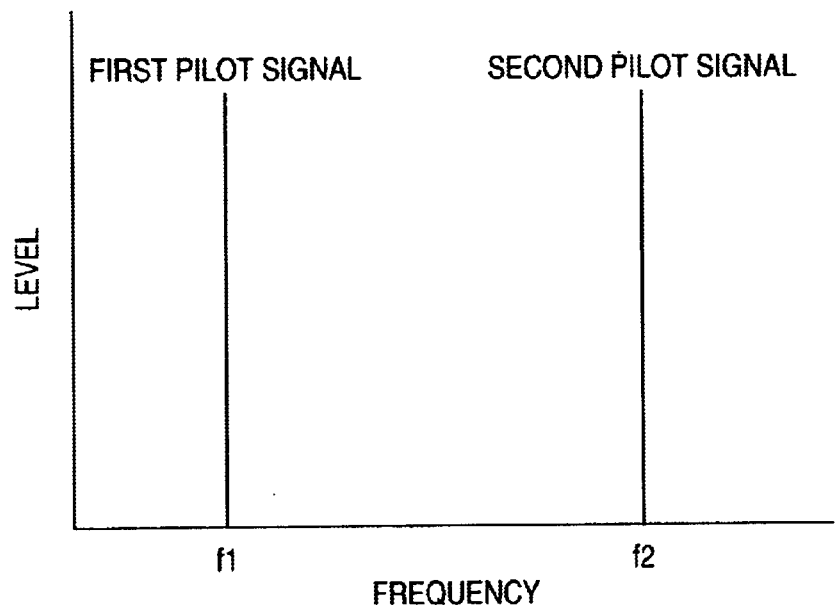
FIG. 4 is a characteristic view showing first and second pilot signals in normal operation.

FIG. 4 shows such a situation that, since the level of two pilot signals being input into the abnormality detecting means 1053 are identical, the outdoor receiving unit 109 and the transmitting means 19 are now operating properly.

Figure 5:
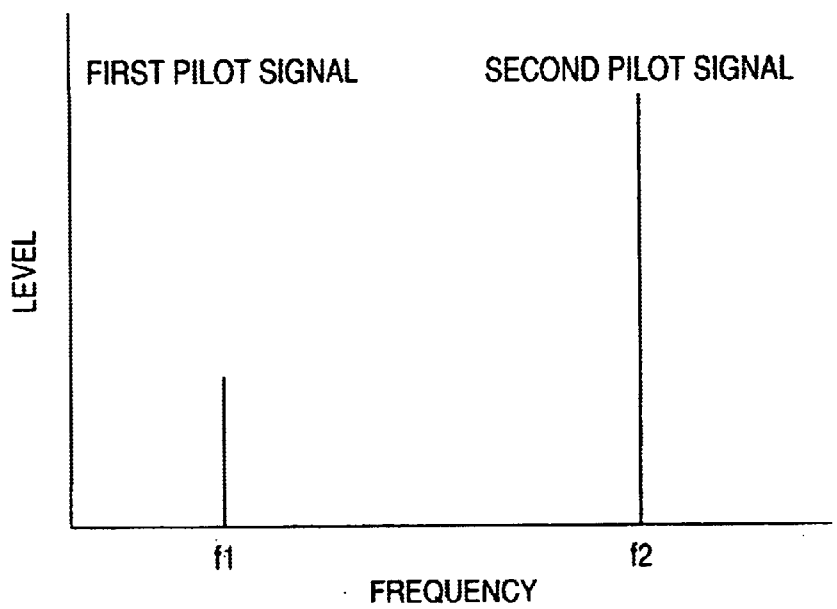
FIG. 5 is a characteristic view showing the first and second pilot signals at the time when a gain of receiving amplifier is reduced.

FIG. 5 shows such a situation that, since the level of the first pilot signal being input into the abnormality detecting means 1053 is lower than that of its normal operation but the level of the second pilot signal is identical to that of its normal operation, a relative difference is caused between both signals. In this case, this situation indicates that the failure to reduce a gain is caused in the receiving amplifier 4.

More particularly, when the gain of receiving amplifier 4 is reduced, the level of the first pilot signal being output from the outdoor receiving unit output terminal 6 is lowered rather than the level in the normal operation, but the level of the second pilot signal is not lowered. Accordingly, if there is no trouble in the transmitting means 19 and the main apparatus branch-filtering means 51, relative values of the levels of the first pilot signal and the second pilot signal being input into the abnormality detecting means 1053 are identical to a relative value at the outdoor receiving unit output terminal 6. Therefore, it can be detected that the failure to reduce its gain is caused in the receiving amplifier 4.

Figure 6:
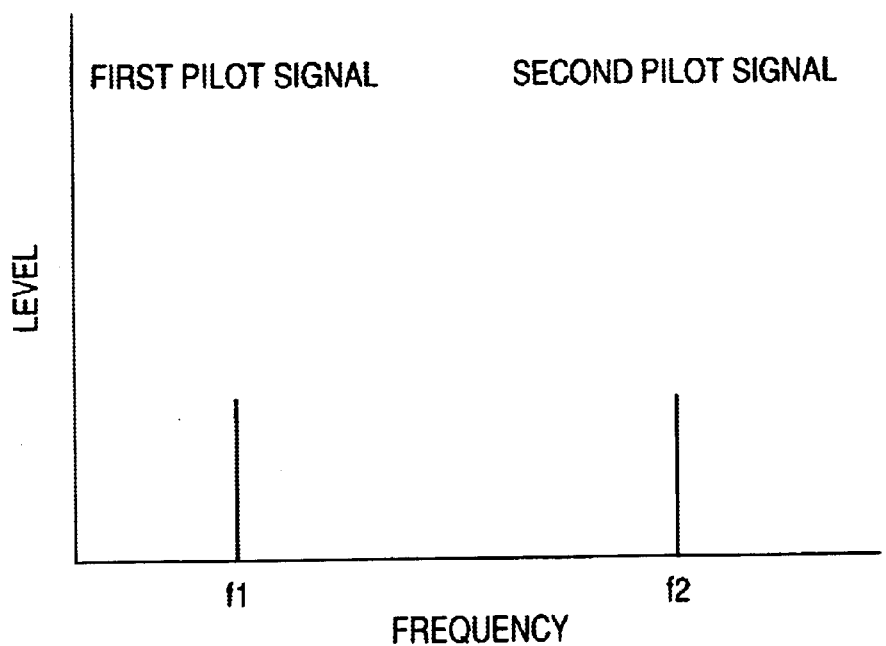
FIG. 6 is a characteristic view showing first and second pilot signals at the time when a transmitting means is disconnected.

FIG. 6 shows such a situation that there is no relative level difference between the first and second pilot signals being input into the abnormality detecting means 1053 but such relative level is lower than that in the normal operation. In this case, this situation indicates that, because of disconnection of the transmitting means 19, etc., the gain obtained from the outdoor receiving unit output terminal 6 to the abnormality detecting means 1053 is lowered.

More particularly, if the gain of the receiving amplifier 4 is normal, the levels of the first and second pilot signals being output from the outdoor receiving unit output terminal 6 are identical. However, if the gain obtained from the outdoor receiving unit output terminal 6 to the abnormality detecting means 1053 is lowered due to the disconnection of the transmitting means 19, etc., both the level of the first pilot signal and the level of the second pilot signal which are input into the abnormality detecting means 1053 is lowered by the same level as reduction in the gain obtained from the outdoor receiving unit output terminal 6 to the abnormality detecting means 1053.

In this manner, if reduction in the detected voltage of the first pilot signal and the detected voltage of the second pilot signal can be detected by the same amount rather than those in the normal operation respectively, it can be detected that the gain obtained from the outdoor receiving unit output terminal 6 to the abnormality detecting means 1053 has been reduced.

Figure 7:
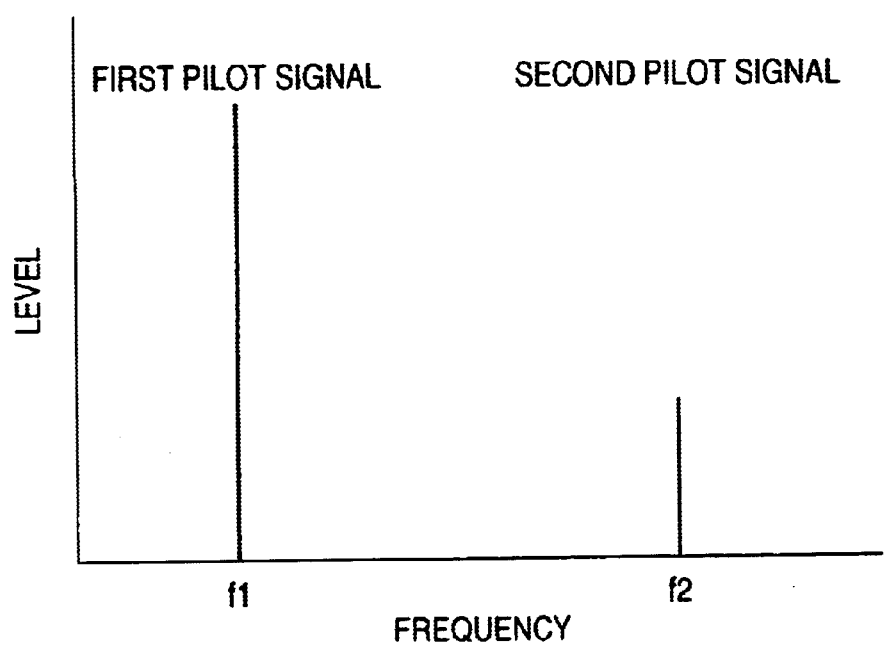
FIG. 7 is a characteristic view showing the first and second pilot signals at the time when a second pilot signal generating means is broken down.

FIG. 7 shows such a situation that, since the level of the first pilot signal being input into the abnormality detecting means 1053 is identical to that in the normal operation but the level of the second pilot signal is lower than that in the normal operation, relative difference in level is generated between both pilot signals. In this case, this situation indicates that, because the second pilot signal generating means 7b is broken down and thus the level of the second pilot signal added by the second adding means 3b is lowered, the level of the second pilot signal being output from the outdoor receiving unit output terminal 6 has been reduced.

At this time, if the frequency characteristic of the gain from the outdoor receiving unit output terminal 6 to the abnormality detecting means 1053 is kept constant, relative values of the level of the first pilot signal and the level of the second pilot signal being input into the abnormality detecting means 1053 are identical to relative values in the outdoor receiving unit output terminal 6.

In the abnormality detecting means 1053, reduction in the second pilot signal can be detected by comparing the detected voltage of the first pilot signal with the detected voltage of the second pilot signal because the detected voltage of the second pilot signal is lowered and shifted from the relative values of the detected voltage of the first pilot signal and the detected voltage of the second pilot signal in the normal operation.

In this fashion, if the first pilot signal is normal but the level of the second pilot signal is decreased, an injection level of the second pilot signal is low. Therefore, it can be detected that the second pilot signal generating means 7b has been broken down.

Also, in the normal operation, if the levels of the first pilot signal and the second pilot signal being output from the outdoor receiving unit output terminal 6 are not equal to each other and also the relative values of the levels of both pilot signals are set arbitrarily, the abnormality can be detected based on change in the relative values of the detected voltages of both pilot signals in the abnormality detecting means 1053.

In addition, unless the frequency characteristic of the gain from the outdoor receiving unit output terminal 6 to the abnormality detecting means 1053 is equal, the abnormality can be detected based on change in the relative values of the detected voltages of both pilot signals in the abnormality detecting means 1053.

With the above description, the receiving apparatus can be provided in which no consideration of difference in the insertion loss due to the length of the transmitting means 19 should be taken because the measurement using absolute values is not needed as the method of measuring the reduction in the gain and which can measure precisely the gain of the receiving amplifier 4 because the gain of the receiving amplifier 4 can be detected precisely as the relative values of the levels of the first pilot signal and the second pilot signal.

In this case, the levels of the first pilot signal component and the second pilot signal component, which are output the outdoor receiving unit output terminal 6, may be set to a level at which no saturation of the circuit is caused or a receiving sensitivity is not deteriorated when the receiving signal is received. Also, in selecting the frequency f1 of the first pilot signal and the frequency f2 of the second pilot signal, it is effective to avoid as much as possible such frequencies which causes degradation of the receiving performance, e.g., the frequency which causes intermodulation distortion of the signals, etc. if their intermodulation distortion, a receiving spurious point of the receiving means 52, and a radio signal of a strong electric field level are present.

In the case that the first pilot signal generating means 7a and the second pilot signal generating means 7b which have the equivalent temperature characteristics and the equivalent power supply voltage characteristics with respect to the signal level are employed, the accuracy in measuring the gain can be improved in the main apparatus rather than the case where only the absolute value of the level of one pilot signal can be measured since such gain of the receiving amplifier is measured based on the relative values.

Embodiment 2

Figure 8:
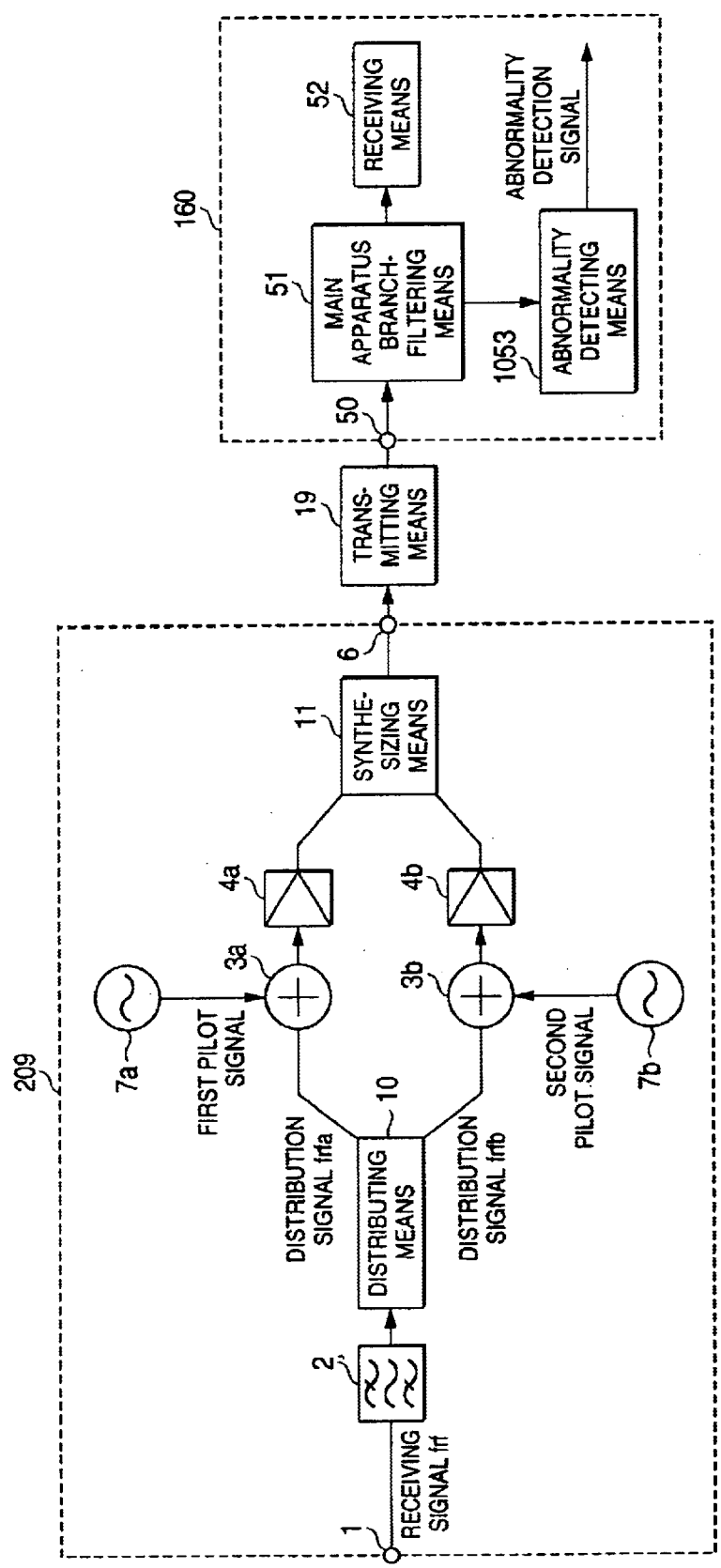
FIG. 8 is a block diagram showing a configuration of a receiving apparatus according to an embodiment 2 of the present invention.

A basic configuration of a receiving apparatus according to an embodiment 2 is shown in FIG. 8. The receiving apparatus according to the embodiment 2 comprises an outdoor receiving unit 209, the main apparatus 160 having the abnormality detecting means 1053 for detecting the abnormality of the outdoor receiving unit 209 by using the pilot signals, and the transmitting means 19 for transmitting a signal output from the outdoor receiving unit 209 to the main apparatus 160.

The outdoor receiving unit 209 comprises the outdoor receiving unit input terminal 1, the receiving filter 2, a distributing means 10, the first pilot signal generating means 7a, the first adding means 3a, a first receiving amplifier 4a, a synthesizing means 11, the second pilot signal generating means 7b, the second adding means 3b, a second receiving amplifier 4b, and the outdoor receiving unit output terminal 6.

Where the distributing means and the synthesizing means correspond to a directional coupler or a distribution synthesizer for distributing and synthesizing a high frequency signal, for example.

The main apparatus 160 comprises the main apparatus input terminal 50, the main apparatus branch-filtering means 51, the receiving means 52, and the abnormality detecting means 1053. In the outdoor receiving unit 209, a receiving signal frf input from the input terminal 1 is band-passed by the receiving filter 2 and then input into the distributing means 10. The first pilot signal, which is output from the first pilot signal generating means 7a and has the frequency f1, is added to a first distribution signal frfa, which is distributed by the distributing means 10, by the first adding means 3a.

This added signal is amplified by the first receiving amplifier 4a and then input into the synthesizing means 11. Similarly, the second pilot signal, which is output from the second pilot signal generating means 7b and has the frequency f2, is added to a second distribution signal frfb, which is distributed by the distributing means 10, by the second adding means 3b, then amplified by the second receiving amplifier 4b, and then input into the synthesizing means 11.

A signal synthesized by the synthesizing means 11 has an amplified receiving signal frf component, a frequency f1 component, and a frequency f2 component, and is output to the outdoor receiving unit output terminal 6. At this time, a level of the signal being output to the outdoor receiving unit output terminal 6 is designed such that levels of the frequency f1 component and the frequency f2 component can be set to the same level or predetermined relative levels under the condition the first receiving amplifier 4a and the second receiving amplifier 4b are normally operated respectively.

The signal being output from the outdoor receiving unit output terminal 6 is transmitted to the main apparatus 160 via the transmitting means 19.

Like the embodiment 1, relative values of the gains of the first receiving amplifier 4a and the second receiving amplifier 4b can be measured by comparing the first pilot signal with the second pilot signal in level by using the abnormality detecting means 1053 being installed in the main apparatus 160.

With the above, the receiving apparatus can be provided which is capable of measuring precisely the gain of the receiving amplifier.

Embodiment 3

Figure 9:
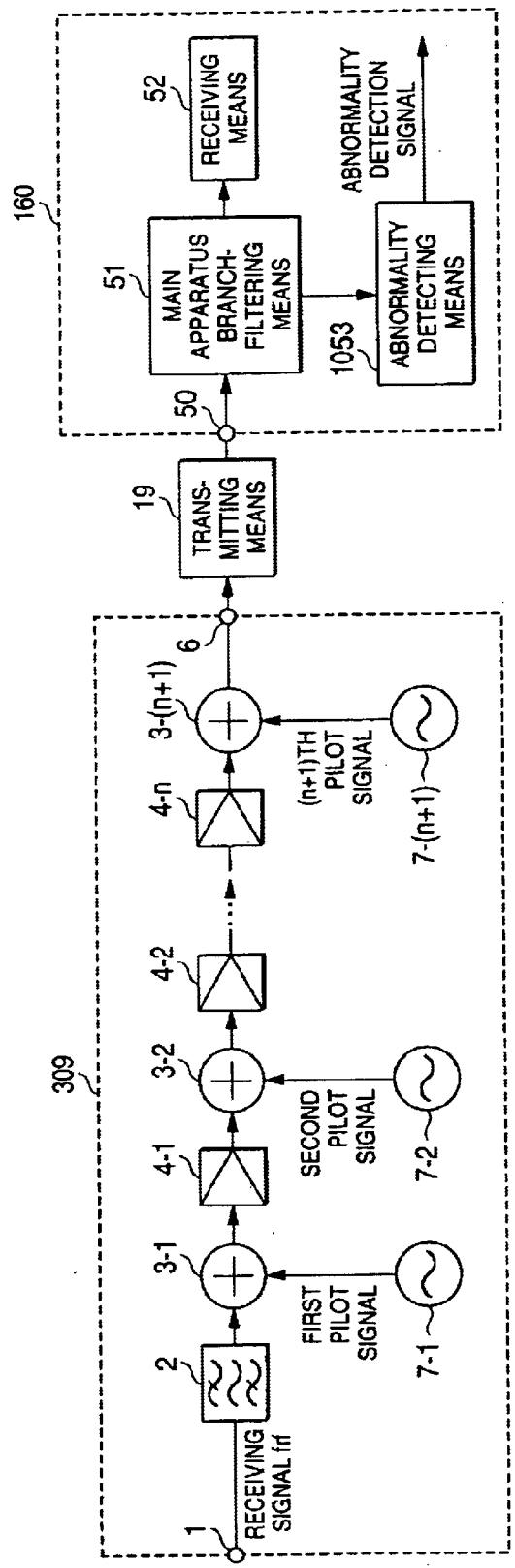
FIG. 9 is a block diagram showing a configuration of a receiving apparatus according to an embodiment 3 of the present invention.

A basic configuration of a receiving apparatus according to an embodiment 3 is shown in FIG. 9. The receiving apparatus according to the embodiment 3 comprises an outdoor receiving unit 309, the main apparatus 160 having the abnormality detecting means 1053 for detecting the abnormality of the outdoor receiving unit 309 by using the pilot signals, and the transmitting means 19 for transmitting the signal output from the outdoor receiving unit 309 to the main apparatus 160.

The outdoor receiving unit 309 comprises the outdoor receiving unit input terminal 1, the receiving filter 2, first to n-th adding means 3 (3-1 to 3-n), first to n-th pilot signal generating means 7 (7-1 to 7-n), first to n-th receiving amplifiers 4 (4-1 to 4-n), an n+1-th adding means 3 (3-n+1), an n+1-th pilot signal generating means 7 (7-n+1), and the outdoor receiving unit output terminal 6.

The main apparatus 160 comprises the main apparatus input terminal 50, the main apparatus branch-filtering means 51, the receiving means 52, and the abnormality detecting means 1053.

In the outdoor receiving unit 309, the receiving signal frf input from the outdoor receiving unit input terminal 1 is band-passed by the receiving filter 2 and then input into the first adding means 3-1. The first pilot signal, which is output from the first pilot signal generating means 7-1 and has the first pilot signal frequency f1, is added to the receiving signal frf by the first adding means 3-1. This added signal is input into the first receiving amplifier 4-1 and then input into the second adding means 3-2.

Similarly, the n-th pilot signal which is output from the n-th pilot signal generating means 7-n is input into the n-th adding means 3-n. The n+1-th adding means 3-n+1 is connected to the output side of the n-th receiving amplifier 4-n. The n+1-th pilot signal, which is output from the n+1-th pilot signal generating means 7-n+1, is added to the receiving signal, and then an added signal is output from the outdoor receiving unit output terminal 6.

For example, if respective pilot signals are designed to have the same level at the outdoor receiving unit output terminal 6, the detected voltages of respective pilot signals become equal in normal operation in the abnormality detecting means 1053 installed in the main apparatus 160.

However, for instance, if the gain of the third receiving amplifier 4-3 serving as the third-stage amplifier is reduced by 3 dB, levels of the first to third pilot signals are lowered rather than those of the fourth to n+1-th pilot signals in the abnormality detecting means 1053 by the same level as reduction in the gain of the third receiving amplifier 4-3.

At the same time, if the gain of the first receiving amplifier 4-1 serving as the first-stage amplifier is also reduced by 5 dB, the levels of the second and third pilot signals are identical in the abnormality detecting means 1053, but the level of the first pilot signal is further reduced from these levels by 5 dB.

Accordingly, if the levels of respective pilot signals are compared with each other in the abnormality detecting means 1053, it can be detected at which stage the gain of the amplifier is reduced.

From the above description, the receiving apparatus can be provided which is able to detect at which stage and how much the gain of the amplifier in the multi-stage receiving amplifier has been reduced, on the main apparatus side based on relative values of the measured levels of respective pilot signals.

In this case, for example, even in the case that reduction in the total gain of the overall receiving amplifiers is 3 dB, the noise figure of the overall receiving apparatus is different according to that either the gain of the first-stage amplifier, which has a significant influence on the noise figure of the receiving apparatus, is reduced or the gain of the succeeding stage amplifier is reduced. However, according to the receiving apparatus of the embodiment 3, since it can be detected at which stage amplifier and how much the gain reduction has been caused, it can be grasped to which extent the reduction in the radio quality has been generated.

Embodiment 4

Figure 10:
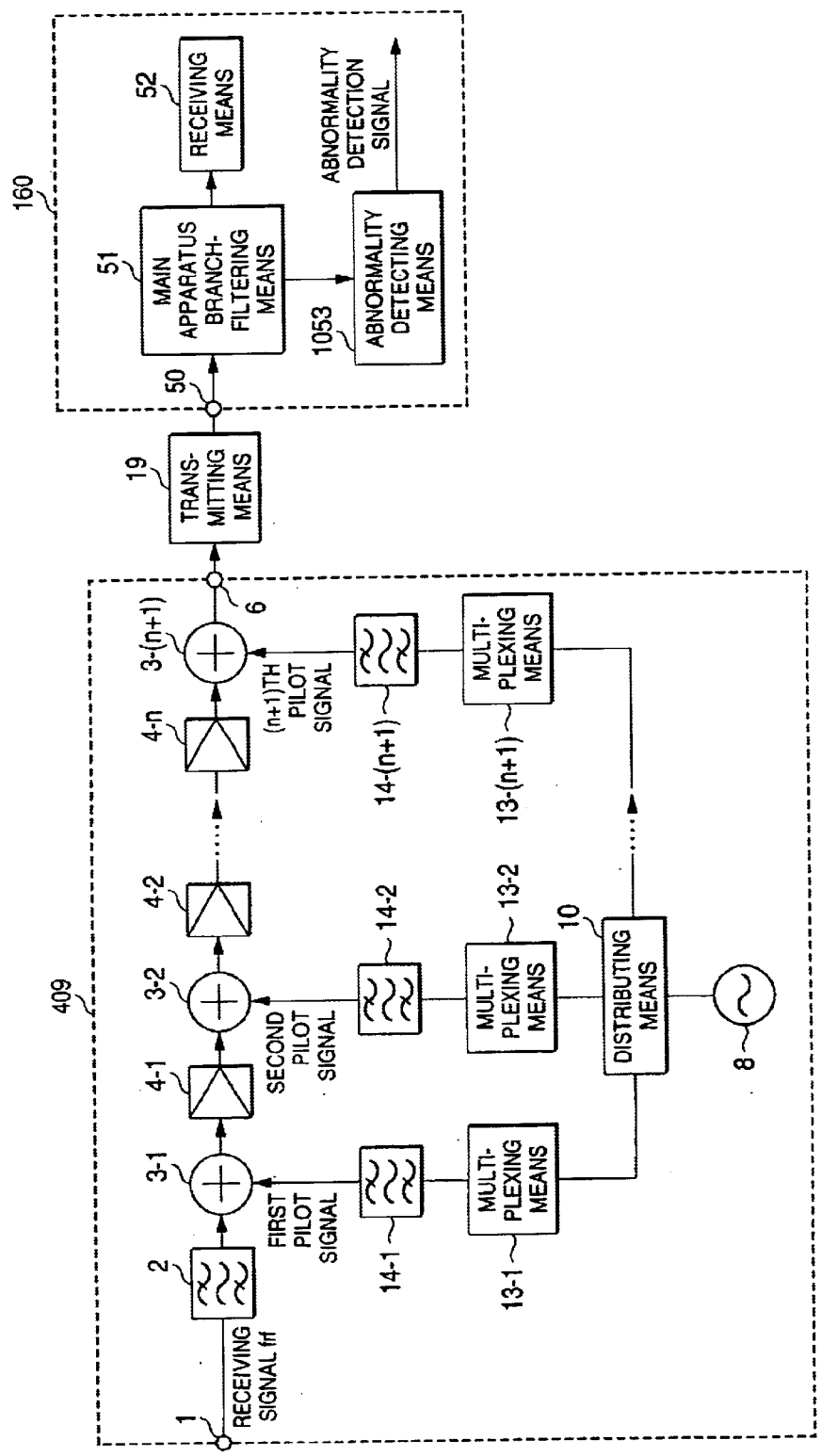
FIG. 10 is a block diagram showing a configuration of a receiving apparatus according to an embodiment 4 of the present invention.

A basic configuration of a receiving apparatus according to an embodiment 4 is shown in FIG. 10. The receiving apparatus according to the embodiment 4 comprises an outdoor receiving unit 409 which employs n+1 pilot signals of different frequencies, the main apparatus 160 having the abnormality detecting means 1053 for detecting the abnormality of the outdoor receiving unit 409 by using the pilot signals, and the transmitting means 19 for transmitting the signal output from the outdoor receiving unit 409 to the main apparatus 160.

The outdoor receiving unit 409 is an outdoor receiving unit in which, for example, the receiving amplifiers in the above-mentioned outdoor receiving unit 309 are constructed as n-stage amplifiers and which needs the pilot signals of n+1 type frequencies. The outdoor receiving unit 409 comprises the outdoor receiving unit input terminal 1, the receiving filter 2, first to n+1-th adding means 3 (3-1 to 3-n+1), a reference frequency signal generating means 8, the distributing means 10, first to n+1-th multiplexing means 13 (13-1 to 13-n+1) having different multiples respectively, first to n+1-th pilot filters 14 (14-1 to 14-n+1), first to n-th receiving amplifiers 4 (4-1 to 4-n), first to n-th adding means 3 (3-1 to 3-n) connected to the input sides of the receiving amplifiers 4 (4-1 to 4-n) respectively, an adding means 3-n+1 connected to the output side of the n-th amplifier 4-n, and the outdoor receiving unit output terminal 6 connected to the output side of the adding means 3-n+1.

Where the multiplexing means corresponds to a multiplexer which can multiplex the high frequency signal at any integral multiple, for example.

The main apparatus 160 comprises the main apparatus input terminal 50, the main apparatus branch-filtering means 51, the receiving means 52, and the abnormality detecting means 1053.

A signal being output from the reference frequency signal generating means 8 is distributed into n+1 components by the distributing means 10 to input into the first to n+1-th multiplexing means 13 respectively. Then, the first to n+1-th pilot signals having different frequencies can be derived by multiplexing these signals into different multiple numbers and then limiting such signals into a predetermined bandwidth by the first to n+1-th pilot filters 14 (14-1 to 14-n+1), through which defined frequencies are passed respectively, to thus remove unnecessary signals.

With the above, the receiving apparatus can be provided which has the means for generating a plurality of pilot signals with a simple configuration.

Embodiment 5

Figure 11:
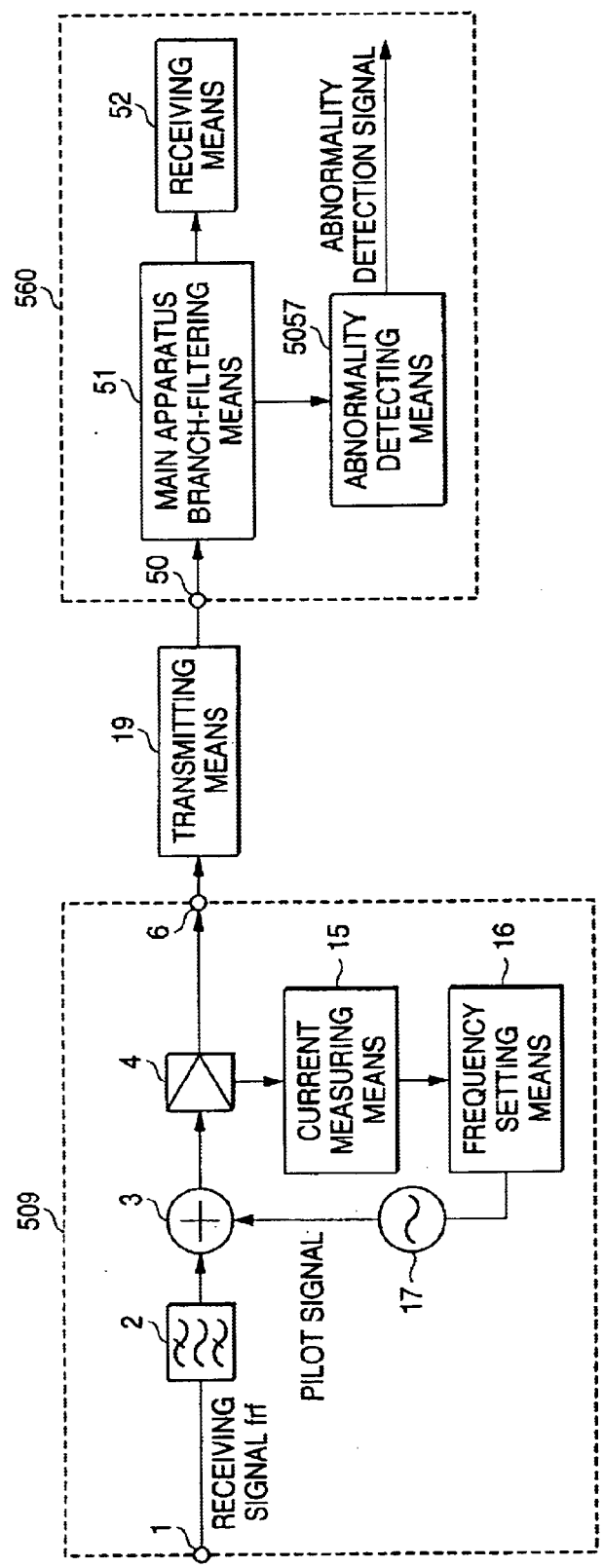
FIG. 11 is a block diagram showing a configuration of a receiving apparatus according to an embodiment 5 of the present invention.

A basic configuration of a receiving apparatus according to an embodiment 5 is shown in FIG. 11. The receiving apparatus according to the embodiment 5 comprises an outdoor receiving unit 509, a main apparatus 560 having an abnormality detecting means 5057 for detecting the abnormality of the outdoor receiving unit 509 by using a pilot signal, and the transmitting means 19 for transmitting the signal output from the outdoor receiving unit 509 to the main apparatus 560.

The outdoor receiving unit 509 comprises the outdoor receiving unit input terminal 1, the receiving filter 2, the adding means 3, the receiving amplifiers 4, a current measuring means 15, a frequency setting means 16, a frequency-variable pilot signal generating means 17, and the outdoor receiving unit output terminal 6.

Where the pilot signal generating means whose frequency can be controlled corresponds to a voltage-controlled oscillator or a frequency synthesizer using the voltage-controlled oscillator, for example. Also, the pilot signal frequency setting means corresponds to a frequency setting means having a means for generating the control voltage data for the voltage-controlled oscillator or the frequency setting data for the frequency synthesizer, for example. The current measuring means corresponds to a current measuring means for outputting a current measuring function and the result to the frequency setting means, for example.

The main apparatus 560 comprises the main apparatus input terminal 50, the main apparatus branch-filtering means 51, the receiving means 52, and the abnormality detecting means 5057.

Figure 12:
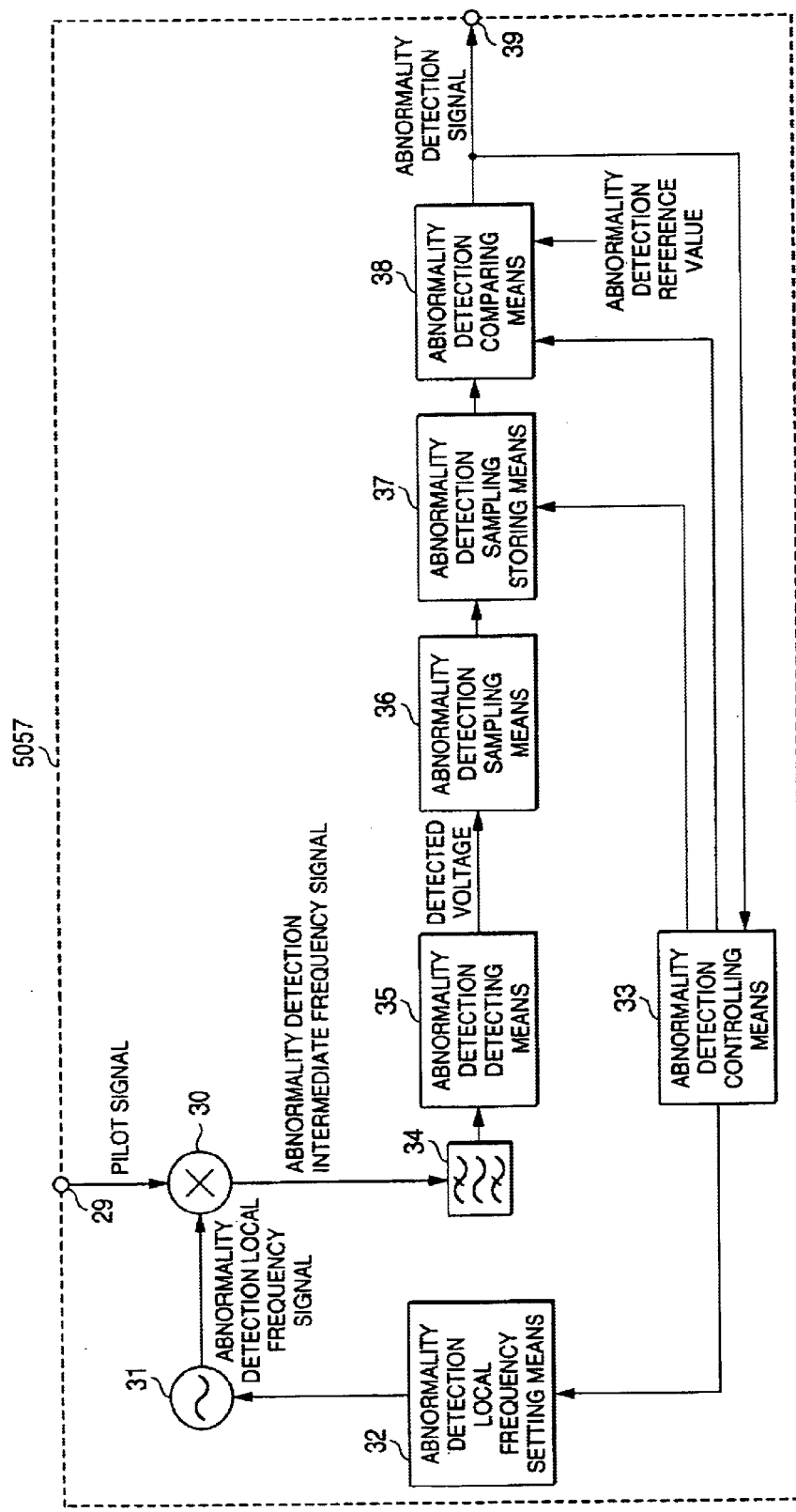
FIG. 12 is a block diagram showing a configuration of an example of an abnormality detecting means in FIG. 5.

A block diagram of a configuration of the abnormality detecting means 5057 is shown in FIG. 12. The abnormality detecting means 5057 is constructed so as to input the abnormality detection signal in the abnormality detecting means 1053 into an abnormality detection controlling means 33.

The pilot signal being input into the abnormality detecting means input terminal 29 changes its frequency according to the normal operation and the abnormality detecting operation.

In the normal operation, since the pilot signal being input from the abnormality detecting means input terminal 29 has a frequency in the normal operation, the abnormality detection detecting means 35 can output the pilot signal in the normal operation as the detected voltage if the abnormality detection local frequency signal whose frequency can be changed into the abnormality detection intermediate frequency is set by the abnormality detection local frequency setting means 32.

Here, since the signal is not contained in the frequency of the pilot signal in the normal operation when such frequency of the pilot signal is changed into the frequency in the abnormal operation, the detected voltage being output from the abnormality detection detecting means 35 is lowered. Thus, when it is detected that the detected voltage has been reduced lower than an abnormality detection reference value, the abnormality detection signal is output from the abnormality detection comparing means 38. Then, the abnormality detection local frequency is changed sequentially into the frequencies, at which the pilot signal is set in the abnormal operation, by the abnormality detection local frequency setting means 32 which is controlled by the abnormality detection controlling means 33 into which this abnormality detection signal is input.

Then, when the detected voltage of more than abnormality detection reference value is detected, the abnormality detection signal is changed from the state indicating the abnormal operation to the state indicating the normal operation. At this time, the frequency of the received pilot signal can be detected from the abnormality detection local frequency being set by the abnormality detection local frequency setting means 32.

According to the above operation, the abnormality detecting means 5057 can detect the abnormality by detecting the frequency of the pilot signal which can be set in answer to various failure modes.

When the frequency of the input pilot signal is working as the frequency which indicates the normal operation, the detected voltage of the pilot signal can be output from the abnormality detection detecting means 35 since the frequency of the abnormality detection local frequency signal is set to the frequency from which the pilot signal can be detected in the normal operation. In this case, when the frequency of the input pilot signal is changed, the detected voltage of the pilot signal is never output from the abnormality detection detecting means 35.

At this time, the abnormality detection local frequency from which the pilot signal which can be set when the abnormality is caused can be detected until the pilot signal is detected can be set by the abnormality detection local frequency setting means 32. Then, when the pilot signal is detected by the abnormality detection detecting means 35 and it is detected by the abnormality detection comparing means 38 that the pilot signal has been received, the abnormality information of the outdoor receiving unit can be detected since the frequency of the pilot signal can be detected from the abnormality detection local frequency.

The receiving signal frf which is input from the outdoor receiving unit input terminal 1 of the outdoor receiving unit 509 is band-passed by the receiving filter 2 and then input into the adding means 3. Also, the output signal of the frequency-variable pilot signal generating means 17, whose frequency is set by the frequency setting means 16, is input into the adding means 3. The output of the adding means 3 is input into the receiving amplifier 4. The current measuring means 15 measures the consumption current in the receiving amplifier 4, and then outputs a current information signal having information of the consumption current o the frequency setting means 16. At this time, for example, the frequency of the pilot signal is set based on specifications shown in Table 1.

TABLE 1

| consumption current of the amplifier | frequency of the pilot signal |
| --- | --- |
| large | f3 |
| normal | f2 |
| small | f1 |

The signal which is amplified by the receiving amplifier 4 corresponds to the synthesis signal of the receiving signal frf and the pilot signal controlled by information of the consumption current in the receiving amplifier. The output signal of the receiving amplifier 4 is output from the outdoor receiving unit output terminal 6 and then transmitted to the main apparatus input terminal 50 via the transmitting means 19.

The signal which is input into the main apparatus input terminal 50 is branched into a receiving signal frf component and a pilot signal component by the main apparatus branch-filtering means 51. The receiving signal frf component is then input into the receiving means 52. The pilot signal component is then input into the abnormality detecting means 5057. In case the pilot signal has the frequency indicating the abnormality, the abnormality detecting means 5057 then outputs the abnormality detection signal.

With the above description, the receiving apparatus can be provided which can detect the abnormality of the consumption current in the receiving amplifier in the main apparatus 560 by using the abnormality detection signal being output from the abnormality detecting means 5057.

In this case, even if the adding means 3 which adds the pilot signal to the receiving signal is not connected to the input side of the receiving amplifier but to the output side so as to avoid reduction in the noise figure due to the insertion loss of the adding means 3, the similar advantage can be achieved.

As for the frequency setting of the pilot signal, for example, there are a method of selecting the frequency by using the PLL frequency synthesizer system as the configuration of the frequency setting means, a method of controlling the frequency in an analog fashion in accordance with the consumption current, or a method of selecting a frequency-dividing ratio of the variable prescaler.

If the PLL frequency synthesizer system is employed to set the frequency of the pilot signal, the frequency setting means 16 can be provided with simple configuration and controlling method, by providing a means for storing PLL set data of the predetermined frequencies shown in Table 1, for example, so as to enable the selecting means to select the frequency.

Embodiment 6

Figure 13:
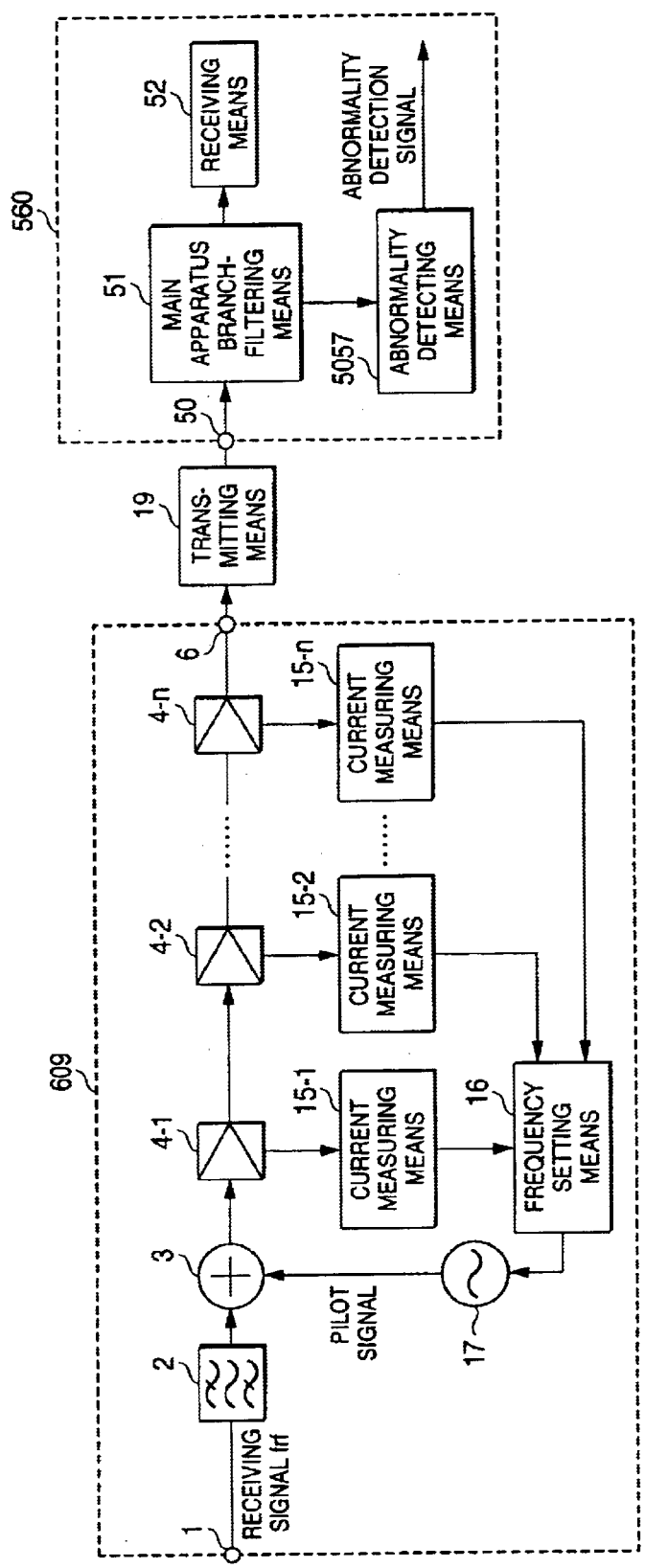
FIG. 13 is a block diagram showing a configuration of a receiving apparatus according to an embodiment 6 of the present invention.

A basic configuration of a receiving apparatus according to an embodiment 6 is shown in FIG. 13. The receiving apparatus according to the embodiment 6 comprises an outdoor receiving unit 609, the main apparatus 560 having the abnormality detecting means 5057 for detecting the abnormality of the outdoor receiving unit 609 by using the pilot signal, and the transmitting means 19 for transmitting the signal output from the outdoor receiving unit 609 to the main apparatus 560.

The outdoor receiving unit 609 comprises the outdoor receiving unit input terminal 1, the receiving filter 2, the adding means 3, receiving amplifiers 4 (4-1 to 4-n) composed of n-stage amplifiers, n current measuring means 15 (15-1 to 15-n), the frequency setting means 16, the frequency-variable pilot signal generating means 17, and the outdoor receiving unit output terminal 6.

The main apparatus 560 comprises the main apparatus input terminal 50, the main apparatus branch-filtering means 51, the receiving means 52, and the abnormality detecting means 5057.

The receiving signal frf input from the outdoor receiving unit input terminal 1 is band-passed by the receiving filter 2 and then input into the adding means 3. The pilot signal is output from the frequency-variable pilot signal generating means 17 whose frequency is set by the frequency setting means 16. Such pilot signal is also input into the first adding means 3 and then added to the receiving signal frf component.

This added signal is amplified by a plurality of amplifiers 4 and then output to the outdoor receiving unit output terminal 6. The frequency fp of the pilot signal is set by measuring respective consumption currents of a plurality of amplifiers 4 and then inputting measured result into the frequency setting means 16. An example of frequency setting is shown in Table 2.

TABLE 2

| | frequency change [kHz] | |
| --- | --- | --- |
| | small consumption current | large consumption current |
| 1-st amplifier | 128 | 64 |
| 2-nd amplifier | 32 | 16 |
| 3-rd amplifier | 8 | 4 |
| 4-th amplifier | 2 | 1 |

For example, the pilot frequency fp is set to f1 when the consumption currents of all amplifiers are normal. Here, the case will be considered where the consumption current of the first stage amplifier is larger than a specified value but the consumption current of the fourth stage amplifier is smaller than a specified value.

If the frequency fp of the pilot signal is set in compliance with Table 2, the pilot signal having the frequency of "f1+64 kHz+2 kHz" is input into the adding means 3. At this time, since the frequency of the pilot signal is different from f1 in the normal operation, the amplifier through which the abnormal consumption current is passed can be identified based on the frequency of the pilot signal by the abnormality detecting means 5057 in the main apparatus 560.

According to the above description, the receiving apparatus can be provided which can identify the amplifier, through which the abnormal consumption current is passed, of the receiving amplifiers 4 consisting of the multi-stage amplifiers based on the abnormality detection signal which is output from the abnormality detecting means 5057 in the main apparatus 560.

As with an amount of frequency change, if an amount of frequency change is set larger in the amplifiers positioned at the more preceding stages as shown in Table 2, a degree of degradation of the receiving performance may also be given simply at the time of detecting the abnormality in the main apparatus 560, based on a degree of frequency deviation of the pilot signal.

Embodiment 7

Figure 14:
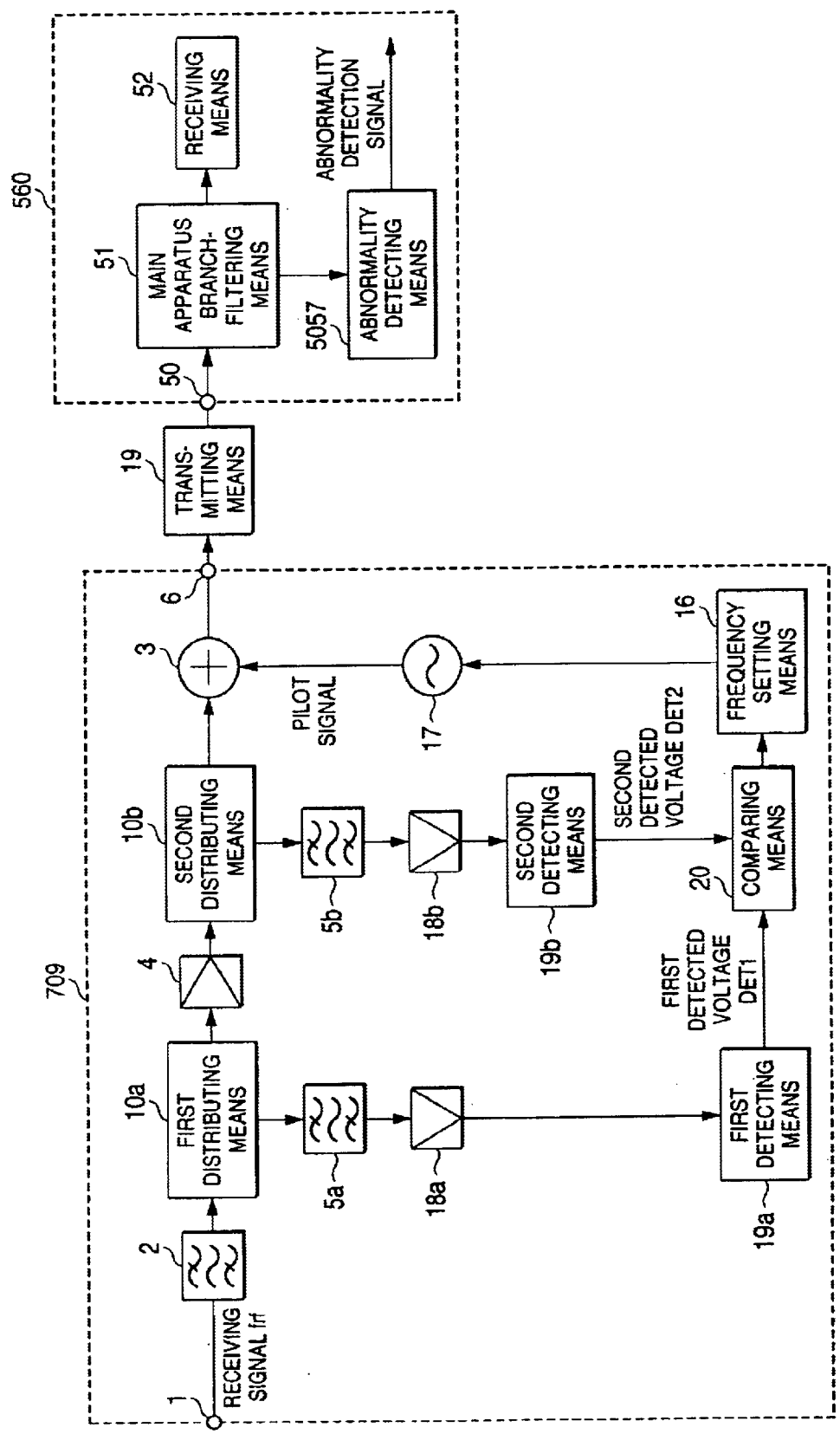
FIG. 14 is a block diagram showing a configuration of a receiving apparatus according to an embodiment 7 of the present invention.

A basic configuration of a receiving apparatus according to an embodiment 7 is shown in FIG. 14. The receiving apparatus according to the embodiment 7 comprises an outdoor receiving unit 709, the main apparatus 560 having the abnormality detecting means 5057 for detecting the abnormality of the outdoor receiving unit 709 by using the pilot signal, and the transmitting means 19 for transmitting the signal output from the outdoor receiving unit 709 to the main apparatus 560.

The outdoor receiving unit 709 comprises the outdoor receiving unit input terminal 1, the receiving filter 2, a first distributing means 10a, the receiving amplifiers 4, a second distributing means 10b, the adding means 3, the outdoor receiving unit output terminal 6, a first band-pass filter 5a, a first gain monitoring amplifier 18a, a first detecting means 19a, a comparing means 20, a second band-pass filter 5b, a second gain monitoring amplifier 18b, a second detecting means 19b, the frequency setting means 16, and the frequency-variable pilot signal generating means 17.

Where the band-pass filter corresponds to a filter which limits the passing signal in the frequency bandwidth of the receiving signal, for example. The gain monitoring amplifier corresponds to an amplifier which amplifies the high frequency signal, for example. The detecting means corresponds to a detector using a diode or a detector using a logarithmic amplifier, for example. The comparing means corresponds to a comparing means which has a voltage comparing means such as a comparator and a function of outputting the compared result to the pilot frequency setting means, for example.

The receiving signal frf input from the outdoor receiving unit input terminal 1 is band-passed by the receiving filter 2 and then input into the first distributing means 10a. One of the distributed signals is then amplified by the receiving amplifier 4 and then input into the second distributing means 10b. The distributed signal is then input into the adding means 3, and then added to the pilot signal. The pilot signal is output from the frequency-variable pilot signal generating means 17 which can output the pilot signal having the frequency fp set by the frequency setting means 16. The added signal is output from the outdoor receiving unit output terminal 6.

The other signal which is distributed by the first distributing means 10a is band-passed by the first band-pass filter 5a, then amplified by the first gain monitoring amplifier 18a up to a level which can be detected by the first detecting means 19a, and then detected by the first detecting means 19a to output a first detected signal DET1 to the comparing means 20.

Similarly, the other signal which is distributed by the second distributing means 10b is band-passed by the second band-pass filter 5b, then amplified by the second gain monitoring amplifier 18b up to a level which can be detected by the second detecting means 19b, and then detected by the second detecting means 19b to output a second detected signal DET2 to the comparing means 20. The first detected signal DET1 and the second detected signal DET2 are compared by the comparing means 20, and the result is input into the frequency setting means 16.

An example of the case is given in Table 3 where, if the first detected signal DET1 and the second detected signal DET2 are designed to have the same voltages under the condition the receiving amplifier 4 is normally operated, the frequency of the pilot signal is set by the frequency setting means 16.

TABLE 3

| relationship between detected voltages | set frequency of the pilot signal |
| --- | --- |
| DET1 > DET2 | f1 |
| DET1 = DET2 | f2 |
| DET1 < DET2 | f3 |

For example, if the gain of the receiving amplifier 4 is normal and the DET1 is equal to the DET2, the pilot signal having the frequency f2 can be detected by the abnormality detecting means 5057 of the main apparatus 560. However, if the gain of the receiving amplifier 4 is lowered and the DET1 becomes smaller than the DET2, the frequency of the pilot signal is set to f3 by the frequency setting means 16. When this frequency is detected by the abnormality detecting means 5057, it can be detected in the outdoor receiving unit 709 that the gain of the receiving amplifier 4 has been reduced.

With the above description, the receiving apparatus can be provided which can inform the main apparatus from the outdoor receiving unit of the abnormality of the gain of the receiving amplifier.

Since the DET1 and the DET2 have the same relative difference if the gain of the receiving amplifier is constant, the relationship between the DET1 and the DET2 can be detected by comparing their relative values by virtue of the comparing means 20 when the gain of the receiving amplifier is lowered.

Embodiment 8

Figure 15:
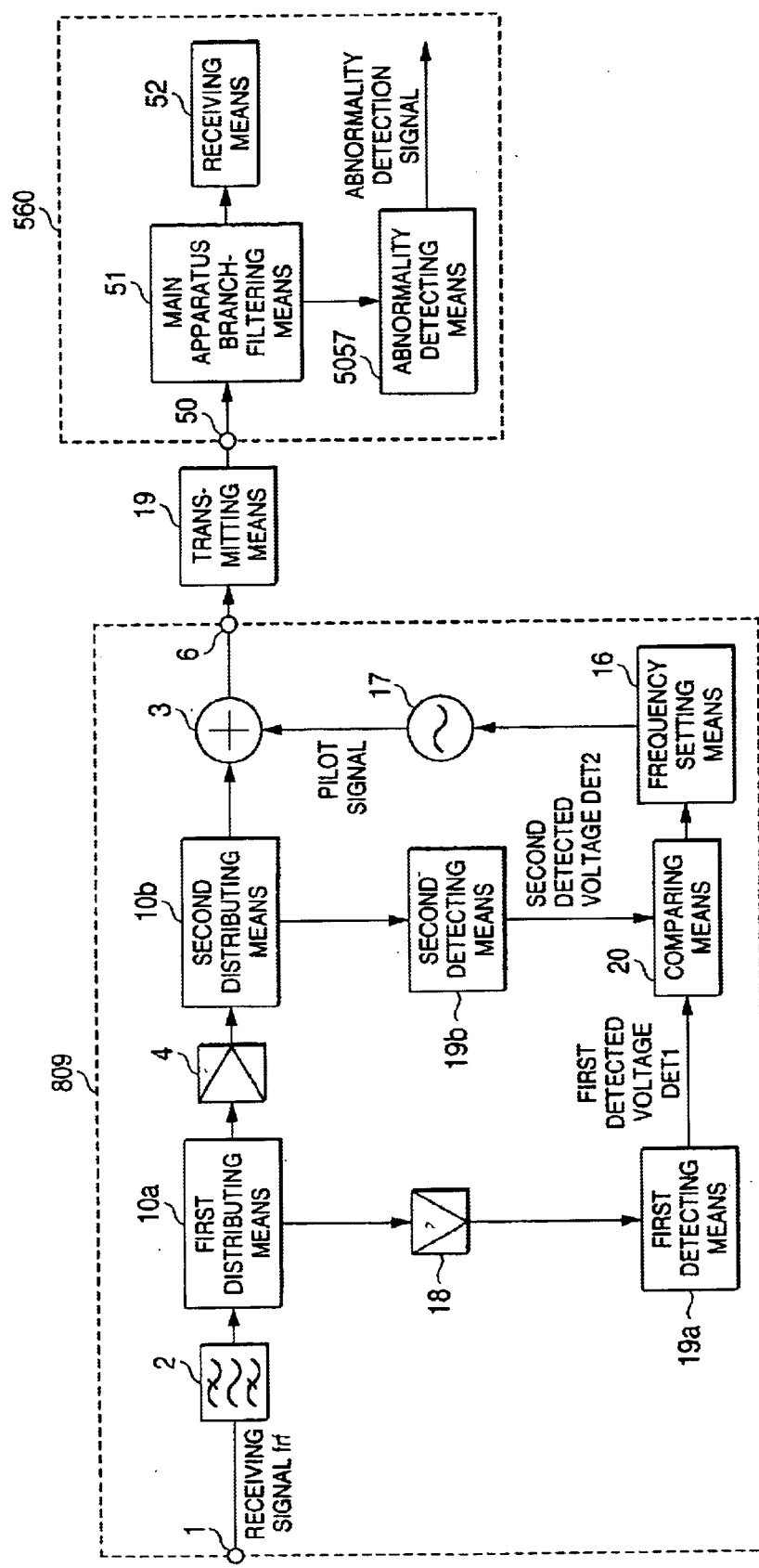
FIG. 15 is a block diagram showing a configuration of a receiving apparatus according to an embodiment 8 of the present invention.

A basic configuration of a receiving apparatus according to an embodiment 8 is shown in FIG. 15. The receiving apparatus according to the embodiment 8 comprises an outdoor receiving unit 809, the main apparatus 560 having the abnormality detecting means 5057 for detecting the abnormality of the outdoor receiving unit 809 by using the pilot signal, and the transmitting means 19 for transmitting the signal output from the outdoor receiving unit 809 to the main apparatus 560.

The outdoor receiving unit 809 comprises the outdoor receiving unit input terminal 1, the receiving filter 2, the first distributing means 10a, the receiving amplifiers 4, the second distributing means 10b, the adding means 3, the outdoor receiving unit output terminal 6, a gain monitoring amplifier 18, the first detecting means 19a, the comparing means 20, the second detecting means 19b, the frequency setting means 16, and the frequency-variable pilot signal generating means 17.

The receiving signal frf input from the outdoor receiving unit input terminal 1 is band-passed by the receiving filter 2 and then input into the first distributing means 10a. One of the distributed signals is then amplified by the receiving amplifier 4, and then input into the second distributing means 10b. The distributed signal is then input into the adding means 3, and then added to the pilot signal. The pilot signal is output from the frequency-variable pilot signal generating means 17 which can output the pilot signal having the frequency fp set by the frequency setting means 16. The added signal is output from the outdoor receiving unit output terminal 6.

The other signal which is distributed by the first distributing means 10a is amplified by the gain monitoring amplifier 18 which has the gain and the noise figure equivalent to those of the receiving amplifier 4. The output signal of the gain monitoring amplifier 18 is detected by the first detecting means 19a to output the first detected signal DET1 to the comparing means 20. The frequency fp of the pilot signal is set by the frequency setting means 16 in compliance with the compared result.

An example of the case is given in Table 4 where, if the first detected signal DET1 and the second detected signal DET2 are designed to have the same voltages under the condition the gain of the receiving amplifier 4 is normal, the frequency fp can be set.

TABLE 4

| relationship between detected voltages | set frequency of the pilot signal |
|---|---|
| DET1 > DET2 | f1 |
| DET1 = DET2 | f2 |
| DET1 < DET2 | f3 |

Since the gain monitoring amplifier 18 has the gain and the noise figure which are substantially identical to those of the receiving amplifier 4, an output level of the receiving amplifier 4 becomes equal to an output level of the gain monitoring amplifier 18 even if only the thermal noise is input from the outdoor receiving unit input terminal 1. Therefore, in case the signal having a level not to saturate the receiving amplifier 4 or the gain monitoring amplifier 18 is input, a signal having the almost same level can be output.

For example, if the gain of the receiving amplifier 4 is normal and the DET1 and the DET2 are equal to each other, the pilot signal having the frequency f2 can be detected in the main apparatus 560. However, if the gain of the receiving amplifier 4 is lowered and the DET1 becomes smaller than the DET2, the frequency of the pilot signal is set to f3 by the frequency setting means 16. When this frequency is detected in the main apparatus 560, it can be detected in the outdoor receiving unit 809 that the gain of the receiving amplifier 4 has been reduced.

Also, if a system for outputting the DET1 is broken down, the DET1 becomes smaller than the DET2 and then the frequency of the pilot signal is set to f1. Therefore, the failure of the system which outputs the DET1 can be detected by detecting the frequency f1 in the main apparatus 560.

With the above description, the receiving apparatus can be provided which can inform the main apparatus from the outdoor receiving unit of the abnormality of the gain of the receiving amplifier.

In this case, if there is provided a selecting means which can select the output of the receiving amplifier 4 or the output of the gain monitoring amplifier 18 as the receiving signal when it is detected by the comparing means 20 that the gain of the receiving amplifier 4 is lowered but the gain of the gain monitoring amplifier 18 is normal, such selecting means may be employed in place of the receiving amplifier 4.

Embodiment 9

Figure 16:
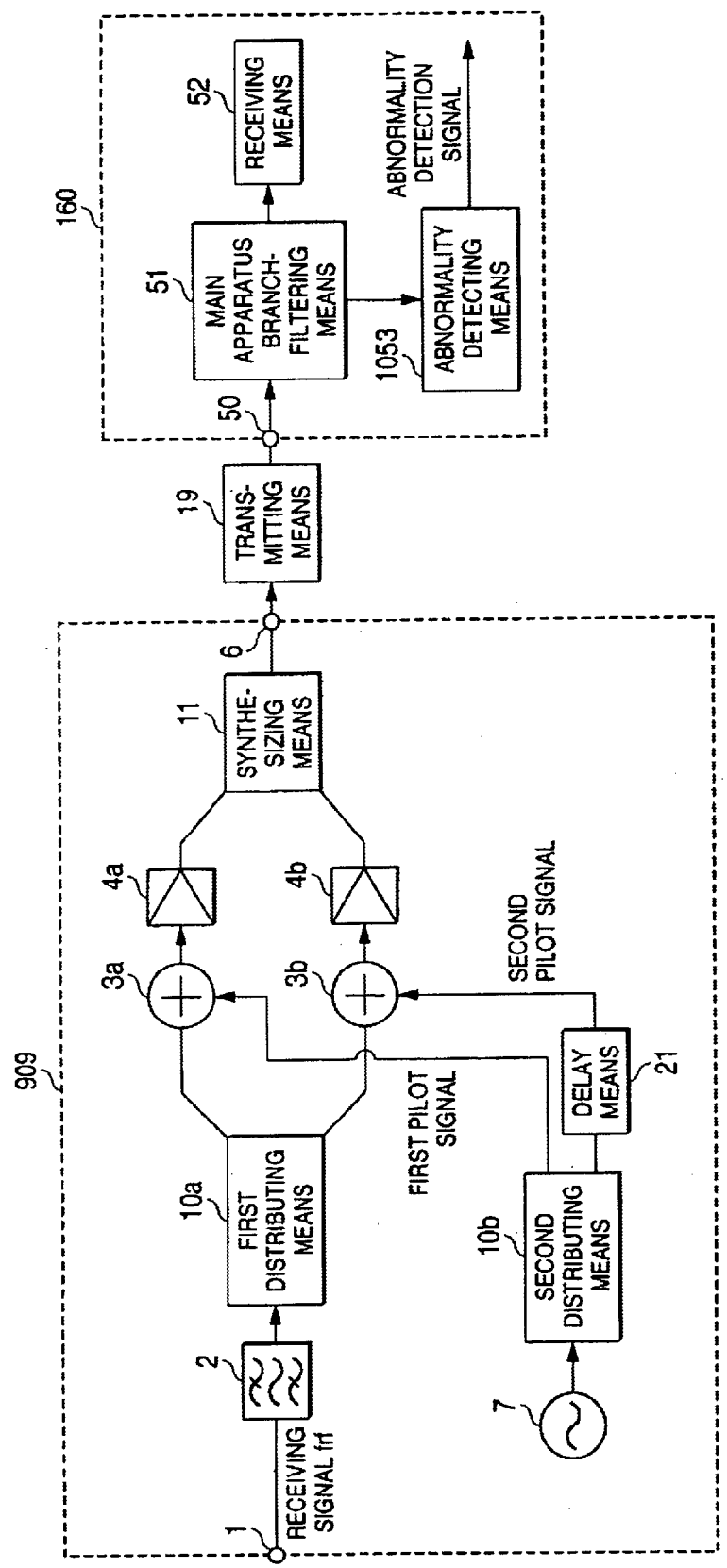
FIG. 16 is a block diagram showing a configuration of a receiving apparatus according to an embodiment 9 of the present invention.

A basic configuration of a receiving apparatus according to an embodiment 9 is shown in FIG. 16. The receiving apparatus according to the embodiment 9 comprises an outdoor receiving unit 909, the main apparatus 160 having the abnormality detecting means 1053 for detecting the abnormality of the outdoor receiving unit 909 by using the pilot signal, and the transmitting means 19 for transmitting the signal output from the outdoor receiving unit 909 to the main apparatus 160.

The outdoor receiving unit 909 comprises the outdoor receiving unit input terminal 1, the receiving filter 2, the first distributing means 10a, the first adding means 3a, the first receiving amplifier 4a, the synthesizing means 11, the outdoor receiving unit output terminal 6, the second adding means 3b, the second receiving amplifier 4b, the pilot signal generating means 7, the second distributing means 10b, and a delay means 21. Where the delay means 21 corresponds to a delay line or a delay filter which delays phase of the high frequency signal, for example.

The main apparatus 160 comprises the main apparatus input terminal 50, the main apparatus branch-filtering means 51, the receiving means 52, and the abnormality detecting means 1053.

The receiving signal frf input from the outdoor receiving unit input terminal 1 of the outdoor receiving unit 909 is band-passed by the receiving filter 2, and then distributed by the first distributing means 10a. One of the distributed signals is then input into the first adding means 3a, then added to the first pilot signal, and then amplified by the first receiving amplifier 4a. The other signal distributed by the first distributing means 10a is input into the second adding means 3b, then added to the second pilot signal, and then amplified by the second receiving amplifier 4b.

The output signals of the first receiving amplifier 4a and the second receiving amplifier 4b are synthesized by the synthesized by the synthesizing means 11, and then output from the outdoor receiving unit output terminal 6. The pilot signal being output from the pilot signal generating means 7 is distributed into the first pilot signal and the second pilot signal by the second distributing means 10b.

The first pilot signal is input into the first adding means 3a, and the second pilot signal is input into the second adding means 3b. If the first pilot signal and the second pilot signal are designed such that the first pilot signal component and the second pilot signal component are opposite in phase at the outdoor receiving unit output terminal 6 when the first receiving amplifier 4a and the second receiving amplifier 4b are normally operating respectively, these signal components can be canceled. Therefore, no pilot signal component is output from the outdoor receiving unit output terminal 6.

However, in case the gain of any one of the first receiving amplifier 4a and the second receiving amplifier 4b is reduced, the balance of the canceled pilot signal components is lost and thus the pilot signal component is output.

In this manner, if the pilot signal can be received by the abnormality detecting means 1053 because difference of the gain is caused between the first receiving amplifier 4a and the second receiving amplifier 4b, the abnormality of the gain of the receiving amplifier 4 in the outdoor receiving unit 909 can be detected by outputting the abnormality detection signal.

With the above description, the receiving apparatus can be provided which can monitor the gain of the receiving amplifier by using the pilot signals.

If the receiving amplifier 4 is operating normally, no signal is output from the outdoor receiving unit output terminal 6. Hence, no trouble is caused in the receiving means 52. As a result, there can be achieved such an advantage that degradation of the receiving performance due to the inputting of the pilot signals can be eliminated.

In this case, if the delay means 21 is inserted between the second distributing means 10b and the first adding means 3a to delay the first pilot signal, the same advantage as above can be achieved.

Embodiment 10

Figure 17:
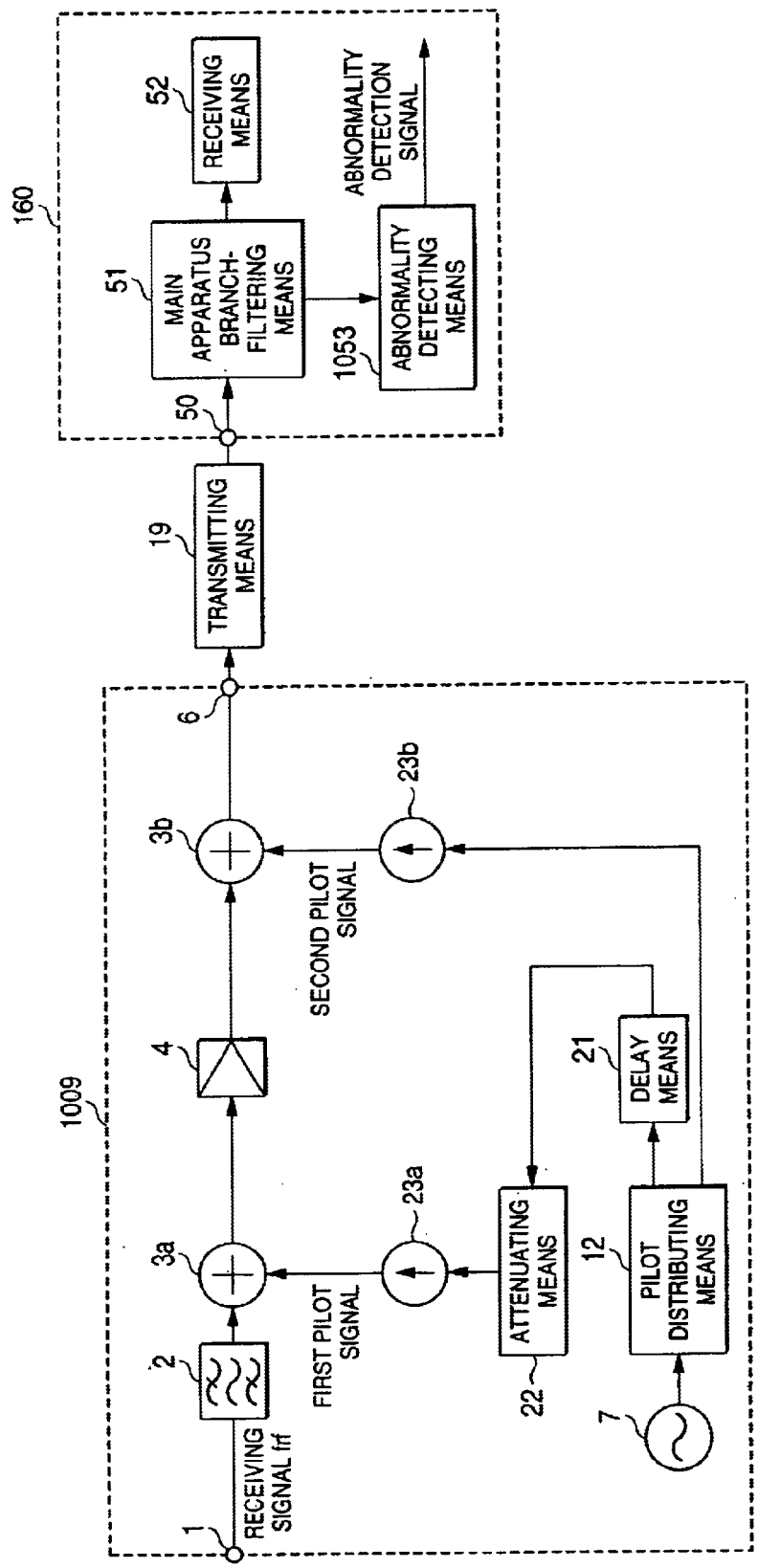
FIG. 17 is a block diagram showing a configuration of a receiving apparatus according to an embodiment 10 of the present invention.

A basic configuration of a receiving apparatus according to an embodiment 10 is shown in FIG. 17. The receiving apparatus according to the embodiment 10 comprises an outdoor receiving unit 1009, the main apparatus 160 having the abnormality detecting means 1053 for detecting the abnormality of the outdoor receiving unit 1009 by using the pilot signal, and the transmitting means 19 for transmitting the signal output from the outdoor receiving unit 1009 to the main apparatus 160.

The outdoor receiving unit 1009 comprises the outdoor receiving unit input terminal 1, the receiving filter 2, the first adding means 3a, the receiving amplifier 4, the second adding means 3b, the outdoor receiving unit output terminal 6, the pilot signal generating means 7, a pilot distributing means 12, the delay means 21, an attenuating means 22, a first isolator 23a, and a second isolator 23b.

Where the attenuating means corresponds to a high frequency attenuator which attenuates a level of a high frequency signal, for example.

The main apparatus 160 comprises the main apparatus input terminal 50, the main apparatus branch-filtering means 51, the receiving means 52, and the abnormality detecting means 1053.

The receiving signal frf input from the outdoor receiving unit input terminal 1 of the outdoor receiving unit 1009 is band-passed by the receiving filter 2, and then input into the first adding means 3a to be added to the first pilot signal. An output signal of the first adding means 3a is then amplified by the receiving amplifier 4, then added to the second pilot signal, and then output from the outdoor receiving unit output terminal 6.

The pilot signal output from the pilot signal generating means 7 is distributed into the first pilot signal and the second pilot signal by the pilot distributing means 12. The second pilot signal is input into the second adding means 3b via the second isolator 23b. When the gain of the receiving amplifier 4 is normal, the first pilot signal component is set opposite in phase to the second pilot signal component by the delay means 21, and is set identical in amplitude to the second pilot signal component by the attenuating means 22, and then input into the first adding means 3a via the first isolator 23a.

According to such adjustment, when the gain of the receiving amplifier 4 is normal, the first pilot signal component and the second pilot signal component are canceled mutually at the outdoor receiving unit output terminal 6. In this manner, the pilot signal component is not output when the gain of the receiving amplifier 4 is normal, whereas the pilot signal component is output when the gain of the receiving amplifier 4 is lowered.

From the above, if the abnormality detection signal is output when the pilot signal is detected by the abnormality detecting means 1053 in the main apparatus 160, reduction in the gain of the receiving amplifier 4 can be detected in the main apparatus 160.

With the above description, the receiving apparatus can be provided which can monitor the gain of the receiving amplifier by using the pilot signals.

If the receiving amplifier 4 is operating normally, no signal is output from the outdoor receiving unit output terminal 6. Hence, no trouble is caused in the receiving means 52. As a result, there can be achieved such an advantage that degradation of the receiving performance due to the inputting of the pilot signals can be eliminated.

In this case, if the delay means 21 is inserted between the second distributing means 10b and the first adding means 3a to delay the first pilot signal, the same advantage as above can be achieved.

Embodiment 11

Figure 18:
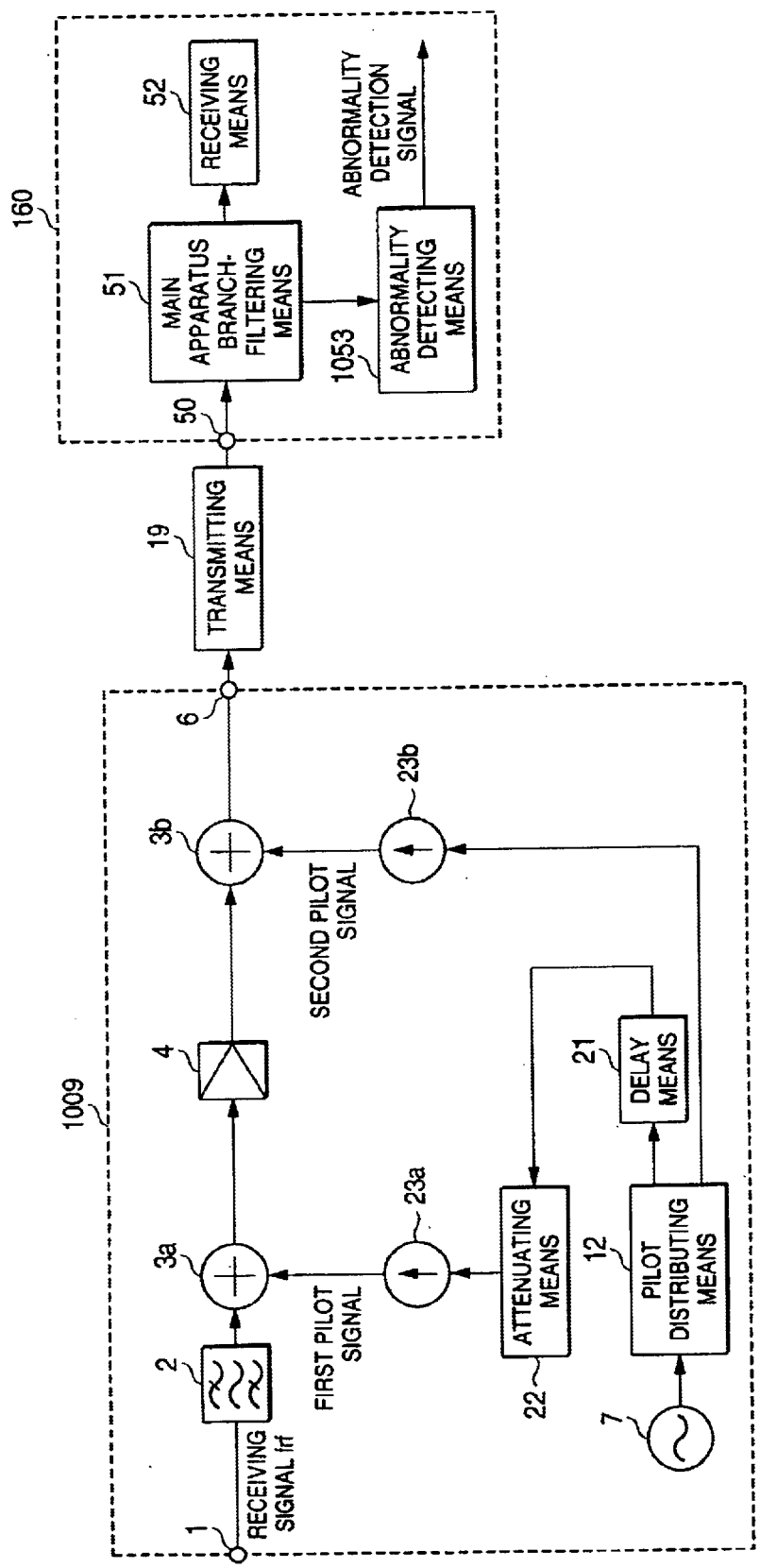
FIG. 18 is a block diagram showing a configuration of a receiving apparatus according to an embodiment 11 of the present invention.

A basic configuration of a receiving apparatus according to an embodiment 11 is shown in FIG. 18. The receiving apparatus according to the embodiment 11 is characterized in that, in the embodiment 9 or 10, the pilot signal can be adjusted to be output at a specified level when the receiving amplifier 4 is operating with the normal gain. If the amplitude of the first pilot signal and the amplitude of the second pilot signal are set differently such that the pilot signal component is output in the normal operation, the pilot signal component can be detected in the normal operation by the abnormality detecting means 1053 in the main apparatus 160.

When the gain of the receiving amplifier 4 is reduced and thus the detected voltage which is output from the abnormality detection detecting means 35 equipped to the abnormality detecting means 1053 is changed in the normal operation, reduction in the gain of the receiving amplifier 4 can be detected in the main apparatus 160 since the abnormality detection signal is output from the abnormality detection signal output terminal 39.

According to the above, the receiving apparatus can be provided which is able to confirm by the main apparatus 160 the fact that the pilot signal is output from the pilot signal generating means.

Embodiment 12

Figure 19:
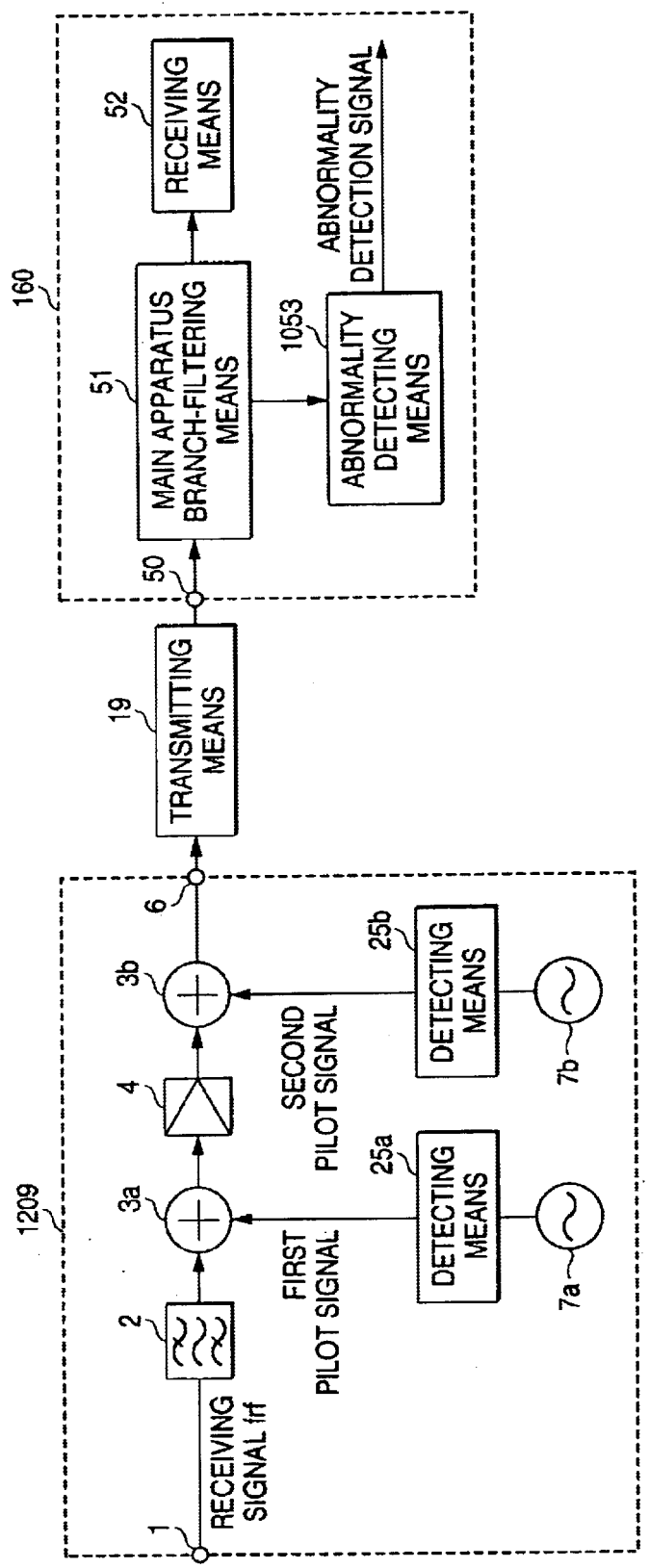
FIG. 19 is a block diagram showing a configuration of a receiving apparatus according to an embodiment 12 of the present invention.

A basic configuration of a receiving apparatus according to an embodiment 12 is shown in FIG. 19. The receiving apparatus according to the embodiment 10 comprises an outdoor receiving unit 1209, the main apparatus 160 having the abnormality detecting means 1053 for detecting the abnormality of the outdoor receiving unit 1209 by using the pilot signal, and the transmitting means 19 for transmitting the signal output from the outdoor receiving unit 1209 to the main apparatus 160. A level holding means 40 is provided to an output of the pilot signal generating means 7 in the receiving apparatus shown in the embodiments 1 to 11. Where the level holding means correspond to a level holding means having an automatic gain controlling function to output the pilot signal of a stable level, for example.

The outdoor receiving unit 1209 is composed of the outdoor receiving unit shown in the embodiments 1 to 11. The main apparatus 160 comprises the main apparatus input terminal 50, the main apparatus branch-filtering means 51, the receiving means 52, and the abnormality detecting means 1053.

Figure 20:
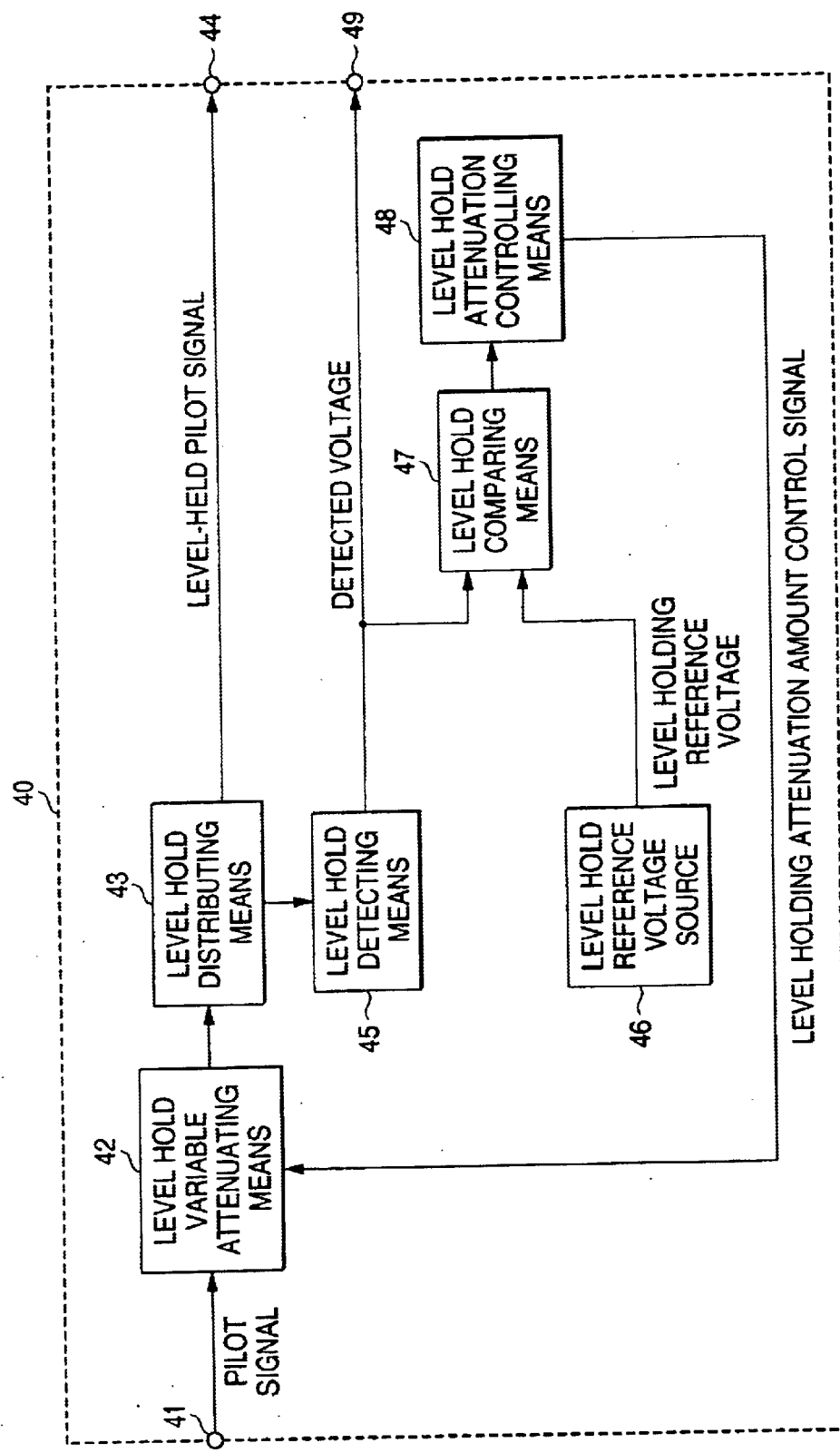
FIG. 20 is a block diagram showing a configuration of a level holding means shown in FIG. 15.

A block diagram of a configuration of the level holding means 40 is shown in FIG. 20. A level of the pilot signal input from a level holding means input terminal 41 is controlled by a level hold variable attenuating means 42 whose attenuation amount is controlled by a level holding attenuation amount control signal. This level-controlled pilot signal is distributed by a level hold distributing means 43. One distributed pilot signal is output from a level holding means output terminal 44. The other distributed pilot signal is detected by a level hold detecting means 45, and then the detected voltage is output from a level hold detection signal output terminal 49.

This detected voltage is compared with a level holding reference voltage being output from a level hold reference voltage source 46 by a level hold comparing means 47. The level holding attenuation amount control signal is then output from a level hold attenuation controlling means 48 so as to eliminate its error.

According to the above explanation, the stable condition can be achieved under the condition the detected voltage output from the level hold detecting means 45 becomes equal to the level holding reference voltage output from the level hold reference voltage source 46. Even if the pilot signal input from the level holding means input terminal 41 is varied in level, such an advantage can be achieved according the above operation that the level of the pilot signal which is output from the level holding means output terminal 44 can be held at the level which is specified by the level holding reference voltage and such pilot signal can be output.

For instance, the case where the level holding means 40 is provided to the output side of the second pilot signal generating means 7b in the outdoor receiving apparatus 109 in the embodiment 1 will be explained hereunder.

The level of the second pilot signal output from the outdoor receiving unit output terminal 6 can be specified by providing the level holding means 40 which holds the level of the second pilot signal at a constant level. Therefore, if the insertion loss of the transmitting means 19 is normal, the level of the pilot signal detected by the abnormality detecting means 1053 can be kept at a constant level.

However, if the insertion loss is increased because of disconnection of the transmitting means 19, etc., the level of the pilot signal detected by the abnormality detecting means 1053 in the main apparatus 160 is reduced. Therefore, if the first pilot signal is also reduced, it can be detected by the main apparatus 160 that such reduction in the level is due to the abnormality of the transmitting means 19.

The receiving apparatuses in the embodiments 1 to 11 have a function of detecting reduction in the gain or the failure of the pilot signal generating means. However, if the level holding means 8 is provided to the output of the pilot signal generating means, the receiving apparatus can be provided which can detect the abnormality of the transmitting means 19 in the main apparatus 160 by holding the level of the pilot signal, which is detected in the main apparatus 160, at a constant value.

The temperature characteristic of the level of the level-held pilot signal being output from the level holding means 40 depends upon both the temperature characteristic of the level hold detecting means 45 and the temperature characteristic of the level holding reference voltage being output from the level hold reference voltage source 46. Therefore, even if the level of the pilot signal being input into the level holding means 40 is varied because of the temperature change, such an advantage can be achieved that the pilot signal can be output from the level holding means output terminal 44 by employing the configuration which has less change relative to the temperature.

In this case, the similar advantage can be achieved by providing the level holding means to the output side of the pilot signal generating means 7 which generates the pilot signal, immediately before the transmitting means 19.

Because the level holding means is provided to the output side of the pilot signal generating means 7 which generates the pilot signal to input from the input side of the first-stage amplifier, in addition to advantages achieved by the embodiments 1 to 11, such an advantage can also be attained that the gain of the receiving amplifier 4 can be measured from the absolute value of the level of the pilot signal by measuring the level of the pilot signal by virtue of the level holding means.

In the case of the outdoor receiving unit having a plurality of pilot signal generating means 7, if the level holding means is provided to all the pilot signal generating means 7, such an advantage can be achieved that, when only any pilot signal is abnormal, it can be indicated that the abnormality of the level of the pilot signal input into the receiving amplifier 4 happens and also it can be identified where the abnormality of the pilot signal is caused.

Embodiment 13

Figure 21:
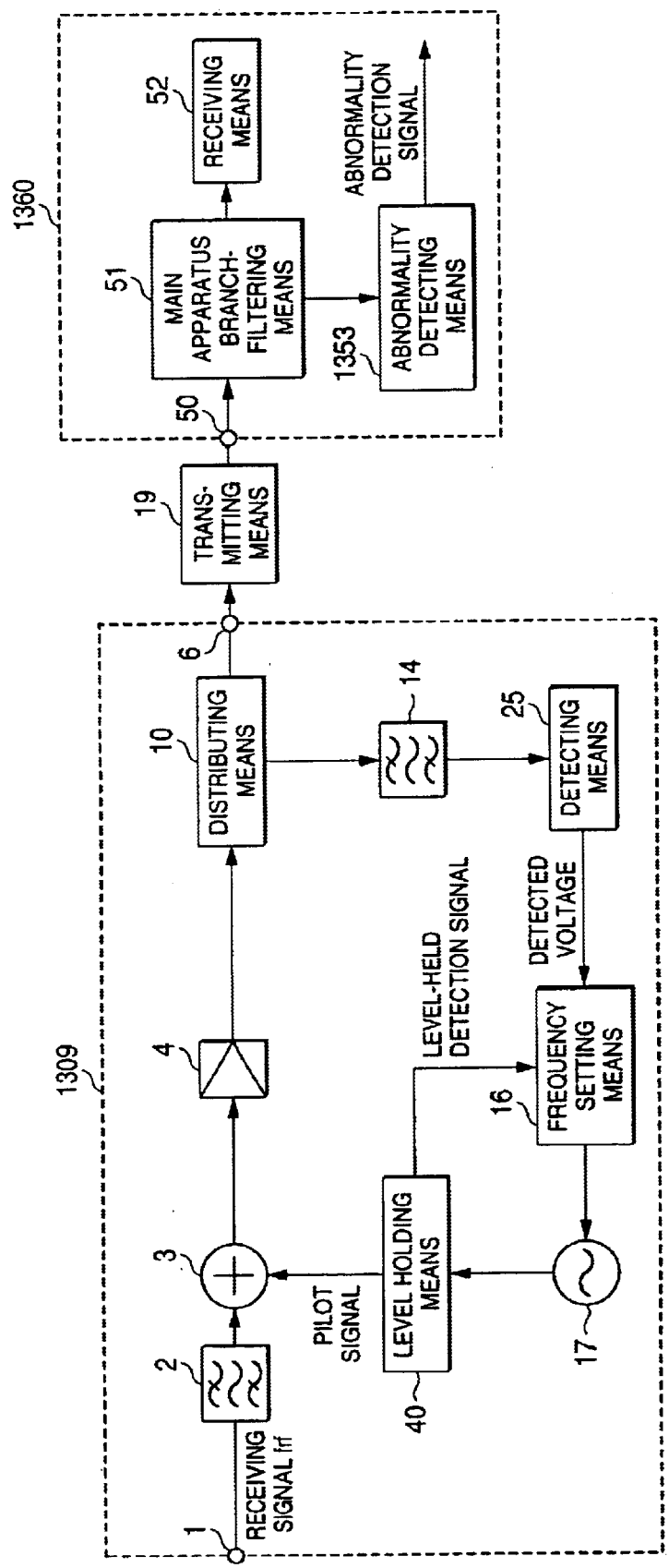
FIG. 21 is a block diagram showing a configuration of a receiving apparatus according to an embodiment 13 of the present invention.

A basic configuration of a receiving apparatus according to an embodiment 13 is shown in FIG. 21. The receiving apparatus according to the embodiment 13 comprises an outdoor receiving unit 1309, the main apparatus 1360 having the abnormality detecting means 1353 for detecting the abnormality of the outdoor receiving unit 1309 by using the pilot signal, and the transmitting means 19 for transmitting the signal output from the outdoor receiving unit 1309 to the main apparatus 1360.

The outdoor receiving unit 1309 comprises the outdoor receiving unit input terminal 1, the receiving filter 2, the adding means 3, the receiving amplifier 4, the distributing means 10, the outdoor receiving unit output terminal 6, a pilot filter 14, a detecting means 25, the frequency setting means 16, the frequency-variable pilot signal generating means 17, and the level holding means 40.

The receiving signal frf input from the outdoor receiving unit input terminal 1 of the outdoor receiving unit 1309 is band-passed by the receiving filter 2, and then added to the pilot signal whose level is held by the level holding means 40 by the adding means 3. This signal is then amplified by the receiving amplifier 4 and then input into the distributing means 10. One signal distributed by the distributing means 10 is output from the outdoor receiving unit output terminal 6, while the other signal is input into the pilot filter 14 which passes the pilot signal component.

This signal passed through the pilot filter 14 is input into the detecting means 25 which outputs the detected signal. Then, in accordance with the detected signal and the level-held detected signal of the level holding means 40, the frequency of the pilot signal is set by the frequency setting means 16. Then, the pilot signal having the set frequency is output from the frequency-variable pilot signal generating means 17. This output pilot signal is level-held by the level holding means 40.

As above, since the level of the pilot signal input from the receiving amplifier 4 is held at a constant level, the level of the pilot signal output from the outdoor receiving unit output terminal 6 can be kept at a constant level if the gain of the receiving amplifier 4 is normal. The signal output from the outdoor receiving unit output terminal 6 is transmitted to the main apparatus 1360 via the transmitting means 19.

This transmitted signal is input from the main apparatus input terminal 50 in the main apparatus 1360, and then branch-filtered into the receiving signal and the pilot signal by the main apparatus branch-filtering means 51. The branch-filtered receiving signal is received by the receiving means 52. Also, the branch-filtered pilot signal is input into the abnormality detecting means 1353 to detect the abnormality.

Figure 22:
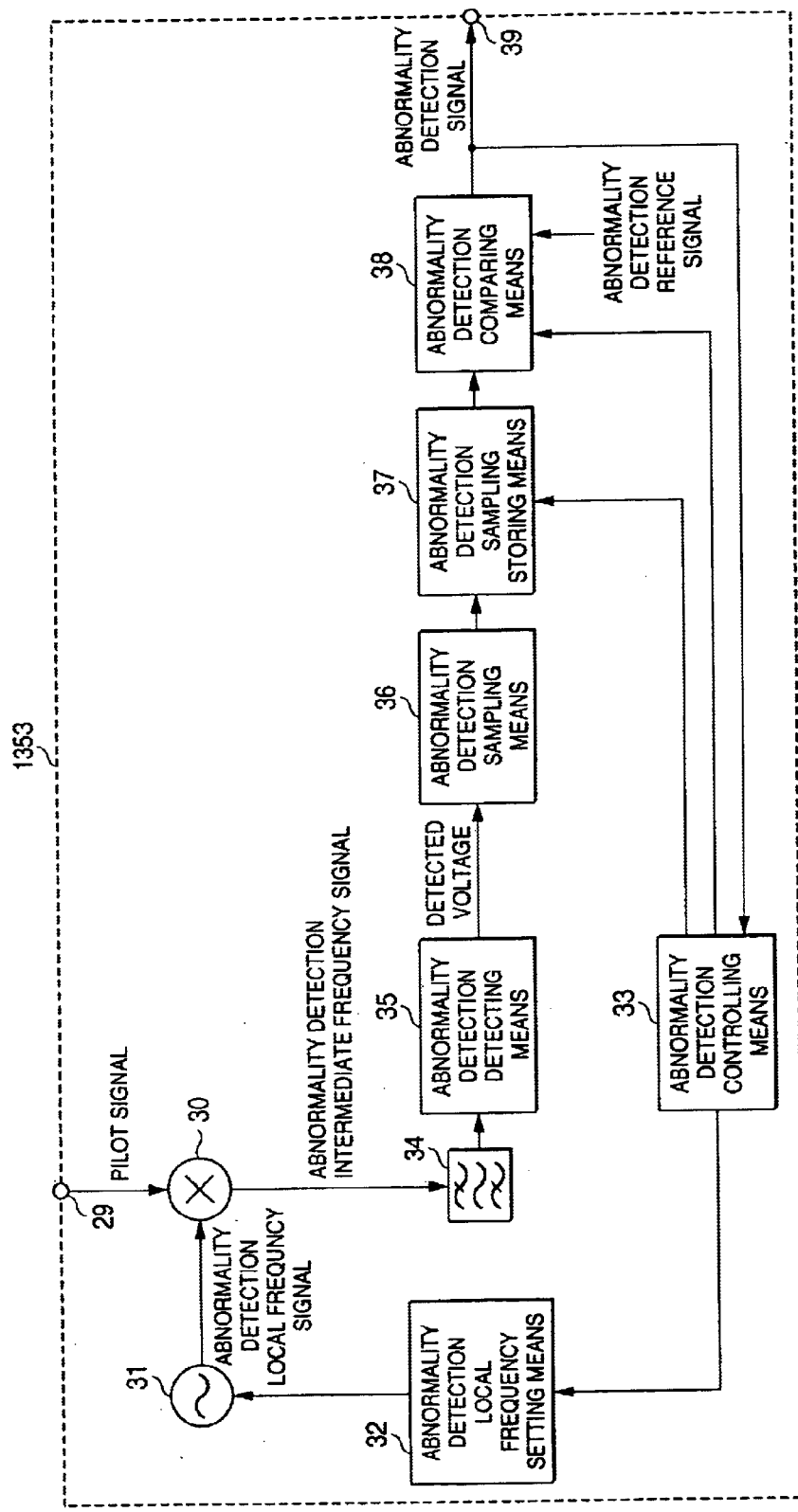
FIG. 22 is a block diagram showing a configuration of an abnormality detecting means in FIG. 17.

A block diagram of a configuration of the abnormality detecting means 1353 is shown in FIG. 22. The configuration of the abnormality detecting means 1353 is substantially identical to the above abnormality detecting means 5057. In the outdoor receiving unit, in case the level of the pilot signal being output in the normal operation is specified and also the frequency of the pilot signal is set according to the situation of the failure, the abnormality detecting means 1353 detects the frequency when the abnormality is detected.

The abnormality detected in the outdoor receiving unit can also be detected by the similar operation to the abnormality detecting means 5057. In addition, since the level of the pilot signal output from the outdoor receiving unit is specified in the normal operation, an amount of reduction in the gain can be measured based on an amount of reduction of the detected voltage in the abnormal operation rather than the detected voltage in the normal operation.

From the foregoing operation, in the abnormality detecting means 1353, an amount of reduction of the gain can be detected based on the level of the pilot signal input from the abnormality detecting means input terminal 29 and also the abnormality detected by the outdoor receiving unit can be detected based on the frequency. Also, the increase of the insertion loss because of the abnormality of the transmitting means can be detected.

An example of setting the frequency of the pilot signal by the frequency setting means 16 will be shown in Table 5.

TABLE 5

| | frequency offset [kHz] | |
|---|---|---|
| | small | large |
| level-hold detection signal | 1 | 2 |
| first detecting means output signal | 4 | 8 |

As an example, a method of adding to specify each abnormality will be explained as the method of setting the frequency of the pilot signal according to Table 5.

For instance, assume that the frequency of the pilot signal is fp in the normal operation. In case the level of the pilot signal is lowered because of the failure of the frequency-variable pilot signal generating means 17, both the detected voltage of the level hold detecting means 45 in the level holding means 40 and the pilot signal detected voltage detected by the detecting means 19 are lowered. In that case, according to Table 5, the frequency of the pilot signal is offset by the frequency setting means 16. Since an offset amount of the frequency of the pilot signal is given by 1+4=5 [kHz], the frequency of the pilot signal is set to fp+5 [kHz].

Then, the level of the pilot signal input into the receiving amplifier 4 and the level of the pilot signal amplified by the receiving amplifier 4 can be identified by detecting the frequency of the pilot signal by means of the abnormality detecting means 1353 in the main apparatus 1360.

In this event, since the pilot signal is held at a constant level by the level holding means 40, the pilot signal input into the main apparatus 1360 has the frequency fp and the constant level when the receiving apparatus is operated normally. On the contrary, if the pilot signal detected by the abnormality detecting means 1353 has the frequency informing the abnormality but the detected level is the almost same as that in the normal operation or in excess of the specified value to detect the abnormality, it can be decided that the detecting means 25 or the frequency setting means 16 is abnormal in the outdoor receiving unit 1309 but the gain of the outdoor receiving unit is normal.

Further, if the frequency of the pilot signal has the normal value and the signal level is lower than the specified value to detect the abnormality in the abnormality detecting means 1353, it can be detected that the outdoor receiving unit 1309 is normally operating but the transmitting means 19 is abnormal.

From the above description, the receiving apparatus can be provided which can discriminate the abnormality of the receiving amplifier, the abnormality of the pilot signal generating means, and the abnormality of the transmitting means.

Embodiment 14

Figure 23:
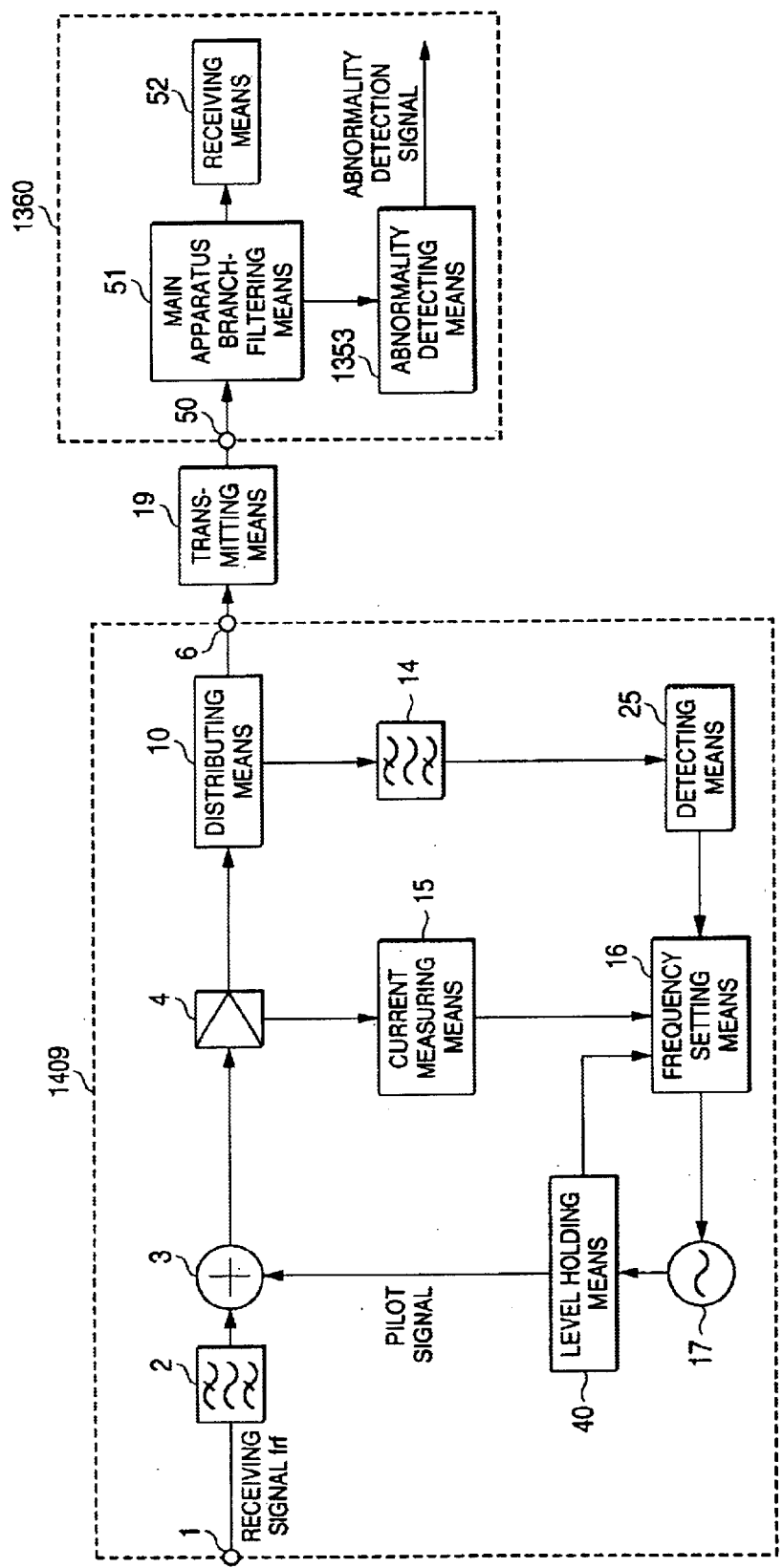
FIG. 23 is a block diagram showing a configuration of a receiving apparatus according to an embodiment 14 of the present invention.

A basic configuration of a receiving apparatus according to an embodiment 14 is shown in FIG. 23. The receiving apparatus according to the embodiment 14 comprises an outdoor receiving unit 1409, the main apparatus 1360 having the abnormality detecting means 1353 for detecting the abnormality of the outdoor receiving unit 1409 by using the pilot signal, and the transmitting means 19 for transmitting the signal output from the outdoor receiving unit 1409 to the main apparatus 1360.

The outdoor receiving unit 1409 is composed of the outdoor receiving unit 1309 having the current measuring means 15 for measuring the consumption current of the receiving amplifier 4 and shown in the embodiment 13. In the outdoor receiving unit 1409, the current measuring means 15 measures the consumption current of the receiving amplifier 4, and then outputs information of the consumption current to the frequency setting means 16. Based on such information as well as the level holding detected signal being output from the level hold detection signal output terminal 49 in the level holding means 40 and the detected voltage being output from the detecting means 25, the frequency setting means 16 sets the frequency of the pilot signal.

Then, an example of an offset amount of the set frequency of the pilot signal is shown in Table 6.

TABLE 6

| | frequenay offset [kHz] | |
|---|---|---|
| | small | large |
| level-hold detection signal | 1 | 2 |
| first detecting means output signal | 4 | 8 |
| consumption current | 16 | 32 |

As an example, a method of adding to specify each abnormality will be explained as the method of setting the frequency of the pilot signal according to Table 6. Assume that the frequency of the pilot signal is fp in the normal operation.

If the consumption current off the receiving amplifier 4 is small and thus the gain is lowered in the outdoor receiving unit 1409, an offset amount of the frequency of the pilot signal is given by 16+4=20 [kHz], the frequency of the pilot signal is set to fp+20 [kHz].

In the main apparatus 1360, it can be specified when this frequency is detected that reduction in the consumption current of the receiving amplifier 4 and reduction in the gain occur. Also, in the event that the frequency of the pilot signal detected in the abnormality detecting means 1353 corresponds to such frequency informing the abnormality of the current, when the level of the pilot signal is the substantially same as that in the normal operation or is more than the specified value to detect the abnormality, no degradation of the receiving performance is caused and thus the receiving apparatus can be continued to employ.

From the above description, the receiving apparatus can be provided which can discriminate the abnormality of the receiving amplifier, the abnormality of the pilot signal generating means, and the abnormality of the transmitting means.

Embodiment 15

Figure 24:
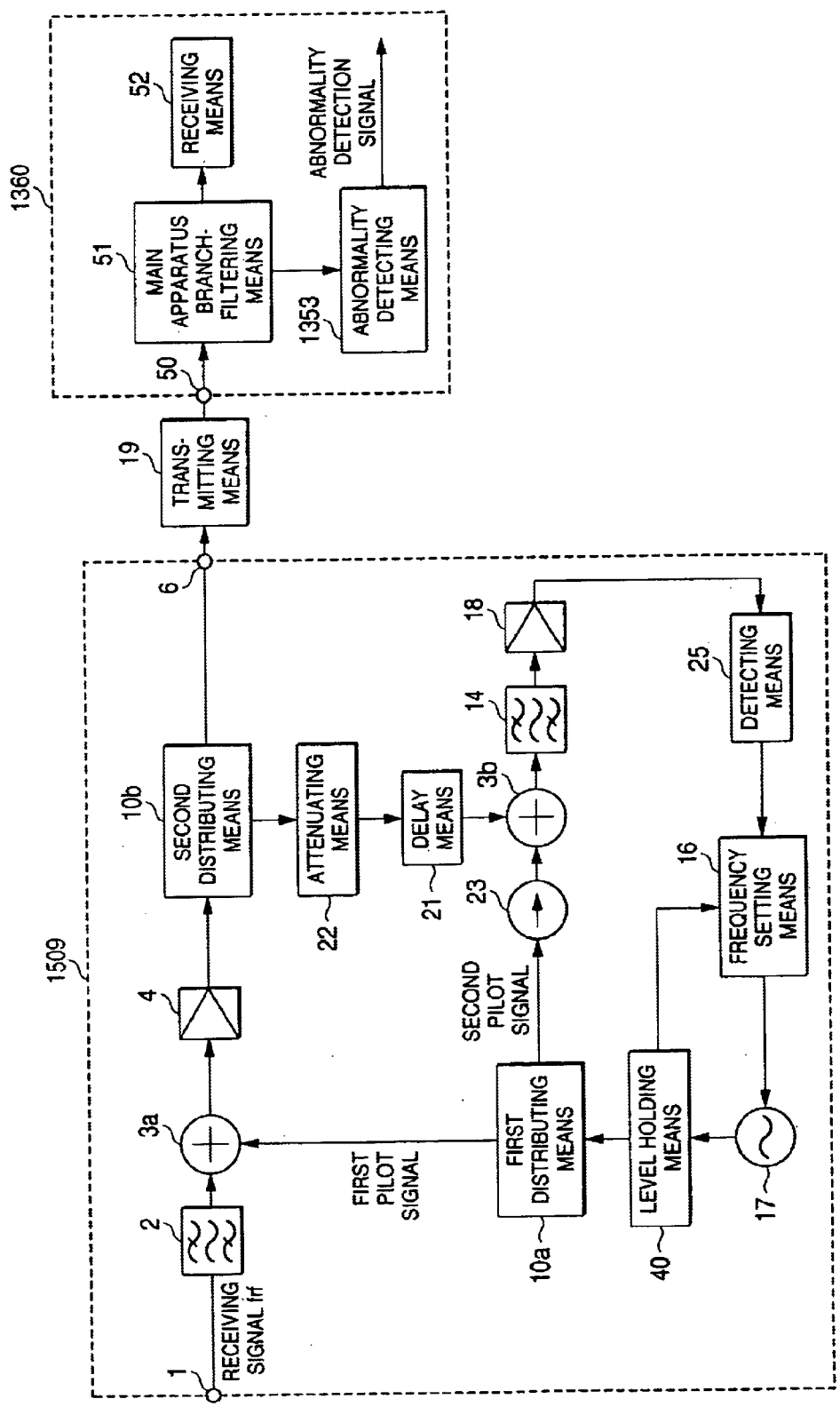
FIG. 24 is a block diagram showing a configuration of a receiving apparatus according to an embodiment 15 of the present invention.

A basic configuration of a receiving apparatus according to an embodiment 15 is shown in FIG. 24. The receiving apparatus according to the embodiment 15 comprises an outdoor receiving unit 1509, the main apparatus 1360 having the abnormality detecting means 1353 for detecting the abnormality of the outdoor receiving unit 1509 by using the pilot signal, and the transmitting means 19 for transmitting the signal output from the outdoor receiving unit 1509 to the main apparatus 1360.

The outdoor receiving unit 1509 comprises the outdoor receiving unit input terminal 1, the receiving filter 2, the first adding means 3a, the receiving amplifier 4, the second distributing means 10b, the outdoor receiving unit output terminal 6, the frequency setting means 16, the frequency-variable pilot signal generating means 17, the level holding means 40, the first distributing means 10a, an isolator 23, the second adding means 3b, the attenuating means 22, the delay means 21, the pilot filter 14, the gain monitoring amplifier 18, and the first detecting means 25.

The receiving signal frf input from the outdoor receiving unit input terminal 1 of the outdoor receiving unit 1509 is band-passed by the receiving filter 2, and then input into the first adding means 3a. The pilot signal whose frequency is selected by the frequency setting means 16 is output from the frequency-variable pilot signal generating means 17, and then the level of the pilot signal is held at a predetermined level by the level holding means 40.

This pilot signal is distributed into the first pilot signal and the second pilot signal by the first distributing means 10a. The first pilot signal is input into the first adding means 3a and then added to the receiving signal. The second pilot signal is input into the second adding means 3b via the isolator 23.

The output signal of the first adding means 3a is then amplified by the receiving amplifier 4. This amplified signal contains the receiving signal component and the first pilot signal component. At this time, if the gain of the receiving amplifier 4 is normal, the level of the first pilot signal component being output from the receiving amplifier 4 has always a constant value.

This amplified signal is distributed by the second distributing means 10b, one distributed signal is output from the outdoor receiving unit output terminal 6. The other signal distributed by the second distributing means 10b is input into the second adding means 3b via the attenuating means 22 and the delay means 21. At this time, if the second pilot signal component and the first pilot signal component distributed from the first distributing means 10a have equal amplitudes but opposite phases at the output of the second adding means 3b, these pilot signals can be canceled or be adjusted to have a specified relative difference.

The output signal of the second adding means 3b is band-passed by the pilot filter 14, and then amplified by the gain monitoring amplifier 18 up to a level which can be detected by the first detecting means 19a. Then, the detected signal is output from the first detecting means 19a to the frequency setting means 16. The frequency of the pilot signal is set by the frequency setting means 16 in accordance with the detected signal. At this time, an example of the set frequency of the pilot signal is shown in Table 7.

TABLE 7

|  | frequency offset [kHz] | |
| --- | --- | --- |
|  | small | large |
| level-hold detection signal | 1 | 2 |
| first detecting means output signal | 4 | 8 |

According to the above operation, like the embodiment 13, the abnormality detected in the outdoor receiving unit 1509 can be sensed by the abnormality detecting means 1353 based on the relationship between the phase and the frequency of the pilot signal.

Furthermore, since the first pilot signal is level-held by the level holding means 40 if the gain of the receiving amplifier 4 is normal, the level of the first pilot signal being output from the outdoor receiving unit output terminal 6 can be kept at a constant level. Since the frequency of the first pilot signal is set by the frequency setting means 16 to inform the abnormality if the gain of the receiving amplifier 4 is reduced, it can be detected that the gain of the receiving amplifier 4 has been reduced when this frequency is detected by the abnormality detecting means 1353.

However, if the frequency of the pilot signal informs that the receiving amplifier 4 is normally operating but the level of the pilot signal is lowered, it can be identified by the abnormality detecting means 1353 that such abnormality is caused by the transmitting means 19.

From the above description, the receiving apparatus can be provided which can discriminate the abnormality of the receiving amplifier, the abnormality of the pilot signal generating means, and the abnormality of the transmitting means.

Embodiment 16

Figure 25:
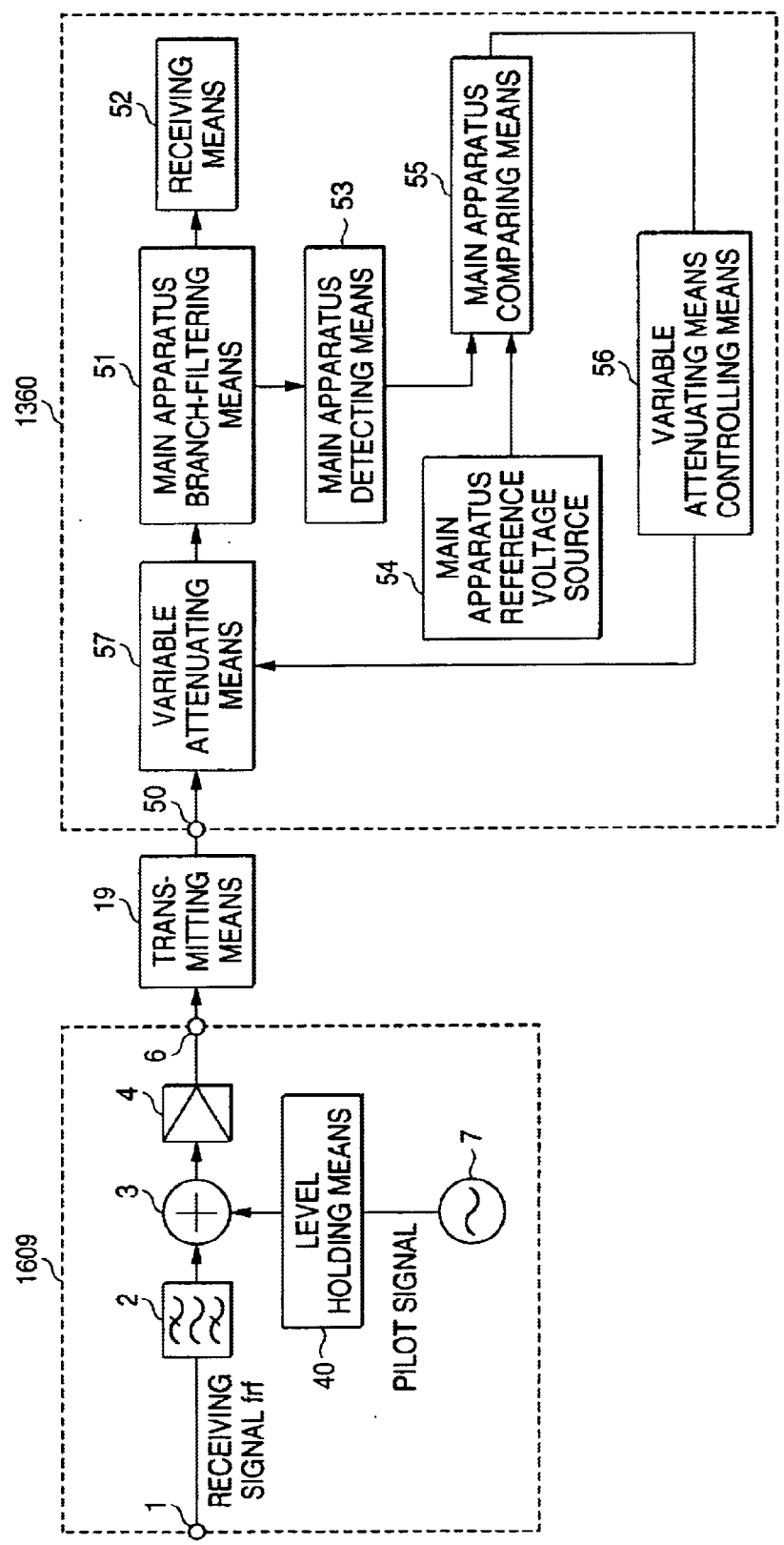
FIG. 25 is a block diagram showing a configuration of a receiving apparatus according to an embodiment 16 of the present invention.

A basic configuration of a receiving apparatus according to an embodiment 16 is shown in FIG. 25. The receiving apparatus according to the embodiment 16 comprises an outdoor receiving unit 1609, the transmitting means 19 for transmitting the signal output from the outdoor receiving unit 1609, and the main apparatus 1660 for receiving the signal transmitted over the transmitting means 19.

The outdoor receiving unit 1609 comprises the outdoor receiving unit input terminal 1, the receiving filter 2, the adding means 3, the receiving amplifier 4, the outdoor receiving unit output terminal 6, the pilot signal generating means 7, and the level holding means 40.

The main apparatus 1660 comprises the main apparatus input terminal 50, a variable attenuating means 57, the main apparatus branch-filtering means 51, the receiving means 52, a main apparatus detecting means 53, a main apparatus reference voltage source 54, a main apparatus comparing means 55, and a variable attenuating means controlling means 56.

Where the variable attenuating means corresponds to a variable attenuating means which can vary a passing attenuation amount of the signal by the control voltage, for example. The branch-filtering means corresponds to a branch-filtering means which has a different frequency of the passing signal for two outputs, for example. The reference voltage source corresponds to a reference voltage source which outputs a predetermined voltage value, for example. The controlling means corresponds to a controlling portion which outputs an attenuation amount controlling signal based on a compared result of the comparing means, for example.

The receiving signal frf input from the outdoor receiving unit input terminal 1 of the outdoor receiving unit 1609 is band-passed by the receiving filter 2, and then input into the receiving amplifier 4. The pilot signal which is output from the pilot signal generating means 7 is level-held by the level holding means 40, and then added to the receiving signal by the adding means 3 which is connected to the input side or the output side of the receiving amplifier 4.

This signal being amplified by the receiving amplifier 4 is output from the outdoor receiving unit output terminal 6. In this case, since the pilot signal is held at a predetermined level, if the receiving amplifier 4 is normally operating, the level of the pilot signal being output from the outdoor receiving unit output terminal 6 can be kept at a constant level.

The output signal of the outdoor receiving unit output terminal 6 is transmitted to the main apparatus 1660 via the transmitting means 19, and then input into the main apparatus input terminal 50. This input signal is adjusted in level by the variable attenuating means 57 whose attenuation amount is controlled by the variable attenuating means controlling means 56. Then, this signal is branch-filtered by the main apparatus branch-filtering means 51 into the receiving signal component and the pilot signal component.

The receiving signal component is output to the receiving means 52 and then received. The pilot signal component is detected by the main apparatus detecting means 53, and then compared with the reference voltage, which is output from the main apparatus reference voltage source 54, by the main apparatus comparing means 55. An attenuation amount of the variable attenuating means 57 is controlled by the variable attenuating means controlling means 56.

According to the above operation, even though the insertion loss of the transmitting means 19 is different, the pilot signal which is input into the main apparatus detecting means 53 can be held at a specified level by forming a feedback such that the detected voltage of the pilot signal being branch-filtered by the main apparatus branch-filtering means 51 can be adjusted to be substantially equal to the reference voltage.

Since the pilot signal output from the outdoor receiving unit output terminal 6 is held at a specified value, the insertion loss of the transmitting means 19 and the variable attenuating means 57 can be maintained at a constant amount if the detected voltage of the pilot signal output from the main apparatus detecting means 53 is a specified value.

In this case, if a continuously-adjustable variable attenuating means, for example, the voltage-controlled variable attenuating means, is employed as the variable attenuating means 57, precise correction of the insertion loss can be accomplished.

In addition, if a step-changed variable attenuating means, for example, a digitally-controlled variable attenuating means is employed as the variable attenuating means 57, the abnormality detecting precision can be improved by correcting the detected voltage detected by the abnormality detecting means which detects the abnormality from the absolute value of the level of the pilot signal. More particularly, if an amount of attenuation of the variable attenuating means 57 is controlled by the variable attenuating means controlling means 56 to minimize the deviation from the reference voltage and then the abnormality detecting means is operated while correcting the state that the detected voltage being output from the main apparatus detecting means 53 is difference from the reference voltage as the normal state, the abnormality detecting precision can be improved.

With the above, the receiving apparatus can be provided which can be installed without error in correcting the insertion loss of the transmitting means.

Embodiment 17

Figure 26:
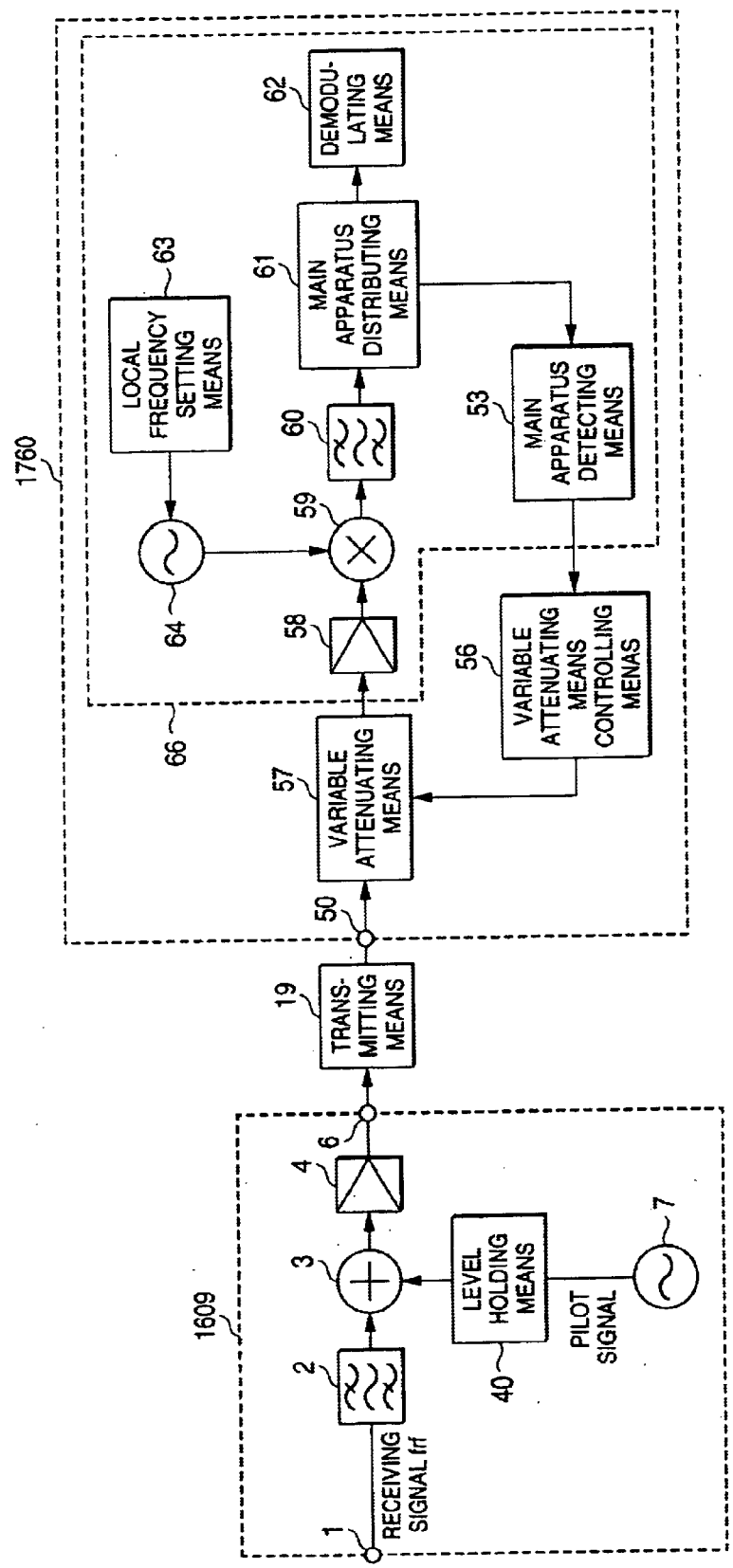
FIG. 26 is a block diagram showing a configuration of a receiving apparatus according to an embodiment 17 of the present invention.

A basic configuration of a receiving apparatus according to an embodiment 17 is shown in FIG. 26. The receiving apparatus according to the embodiment 17 comprises an outdoor receiving unit 1609 which outputs the level-held pilot signal from the outdoor receiving unit output terminal 6, the transmitting means 19 for transmitting the signal output from the outdoor receiving unit 1609, and a main apparatus 1760 for receiving the signal transmitted over the transmitting means 19.

The outdoor receiving unit 1609 comprises the outdoor receiving unit input terminal 1, the receiving filter 2, the adding means 3, the receiving amplifier 4, the outdoor receiving unit output terminal 6, the pilot signal generating means 7, and the level holding means 40.

The main apparatus 1760 comprises the main apparatus input terminal 50, a variable attenuating means 57, an amplifying demodulator 66, and the variable attenuating means controlling means 56. The amplifying demodulator 66 comprises a main apparatus receiving amplifier 58 and a frequency converting means 59, an intermediate frequency filter 60 to which the local frequency signal is input, a main apparatus distributing means 61, a demodulating means 62, and the main apparatus detecting means 53. The local frequency signal is output from a local frequency signal generating means 64 whose frequency is controlled by a local frequency setting means 63.

Where the frequency converting means corresponds to a mixer which converts the receiving signal into the intermediate frequency, for example. The intermediate frequency filter corresponds to an intermediate frequency filter such as a SAW filter, a ceramic filter, etc. which limits the bandwidth of the signal to pass the intermediate frequency signal, for example.

In the amplifying demodulator 66, the input signal is amplified by the main apparatus receiving amplifier 58, and then frequency-converted into the intermediate frequency signal by the frequency converting means 59. The local frequency signal which is output from the local frequency signal generating means 64 whose frequency is controlled by the local frequency setting means 63 is input into the frequency converting means 59.

The intermediate frequency signal which is subjected to the frequency conversion is band-passed by the intermediate frequency filter 60, and then output to the main apparatus distributing means 61. One intermediate frequency signal distributed by the main apparatus distributing means 61 is output to and demodulated by the demodulating means 62. The other intermediate frequency signal distributed by the main apparatus distributing means 61 is detected by the main apparatus detecting means 53 to output the detected voltage.

The local frequency signal generating means 64 is frequency-controlled by the local frequency setting means 63, and then outputs the signal to the frequency converting means 59. The local frequency is set to fl1 if the receiving signal is to be demodulated by the local frequency setting means 63, while the local frequency is set to fl2 if the pilot signal is detected. The relationship among the receiving signal frf, the pilot signal fp, and the intermediate frequency fif is set, for example, $$frf = fl1 + fif$$

$$i\ fp = fl2 + fif.$$

With the above, the amplifying demodulator 66 can be provided which can output the detected voltage of the pilot signal by setting the local frequency of the receiving signal and the pilot signal by the local frequency setting means 63.

The output signal of the outdoor receiving unit output terminal 6 in the outdoor receiving unit 1609 is transmitted to the main apparatus input terminal 50 via the transmitting means 19, and then input into the variable attenuating means 57 whose attenuation amount is controlled by the variable attenuating means controlling means 56. The signal whose level is controlled by the variable attenuating means controlling means 56 is input into the amplifying demodulator 66.

The detected voltage of the pilot signal can be output by setting the local frequency such that the detected voltage of the pilot signal is output from the amplifying demodulator 66, in installing the receiving apparatus of the present configuration. The detected voltage of the pilot signal is input into the variable attenuating means controlling means 56. Then, if an amount of attenuation of the variable attenuating means 57 is controlled by the variable attenuating means controlling means 56 to set the detected voltage to the specified value, the insertion loss of the transmitting means 19 and the variable attenuating means 57 can be kept at a constant value under the condition the detected voltage of the pilot signal output from the amplifying demodulator 66 has the specified value since the pilot signal being output from the outdoor receiving unit output terminal 6 is held at the specified value.

In this case, if a continuously-adjustable variable attenuating means, for example, the voltage-controlled variable attenuating means, is employed as the variable attenuating means 57, precise correction of the insertion loss can be accomplished.

In addition, if a step-changed variable attenuating means, for example, a digitally-controlled variable attenuating means is employed as the variable attenuating means 57, the abnormality detecting precision can be improved by correcting the detected voltage detected by the abnormality detecting means which detects the abnormality from the absolute value of the level of the pilot signal. More particularly, if an amount of attenuation of the variable attenuating means 57 is controlled by the variable attenuating means controlling means 56 to minimize the deviation from the reference voltage and then the abnormality detecting means is operated while correcting the state that the detected voltage being output from the main apparatus detecting means 53 is difference from the reference voltage as the normal state, the abnormality detecting precision can be improved.

With the above, the receiving apparatus can be provided which can be installed without error in correcting the insertion loss of the transmitting means.

Embodiment 18

Figure 27:
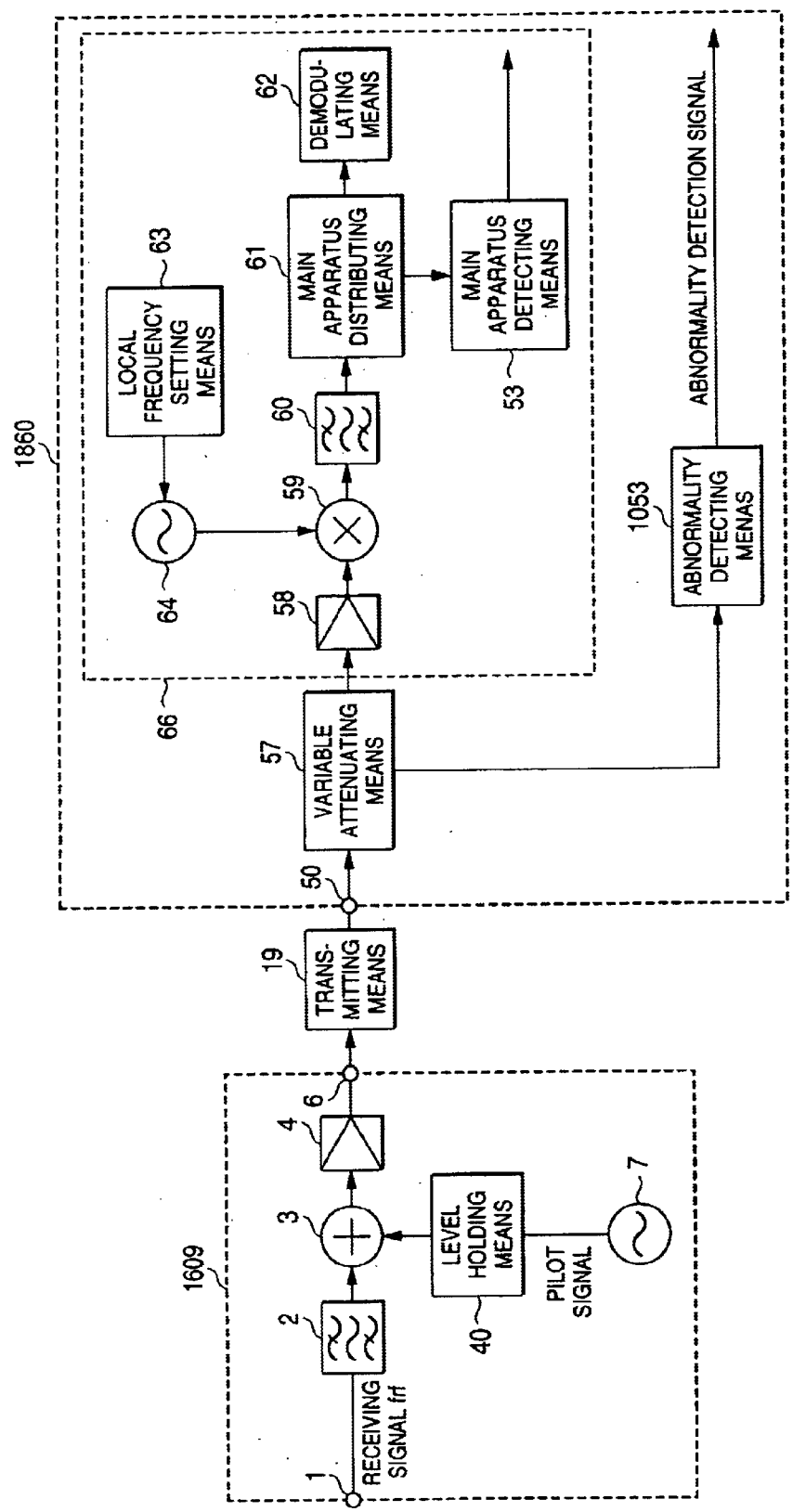
FIG. 27 is a block diagram showing a configuration of a receiving apparatus according to an embodiment 18 of the present invention.

A basic configuration of a receiving apparatus according to an embodiment 18 is shown in FIG. 27. The receiving apparatus according to the embodiment 18 comprises an outdoor receiving unit 1609 which outputs the level-held pilot signal from the outdoor receiving unit output terminal 6, the transmitting means 19 for transmitting the signal being output from the outdoor receiving unit 1609, and a main apparatus 1860 for receiving the signal being transmitted over the transmitting means 19.

The main apparatus 1860 comprises the main apparatus input terminal 50, the main apparatus branch-filtering means 51, the amplifying demodulator 66, and the abnormality detecting means 1053.

The output signal of the outdoor receiving unit output terminal 6 in the outdoor receiving unit 1609 is transmitted to the main apparatus input terminal 50 in the main apparatus 1860 via the transmitting means 19, and then distributed by the main apparatus distributing means 61. One signal distributed by the main apparatus distributing means 61 is input into the amplifying demodulator 66, and the other signal is input into the abnormality detecting means 1053.

When the abnormality detecting means 1053 detects reduction in the pilot signal and then outputs the abnormality detection signal because the abnormality is caused in the outdoor receiving unit 1609 or the transmitting means 19, the amplifying demodulator 66 detects the pilot signal to output the detected voltage. If this signal is in the range of the specified value to detect the abnormality, such abnormality can be detected by two means.

However, if the detected voltage of the pilot signal detected by the amplifying demodulator 66 is in the range of the specified value to show the normal operation of the outdoor receiving unit 1609, it can be detected that decision of the abnormality detection is wrong because of the abnormality of the outdoor receiving unit 1609 or the transmitting means 19.

According to the above description, if the abnormality is detected based on the detection result of the abnormality detecting means 1053, malfunction of the abnormality detecting means 1053 can be checked by also confirming the abnormality based on the voltage of the pilot signal detected by the amplifying demodulator 66. As a result, the receiving apparatus which can detect the abnormality with high reliability can be provided.

Embodiment 19

Figure 28:
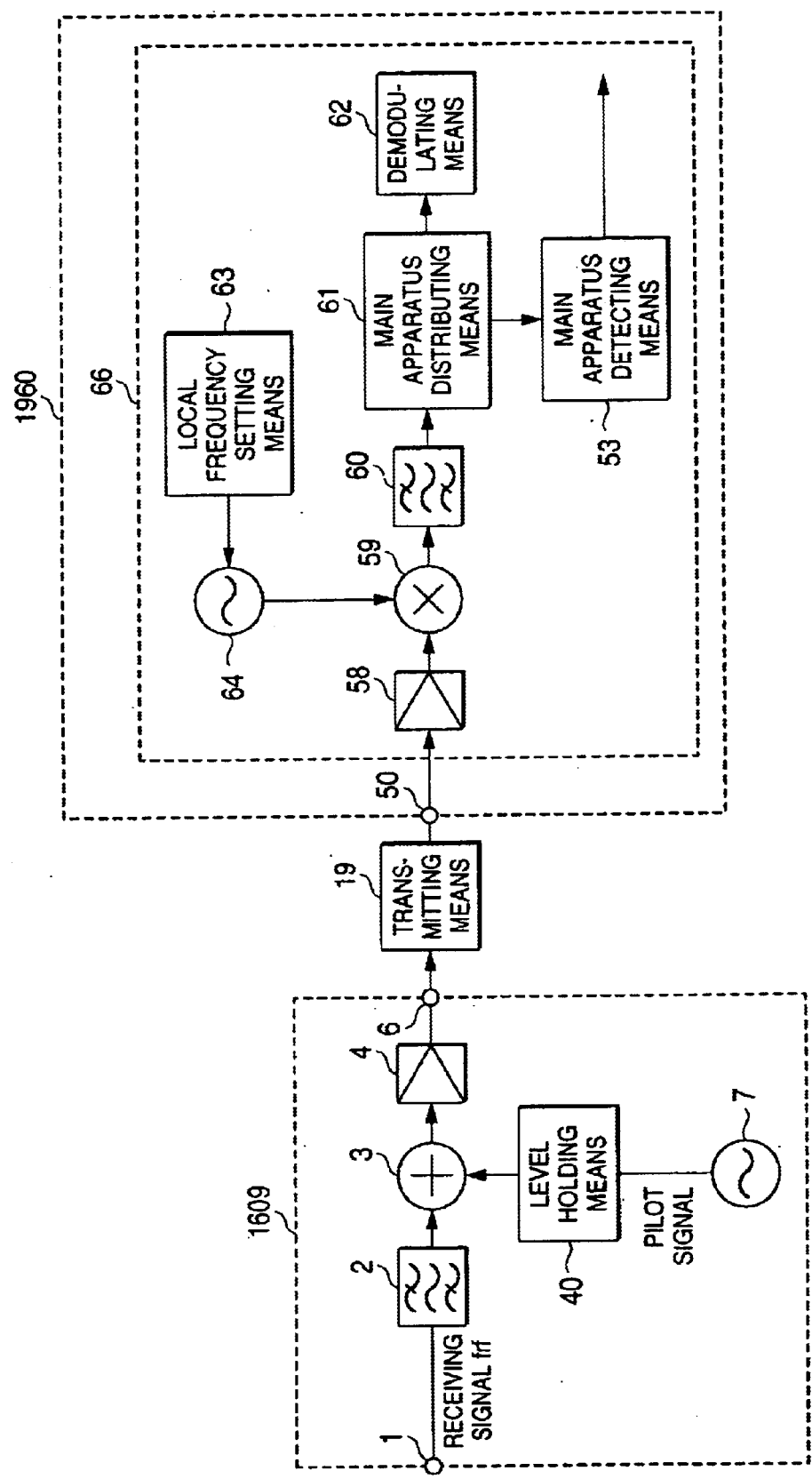
FIG. 28 is a block diagram showing a configuration of a receiving apparatus according to an embodiment 19 of the present invention.

A basic configuration of a receiving apparatus according to an embodiment 19 is shown in FIG. 28. The receiving apparatus according to the embodiment 19 is a TDD type receiving apparatus which comprises the outdoor receiving unit 1609 which outputs the level-held pilot signal from the outdoor receiving unit output terminal 6, the transmitting means 19 for transmitting the signal output from the outdoor receiving unit 1609, and a main apparatus 1960 for receiving the signal transmitted over the transmitting means 19. The main apparatus 1960 consists of the main unit input terminal 50 and the amplifying demodulator 66.

The present receiving apparatus is the TDD type receiving apparatus in which the signal is amplified by the outdoor receiving unit 1609, then transmitted via the transmitting means 19, and then input into the main apparatus 1960. This main apparatus 1960 has a receiving means 62 which repeats receiving and stopping operations periodically. If the local frequency is set to fl1 by the local frequency setting means 63 at the reception time, the receiving signal can be demodulated by the receiving means 62.

If the local frequency is set to fl2 by the local frequency setting means 63 at the stop time, the pilot signal is converted into the intermediate frequency by the frequency converting means 59 and thus the receiving level of the pilot signal can be detected by the main apparatus detecting means 53. When this output detected voltage of the pilot signal has the specified value to indicate the abnormality, the abnormality of the outdoor receiving unit 1609 or the transmitting means 19 can be detected.

With the above, abnormality detection of the outdoor receiving unit can be provided with a simple configuration in the TDD type receiving apparatus.

Embodiment 20

Figure 29:
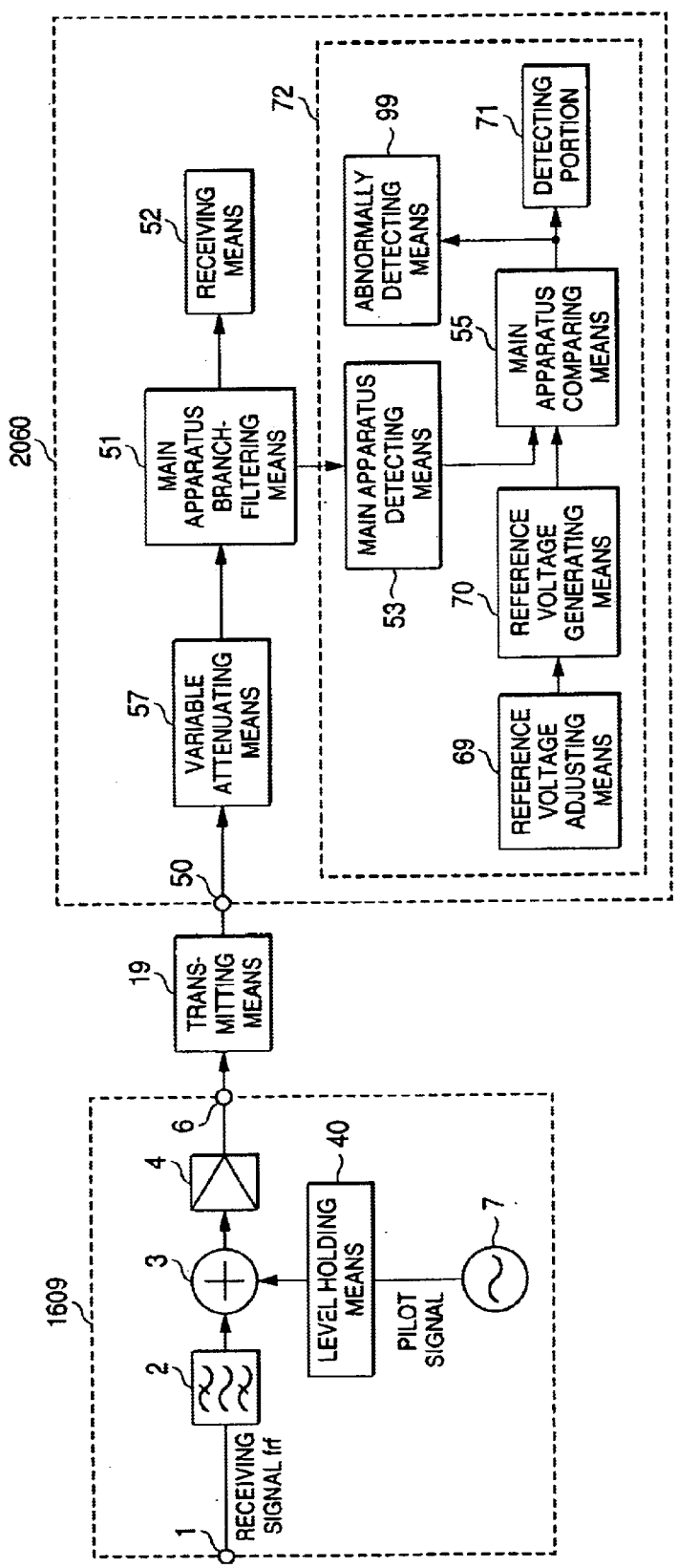
FIG. 29 is a block diagram showing a configuration of a receiving apparatus according to an embodiment 20 of the present invention.

A basic configuration of a receiving apparatus according to an embodiment 20 is shown in FIG. 29. The receiving apparatus according to the embodiment 20 comprises an outdoor receiving unit 1609 which outputs the level-held pilot signal from the outdoor receiving unit output terminal 6, the transmitting means 19 for transmitting the signal being output from the outdoor receiving unit 1609, and a main apparatus 2060 for receiving the signal being transmitted over the transmitting means 19.

The main apparatus 2060 comprises the main apparatus input terminal 50, the variable attenuating means 57, the main apparatus branch-filtering means 51, the receiving means 52, and the pilot signal monitoring portion 72. This pilot signal monitoring portion 72 comprises the main apparatus detecting means 53, the reference voltage adjusting means 69, the reference voltage generating means 70, the main apparatus comparing means 55, an abnormality detecting means 99, and the detecting portion 71.

When the level of the pilot signal being input into the main apparatus detecting means 53 is the normal level, the detecting portion 71 detects that the voltage being output from the main apparatus comparing means 55 is within the normal range.

Like the abnormality detecting means 1353, etc., the abnormality detecting means 99 is a means for detecting the abnormal reduction in the gain based on the level of the frequency of the pilot signal being injected from the outdoor receiving unit 1609.

The signal input into the main apparatus input terminal 50 in the main apparatus 2060 is attenuated by the variable attenuating means 57. As an amount of attenuation being defined stepwise in accordance with the length of the transmitting means 19, the amount of attenuation is set by 1 dB step, for example, in the variable attenuating means 57. Because the attenuation of the transmitting means 19 is not measure to correct, the level of the input signal can be adjusted by the variable attenuating means 57 such that a sum of the insertion loss of the outdoor receiving unit 1609, the transmitting means 19, and the variable attenuating means 57 becomes almost constant.

The attenuated signal is branch-filtered into the receiving signal component and the pilot signal component by the main apparatus branch-filtering means 51. The receiving signal component is output to the receiving means 52 to be received. While, the pilot signal component is input into the main apparatus detecting means 53 which outputs the pilot signal voltage.

The reference voltage which is generated by the reference voltage generating means 70 and then adjusted by the reference voltage adjusting means 69 and the pilot detected signal are compared by the main apparatus comparing means 55. Based on the output of the comparing means 55, it is detected by the abnormality detecting means 99 whether or not the abnormality is caused. The abnormality detection signal is output at the time when the abnormality is detected. Where the abnormality detecting means 99 is a means which detects the abnormality signal when the voltage being output from the main apparatus comparing means 55 indicates the specified abnormality.

The detecting portion 71 is a means for detecting that the voltage being output from the main apparatus comparing means 55 is within the normal range when the level of the pilot signal input into the main apparatus detecting means 53 is the proper level in installing the receiving apparatus.

In this case, since the amount of attenuation set by the variable attenuating means 57 is set stepwise, the maximum error of the correction value is ±0.5 dB if the amount of attenuation is adjusted by 1 dB step, for example. Therefore, the level of the signal detected by the main apparatus detecting means 53 includes the error of ×0.5 dB at the time of the normal operation. In case the reduction of the level of the pilot signal is to be detected under this condition, the precision to measure the reduction in the actual level of the pilot signal is degraded by ±0.5 dB. As a result, if the level of the pilot signal is lowered by 3 dB actually, the abnormality detecting means 99 decides in some cases that either the reduction is 2.5 dB or the reduction is 3.5 dB.

The reference voltage must be adjusted by the reference voltage adjusting means 69 in installing such that such reduction can be detected properly by the abnormality detecting means 99 as the reduction of 3 dB. At this time, if it is detected by the detecting portion 71 that the output voltage of the main apparatus comparing means 55 can be adjusted into the proper value, it can be checked that the correction has been performed properly.

According to the above description, the receiving apparatus can be provided which is constructed to be adjusted without an external measuring tool such as the tester at the time of installing and which can perform the adjustment properly by eliminating the adjust error due to the read error of the measuring tool, the manual adjust error due to the wrong adjusted value, etc.

In addition, a display portion may be provided to inform the adjustment condition according to a detection signal which is output from the detecting portion 71 when the output voltage of the comparing means 55 can be adjusted into the specified value.

Embodiment 21

Figure 30:
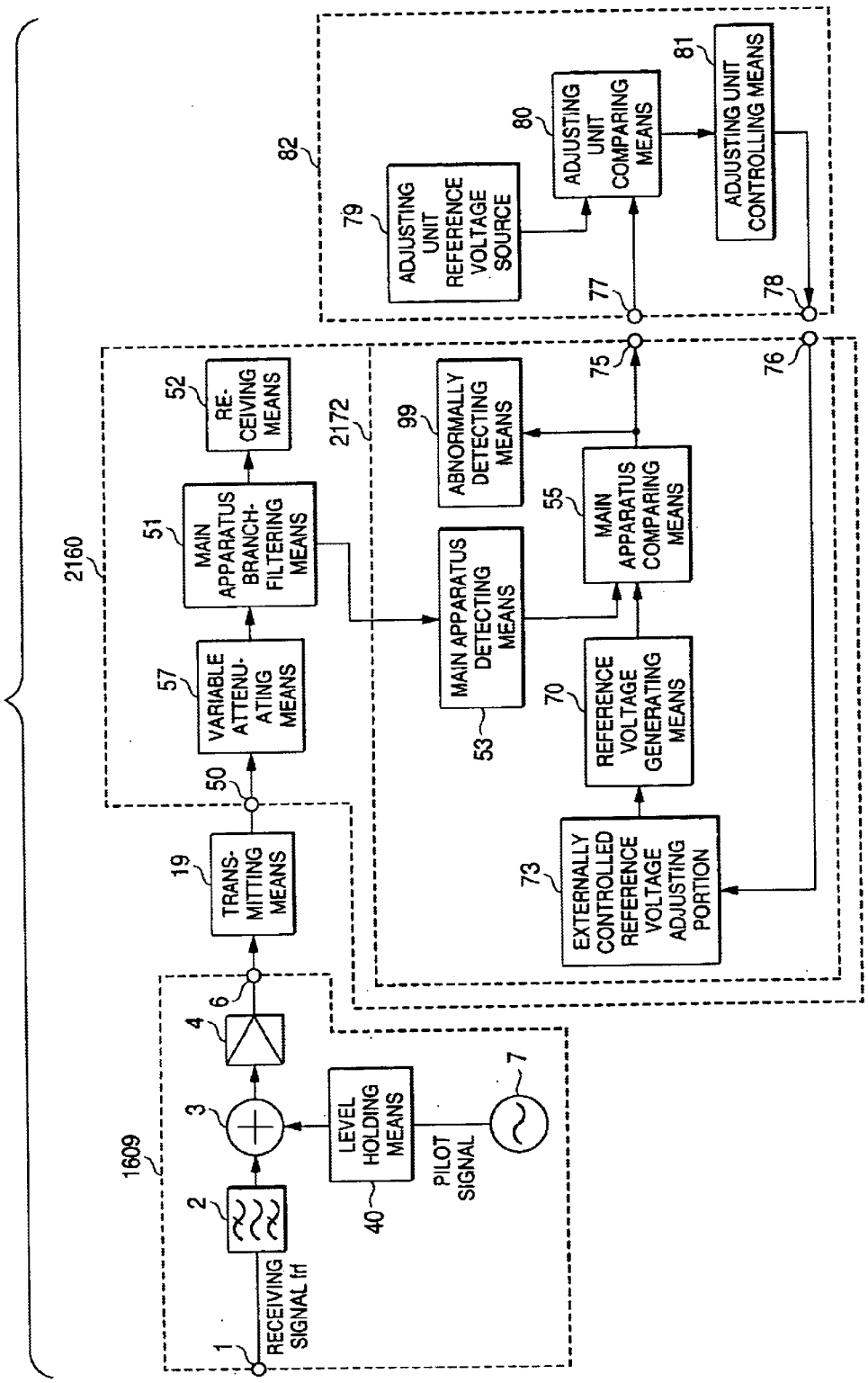
FIG. 30 is a block diagram showing a configuration of a receiving apparatus according to an embodiment 21 of the present invention.

A basic configuration of a receiving apparatus according to an embodiment 21 is shown in FIG. 30. The receiving apparatus according to the embodiment 21 comprises the outdoor receiving unit 1609 which outputs the level-held pilot signal from the outdoor receiving unit output terminal 6, the transmitting means 19 for transmitting the signal being output from the outdoor receiving unit 1609, a main apparatus 2160 for receiving the signal being transmitted over the transmitting means 19, and an adjusting unit 82 for adjusting the main apparatus 2160.

The main apparatus 2160 comprises the main apparatus input terminal 50, the variable attenuating means 57, the main apparatus branch-filtering means 51, the receiving means 52, and a pilot signal monitoring portion 2172.

The pilot signal monitoring portion 2172 comprises the main apparatus detecting means 53, an externally-controlled reference voltage adjusting portion 73, the reference voltage generating means 70, the main apparatus comparing means 55, the abnormality detecting means 99, and the comparing voltage output terminal 75.

Where the reference voltage adjusting portion corresponds to a reference voltage adjusting portion which has a variable resistor, etc. to adjust a value of the reference voltage, for example.

The adjusting unit 82 comprises an adjusting unit reference voltage source 79, a comparing voltage input terminal 77, an adjusting unit comparing means 80, a reference voltage adjusting unit controlling means 81, and a reference voltage adjusting portion control signal output terminal 78.

The signal being input into the main apparatus input terminal 50 in the main apparatus 2160 is attenuated by the variable attenuating means 57. In the variable attenuating means 57, an amount of attenuation is set by 1 dB step, for example, as the amount of attenuation defined stepwise in accordance with the length of the transmitting means 19. Because the attenuation of the transmitting means 19 is not measure to correct, the level of the input signal can be adjusted by the variable attenuating means 57 such that a sum of the insertion loss of the outdoor receiving unit 1609, the transmitting means 19, and the variable attenuating means 57 becomes almost constant.

The attenuated signal is branch-filtered into the receiving signal component and the pilot signal component by the main apparatus branch-filtering means 51 equipped in the pilot signal monitoring portion 2172. The receiving signal component is output to the receiving means 52 and received. The pilot signal component is input into the main apparatus detecting means 53 which outputs the pilot signal voltage.

The reference voltage, which is generated by the reference voltage generating means 70 and then adjusted by the externally-controlled reference voltage adjusting portion 73, and the pilot detected signal are compared by the main apparatus comparing means 55. The externally-controlled reference voltage adjusting portion 73 is controlled by the reference voltage adjusting portion control signal which is input from the reference voltage adjusting portion control signal input terminal 76. Based on the output of the comparing means 55, it is detected by the abnormality detecting means 99 whether or not the abnormality is caused. The abnormality detection signal is output at the time when the abnormality is detected.

Where the abnormality detecting means 99 is a means which detects the abnormality signal when the voltage being output from the main apparatus comparing means 55 indicates the specified abnormality. The voltage output from the main apparatus comparing means 55 is output from the comparing voltage output terminal 75. In the adjusting unit 82, the adjusting unit comparing means 80 compares the comparing voltage being input from the comparing voltage input terminal 77 with the reference voltage being output from the adjusting unit reference voltage source 79, and outputs an adjusting unit comparing voltage. The reference voltage adjusting unit controlling means 81 outputs the reference voltage adjusting unit control signal such that the adjusting unit comparing voltage becomes substantially equal to the specified value. Such control signal is output via the reference voltage adjusting portion control signal output terminal 78.

In this case, upon installing the present receiving apparatus, if the comparing voltage output terminal 75 is connected to the comparing voltage input terminal 77 and also the reference voltage adjusting portion control signal input terminal 76 is connected to the reference voltage adjusting portion control signal output terminal 78, the voltage output from the comparing voltage output terminal 75 may be adjusted into the voltage specified by the adjusting unit reference voltage source 79.

In operation, the abnormality detecting means 99 detects the abnormality from the voltage being output from the main apparatus comparing means 55, and then outputs the abnormality detection signal. Since the amount of attenuation set by the variable attenuating means 57 is set stepwise, the maximum error of the correction value is ±0.5 dB if the amount of attenuation is adjusted by 1 dB step, for example. Therefore, the level of the signal detected by the main apparatus detecting means 53 includes the error of ±0.5 dB at the time of the normal operation.

If the reduction of the level of the pilot signal is to be detected under this condition, the precision to measure the reduction in the actual level of the pilot signal is degraded by ±0.5 dB. As a result, if the level of the pilot signal is lowered actually by 3 dB, the abnormality detecting means 99 decides in some cases that either the reduction is 2.5 dB or the reduction is 3.5 dB. In installing the receiving apparatus, the reference voltage must be adjusted by the reference voltage adjusting means 69 such that such reduction can be detected properly by the abnormality detecting means 99 as the reduction of 3 dB. At this time, if the reference voltage output from the reference voltage source 70 is adjusted by the adjusting unit 82 at the time of installation, such adjustment can be attained that the degradation of the precision can be eliminated in measuring the reduction degree of the gain caused by the error of the adjust value set by the variable attenuating means 57.

According to the above description, the receiving apparatus can be provided which can perform the adjustment by using the adjusting unit 82 to eliminate the adjust error due to the read error of the measuring tool, the manual adjust error due to the wrong adjusted value, etc.

Embodiment 22

Figure 31:
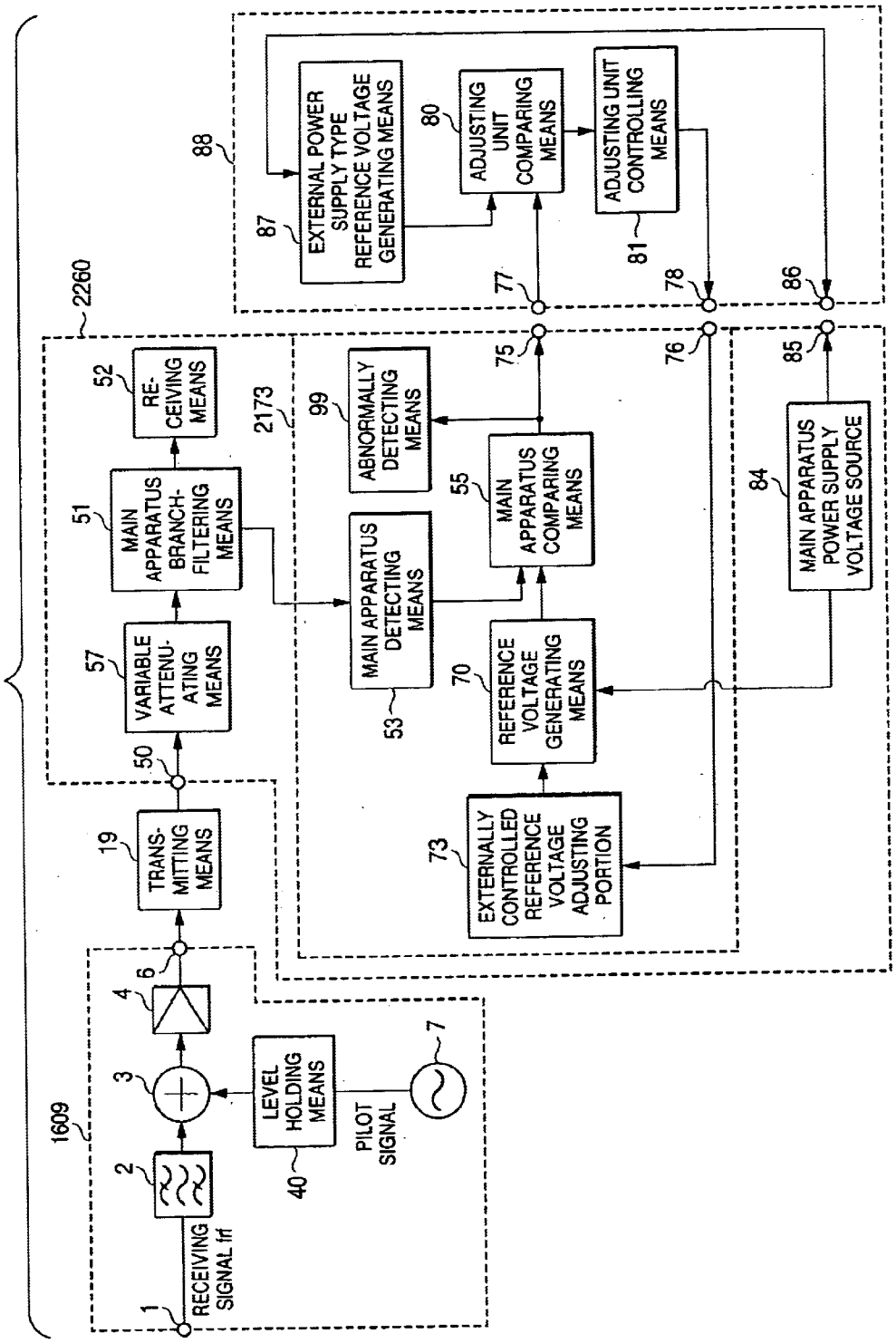
FIG. 31 is a block diagram showing a configuration of a receiving apparatus according to an embodiment 22 of the present invention.

A basic configuration of a receiving apparatus according to an embodiment 22 is shown in FIG. 31. The receiving apparatus and an adjusting unit according to the embodiment 22 comprises the outdoor receiving unit 1609 which outputs the level-held pilot signal from the outdoor receiving unit output terminal 6, the transmitting means 19 for transmitting the signal being output from the outdoor receiving unit 1609, a main apparatus 2260 adjusted by an adjusting unit 88 and for receiving the signal transmitted over the transmitting means 19.

The main apparatus 2260 comprises the main apparatus input terminal 50, the variable attenuating means 57, the main apparatus branch-filtering means 51, the receiving means 52, a pilot signal monitoring portion 2173, the main apparatus power supply voltage source 84 for supplying a power supply of the reference voltage generating means 70, and the main apparatus power supply voltage output terminal 85 for outputting.

The pilot signal monitoring portion 2173 comprises the main apparatus detecting means 53, the externally-controlled reference voltage adjusting portion 73, the reference voltage generating means 70, the main apparatus comparing means 55, the abnormality detecting means 99, and the comparing voltage output terminal 75.

The adjusting unit 88 comprises the adjusting unit reference voltage source 79, the comparing voltage input terminal 77, the adjusting unit comparing means 80, the reference voltage adjusting unit controlling means 81, and the reference voltage adjusting portion control signal output terminal 78.

The reference voltage generating means 70 of the pilot signal monitoring portion 2173 in the main apparatus 2260 receives the power supply voltage from the main apparatus power supply voltage source 84. Since the reference voltage generating means 70 outputs the reference voltage based on this power supply voltage, such reference voltage output from the reference voltage generating means 70 is varied due to individual variation in the main apparatus power supply voltage of the main apparatus. Therefore, the specified voltage of the abnormality detecting means 99 used to detect the abnormality is also varied. This causes that the precision is reduced in detecting the reduction in the gain of the abnormality detection.

As shown in the embodiment 21, in order to adjust the main apparatus 2260 by using the adjusting unit 88 upon installing the receiving apparatus, the main apparatus power supply voltage is output from the power supply voltage output terminal 85, and then the voltage is input from the power supply voltage input terminal 86 and supplied to the external power supply type reference voltage generating means 87 in the adjusting unit 88 to output the reference voltage.

According to the above operation, if the reference voltage being output from the reference voltage generating means 70 is adjusted on the basis of the power supply voltage of the main apparatus in installing the receiving apparatus, the error of the gain in detecting the abnormality due to individual variation of the power supply voltage can be eliminated. As a result, such an advantage can be achieved that the adjustment precision and the work efficiency can be improved.

Embodiment 23

Figure 32:
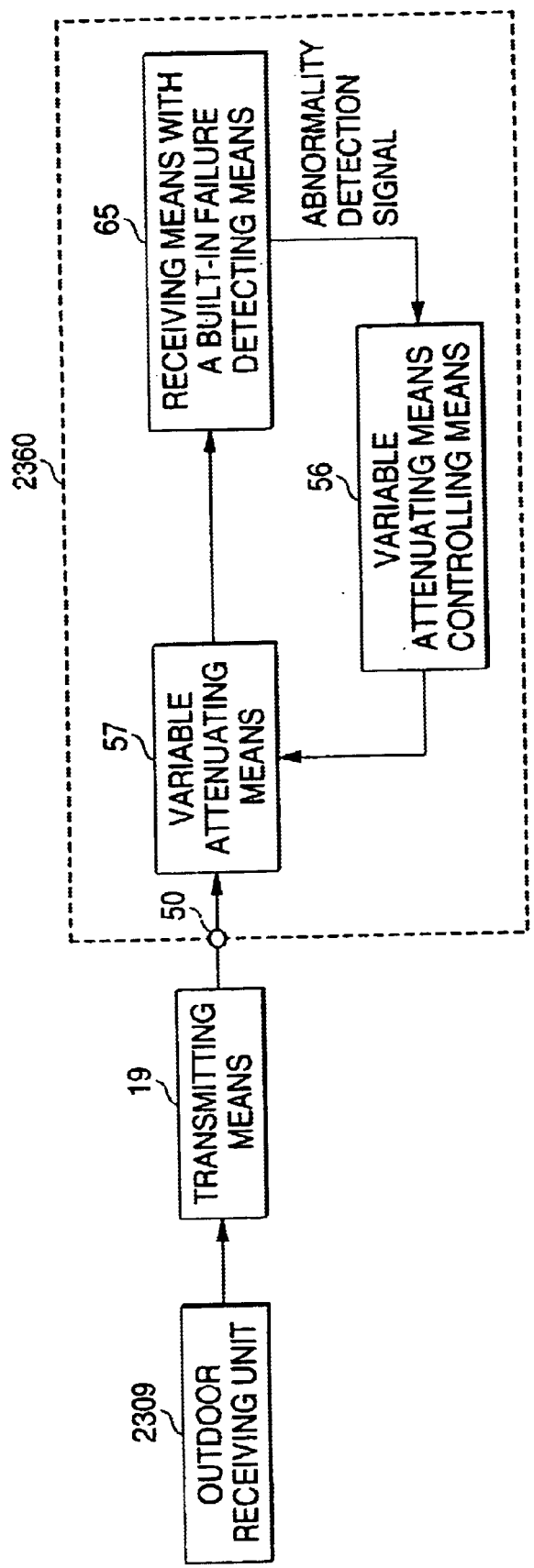
FIG. 32 is a block diagram showing a configuration of a receiving apparatus according to an embodiment 23 of the present invention.

A basic configuration of a receiving apparatus according to an embodiment 23 is shown in FIG. 32. The receiving apparatus according to the embodiment 23 comprises an outdoor receiving unit 2309, a main apparatus 2360, and the transmitting means 19 for transmitting the signal being output from the outdoor receiving unit 2309. The main apparatus 2360 comprises the variable attenuating means 57 whose attenuation amount is controlled by the variable attenuating means controlling means 56, and a receiving means with a built-in failure detecting means 65.

The outdoor receiving unit 2309 is an outdoor receiving unit which has a mean for transmitting the abnormality such as the reduction of the gain to the main apparatus 2360, and corresponds to the outdoor receiving units shown in the embodiments 1 to 15. The signal output from the outdoor receiving unit 2309 is transmitted to the main apparatus 2360 via the transmitting means 19. The signal which is input into the main unit input terminal 50 in the main apparatus 2360 is adjusted in level by the variable attenuating means 57, and then input into the receiving means with the built-in failure detecting means 65.

If the failure or the abnormality is not detected by the receiving means with the built-in failure detecting means 65, the abnormal operation is received. However, if the receiving means with the built-in failure detecting means 65 detects the reduction in the level of the pilot signal and the reduction in the gain of the outdoor receiving unit 2309, such failure detecting means can detect the abnormality of the gain of the outdoor receiving unit 2309 and the abnormality of the insertion loss of the transmitting means 19, like the abnormality detecting means 1053, the abnormality detecting means 5053, the abnormality detecting means 1353, etc.

When the reduction in the gain of the outdoor receiving unit 2309 or the increase in the insertion loss of the transmitting means 19 is detected by the receiving means with the built-in failure detecting means 65, the abnormality detection signal is output to the variable attenuating means controlling means 56. Then, the level of the signal to be input into the receiving means with the built-in failure detecting means 65 can be increased by reducing an amount of attenuation of the variable attenuating means 57 by using the variable attenuating means controlling means 56.

According to the above description, if the gain of the outdoor receiving unit 2309 is reduced, reduction in the receiving performance can be relaxed with a simple configuration by reducing the degradation of the noise figure of the receiving apparatus.

If the proper value of the pilot signal can be achieved by reducing the amount of attenuation of the variable attenuating means 57, this situation is equivalent to the total gain from the outdoor receiving unit 9 to the transmitting means 19 in the normal operation. Therefore, in the event that the system is used after the failure has been detected, the system may be operated while holding the amount of attenuation at that time under the condition the measured value of the receiving signal has a value equivalent to the proper value.

Embodiment 24

A basic configuration of a base station apparatus according to an embodiment 24 has a configuration in which an antenna is provided to the receiving apparatus set forth in the embodiments 1 to 23. Where the base station apparatus corresponds to a base station apparatus which is employed in mobile communication, for example. According to the above configuration, the base station apparatus can be provided which can perform the abnormality detection of the outdoor receiving unit simply.

Embodiment 25

A basic configuration of a radio system according to an embodiment 25 is a radio system which employs one of the embodiments 1 to 24. According to the present radio system, radio service with good quality can be provided.

As described above, according to the present invention, since a plurality of pilot signals each having a different frequency is employed, such an advantage can be achieved that the gain of the receiving amplifier built in the outdoor receiving unit can be monitored based on relative differences of the pilot signals which are injected into the main apparatus.

Also, since information are added to the frequency of the pilot signal according to the consumption current or the gain of the receiving amplifier in the outdoor receiving unit, such an advantage can be achieved that internal condition of the outdoor receiving unit can be informed the main apparatus.

Also, since the pilot signals are adjusted such that the levels of the pilot signals can be canceled in the normal operation, such an advantage can be achieved that the pilot signals do not cause the receiving disturbance.

Also, since the means for holding the level of the pilot signal against the variation in the ambient temperature and the power supply voltage is provided, such advantages can be achieved that the abnormality of the transmitting means can be detected and that the reduction in the gain can be measured by measuring the absolute value of the level of the pilot signal in the main apparatus.

Also, since information of the outdoor receiving unit is informed the main apparatus by transmitting the measured result of the level of the pilot signal amplified by the receiving amplifier and the measured result of the input level of the pilot signal, both are superposed on the frequency of the pilot signal, to the outdoor receiving unit and the level of the pilot signal is held, when the reduction in the gain of the outdoor receiving unit is detected, it can be checked in the main apparatus by measuring the absolute value of the level of the pilot signal that the normal operation can be still kept or not. As a result, such an advantage can be achieved that the abnormality detection with high reliability can be performed.

Also, since the pilot signal being output from the outdoor receiving unit is detected by the pilot signal detecting means in the main apparatus in installing the receiving apparatus, such an advantage can be achieved that the amount of attenuation of the variable attenuating means being connected to the transmitting means can be set with high precision to make the detected voltage equal to the specified value.

Also, since the local signal having the frequency which converts the frequency of the pilot signal into the intermediate frequency is input to employ the detecting means built in the receiving means, such an advantage can be achieved that the pilot signal can be detected with a simple configuration.

Also, upon installing the receiving apparatus, variation of the insertion loss is caused due to difference of the length of the transmitting means. In this case, the output voltage of the reference voltage source used in detecting the abnormality must be adjusted. Such an advantage can be achieved that the adjusting precision and the work efficiency can be improved.

Also, since degradation of the noise figure of the receiving apparatus in low gain operation can be relaxed by reducing the insertion loss of the attenuating means to correct the insertion loss of the transmitting means when the reduction in the gain of the outdoor receiving unit is detected, such an advantage can be achieved that the degradation of the receiving performance can be relaxed.

What is claimed is:

1. A receiving apparatus comprising:
    an outdoor receiving unit;
    a main apparatus; and
    a transmitting means for transmitting a receiving signal from the outdoor receiving unit to the main apparatus;
    wherein the outdoor receiving unit includes,
        a receiving filter for passing the receiving signal within a predetermined bandwidth,
        a first pilot signal generating means for outputting a first pilot signal,
        a first adding means for adding the first pilot signal to a signal being passed through the receiving filter,
        a receiving amplifier for amplifying a signal added by the first adding means,
        a second pilot signal generating means for outputting a second pilot signal which has a frequency different from the first pilot signal, and
        a second adding means for adding the second pilot signal to an output side of the receiving amplifier, and
    the main apparatus includes
        an abnormality detecting means for detecting abnormality of the outdoor receiving unit according to the first pilot signal and the second pilot signal contained in a signal which is supplied from the outdoor receiving unit via the transmitting means.

2. A receiving apparatus according to claim 1, wherein the outdoor receiving unit includes,
    a reference signal generating means for generating a reference signal,
    a distributing means for distributing the reference signal into n signals,
    first to n-th multiplexing means for multiplexing first to n-th distributed signals distributed by the distributing means to have different multiples respectively, and
    first to n-th filters for passing signals multiplexed by the first to n-th multiplexing means,
    wherein outputs of the first to n-th filters are employed as first to n-th pilot signals.

3. A receiving apparatus according to claim 1, wherein the outdoor receiving unit includes a level holding circuit for holding levels of pilot signals at a predetermined level.

4. A receiving apparatus comprising:
    an outdoor receiving unit;
    a main apparatus; and
    a transmitting means for transmitting a receiving signal from the outdoor receiving unit to the main apparatus;
    wherein the outdoor receiving unit includes,
        a receiving filter for passing the receiving signal within a predetermined bandwidth,
        a distributing means for distributing a signal which is passed through the receiving filter,
        a first pilot signal generating means for generating a first pilot signal,
        a first adding means for adding the first pilot signal to one of the signals distributed by the distributing means,
        a first receiving amplifier for amplifying a signal added by the first adding means,
        a second pilot signal generating means for outputting a second pilot signal which has a frequency different from the first pilot signal,
        a second adding means for adding the second pilot signal to another signal of the signals distributed by the distributing means,
        a second receiving amplifier for amplifying a signal added by the second adding means, and
        a synthesizing means for synthesizing signals amplified by the first receiving amplifier and the second receiving amplifier, and
    the main apparatus includes
        an abnormality detecting means for detecting abnormality of the outdoor receiving unit according to the first pilot signal and the second pilot signal contained in a signal which is supplied from the outdoor receiving unit via the transmitting means.

5. A receiving apparatus according to claim 4, wherein the outdoor receiving unit includes,
    a reference signal generating means for generating a reference signal,
    a distributing means for distributing the reference signal into n signals,
    first to n-th multiplexing means for multiplexing first to n-th distributed signals distributed by the distributing means to have different multiples respectively, and
    first to n-th filters for passing signals multiplexed by the first to n-th multiplexing means,
    wherein outputs of the first to n-th filters are employed as first to n-th pilot signals.

6. A receiving apparatus according to claim 5, wherein the outdoor receiving unit includes a level holding circuit for holding levels of pilot signals at a predetermined level.

7. A receiving apparatus according to claim 4, wherein the outdoor receiving unit includes a level holding circuit for holding levels of pilot signals at a predetermined level.

8. A receiving apparatus comprising:
an outdoor receiving unit;
a main apparatus; and
a transmitting means for transmitting a receiving signal from the outdoor receiving unit to the main apparatus;
wherein the outdoor receiving unit includes,
- a receiving filter for passing the receiving signal within a predetermined bandwidth,
- first to n+1-th pilot signal generating means for generating first to n+1-th pilot signals each having a different frequency,
- n-stage receiving amplifiers,
- first to n-th adding means for adding the first to n-th pilot signals to input sides of the receiving amplifiers respectively, and
- an n+1-th adding means for adding the n+1-th pilot signal to an n-th stage output side of the n-th stage receiving amplifier, and the main apparatus includes
- an abnormality detecting means for detecting abnormality of the outdoor receiving unit according to the first pilot signal and the second pilot signal contained in a signal which is supplied from the outdoor receiving unit via the transmitting means.

9. A receiving apparatus according to claim 8, wherein the outdoor receiving unit includes,
- a reference signal generating means for generating a reference signal,
- a distributing means for distributing the reference signal into n signals,
- first to n-th multiplexing means for multiplexing first to n-th distributed signals distributed by the distributing means to have different multiples respectively, and
- first to n-th filters for passing signals multiplexed by the first to n-th multiplexing means,
wherein outputs of the first to n-th filters are employed as first to n-th pilot signals.

10. A receiving apparatus according to claim 9, wherein the outdoor receiving unit includes a level holding circuit for holding levels of pilot signals at a predetermined level.

11. A receiving apparatus according to claim 8, wherein the outdoor receiving unit includes a level holding circuit for holding levels of pilot signals at a predetermined level.

* * * * *